US009913002B2

(12) United States Patent
An et al.

(10) Patent No.: US 9,913,002 B2
(45) Date of Patent: Mar. 6, 2018

(54) IMAGE DISPLAY DEVICE AND METHOD FOR OPERATING SAME

(71) Applicant: LG ELECTRONICS INC., Seoul (KR)

(72) Inventors: Seungjoo An, Seoul (KR); Jinpil Kim, Seoul (KR); Kyoungsoo Moon, Seoul (KR); Jinwon Lee, Seoul (KR); Janghun Bae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/897,779

(22) PCT Filed: Jun. 10, 2014

(86) PCT No.: PCT/KR2014/005089
§ 371 (c)(1),
(2) Date: Dec. 11, 2015

(87) PCT Pub. No.: WO2014/200248
PCT Pub. Date: Dec. 18, 2014

(65) Prior Publication Data
US 2016/0119694 A1    Apr. 28, 2016

Related U.S. Application Data

(60) Provisional application No. 61/833,935, filed on Jun. 12, 2013, provisional application No. 61/846,087, filed on Jul. 15, 2013.

(51) Int. Cl.
*H04N 7/025*     (2006.01)
*H04N 21/858*    (2011.01)
(Continued)

(52) U.S. Cl.
CPC ....... *H04N 21/858* (2013.01); *H04N 5/44543* (2013.01); *H04N 5/44591* (2013.01);
(Continued)

(58) Field of Classification Search
CPC .......... H04N 21/2589; H04N 21/4622; H04N 21/4222; H04N 21/42209; H04N 21/8545
(Continued)

(56) References Cited

U.S. PATENT DOCUMENTS

2008/0010342 A1    1/2008  Gebhardt et al.
2009/0106803 A1    4/2009  Chen et al.
(Continued)

FOREIGN PATENT DOCUMENTS

KR    10-2011-0007799 A    1/2011
KR    10-2012-0137001 A    12/2012
(Continued)

*Primary Examiner* — Jivka Rabovianski
(74) *Attorney, Agent, or Firm* — Birch, Stewart, Kolasch & Birch, LLP

(57) ABSTRACT

A method of operating a video display device is provided. A reception unit obtains uncompressed audio and video content. A display unit displays the uncompressed audio and video content. An enhanced service management unit receives first content information comprising a trigger based on first characteristic information extracted from the uncompressed audio and video content, executes an application related to the uncompressed audio and video content based on the trigger, receives second content information related to the uncompressed content based on second characteristic information extracted from the uncompressed audio and video content, and terminates the application when the content information satisfies an application termination condition.

6 Claims, 62 Drawing Sheets

(51) Int. Cl.

| | |
|---|---|
| *H04N 5/445* | (2011.01) |
| *H04N 21/488* | (2011.01) |
| *H04N 21/435* | (2011.01) |
| *H04N 21/438* | (2011.01) |
| *H04N 21/44* | (2011.01) |
| *H04N 21/6543* | (2011.01) |
| *H04N 21/43* | (2011.01) |
| *H04N 21/436* | (2011.01) |
| *H04N 21/4402* | (2011.01) |
| *H04N 21/8358* | (2011.01) |
| *H04N 21/4363* | (2011.01) |
| *H04N 21/478* | (2011.01) |
| *H04N 21/81* | (2011.01) |

(52) U.S. Cl.
CPC ......... *H04N 21/435* (2013.01); *H04N 21/436* (2013.01); *H04N 21/4307* (2013.01); *H04N 21/4383* (2013.01); *H04N 21/4402* (2013.01); *H04N 21/44008* (2013.01); *H04N 21/4882* (2013.01); *H04N 21/6543* (2013.01); *H04N 21/8358* (2013.01); *H04N 21/43635* (2013.01); *H04N 21/478* (2013.01); *H04N 21/8173* (2013.01); *H04N 2005/44578* (2013.01)

(58) Field of Classification Search
USPC .................. 725/14, 32, 36, 62, 115
See application file for complete search history.

(56) References Cited

U.S. PATENT DOCUMENTS

| | | | |
|---|---|---|---|
| 2012/0084802 A1* | 4/2012 | Kitazato | ............... H04H 60/13 725/14 |
| 2012/0291064 A1 | 11/2012 | Kitazato | |
| 2013/0019261 A1* | 1/2013 | Huber | ............... G06Q 30/0269 725/32 |
| 2013/0031578 A1 | 1/2013 | Zhu et al. | |
| 2013/0103716 A1 | 4/2013 | Yamagishi | |
| 2014/0115651 A1 | 4/2014 | Baek | |
| 2015/0156537 A1 | 6/2015 | Moon et al. | |

FOREIGN PATENT DOCUMENTS

| | | |
|---|---|---|
| WO | WO 2012/070903 A2 | 12/2012 |
| WO | WO 2013/014652 A1 | 1/2013 |

* cited by examiner

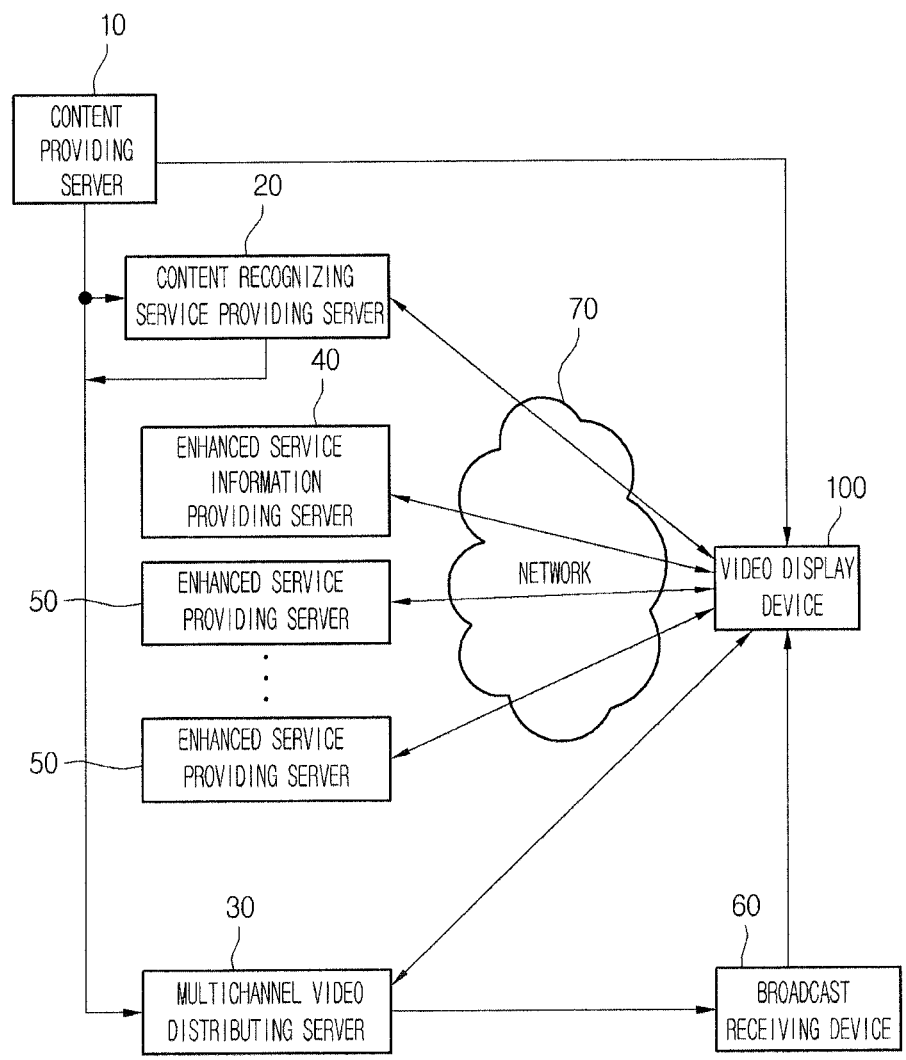
[Fig .1]

[Fig .2]
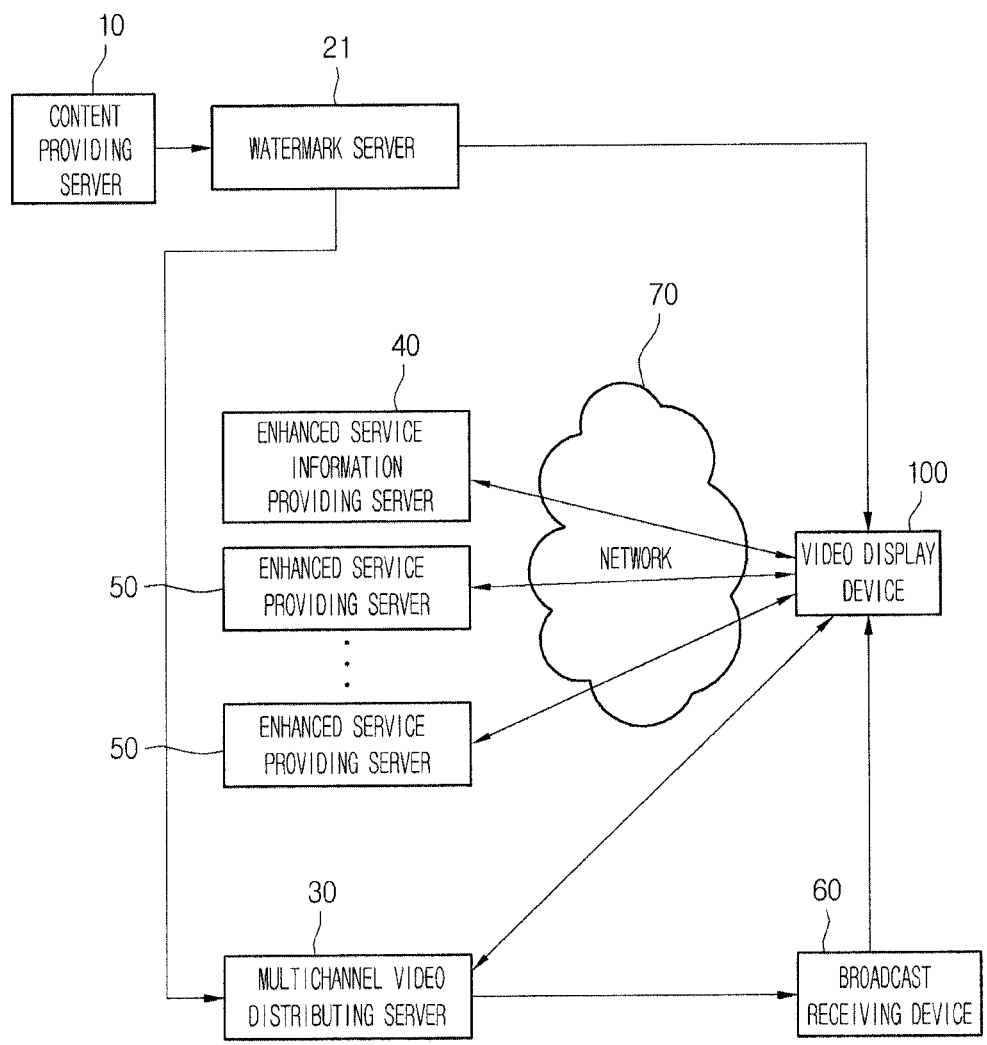

[Fig .3]
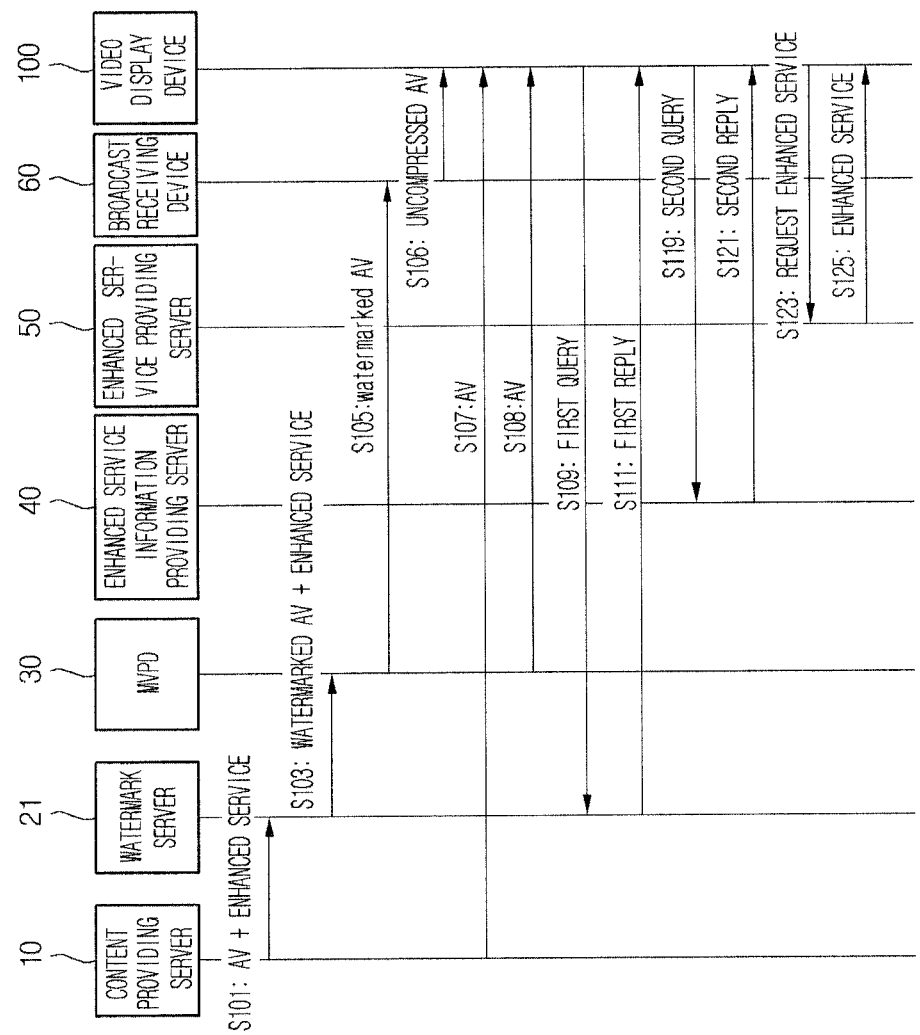

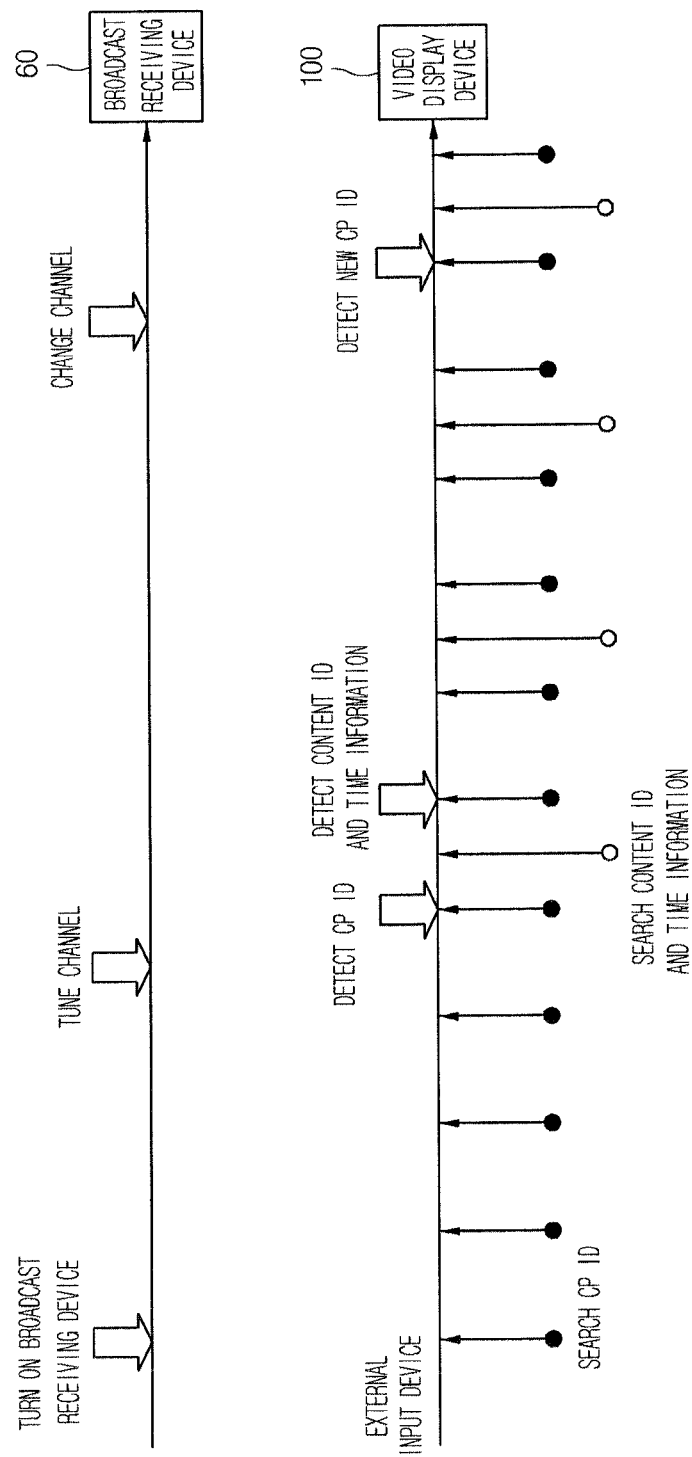

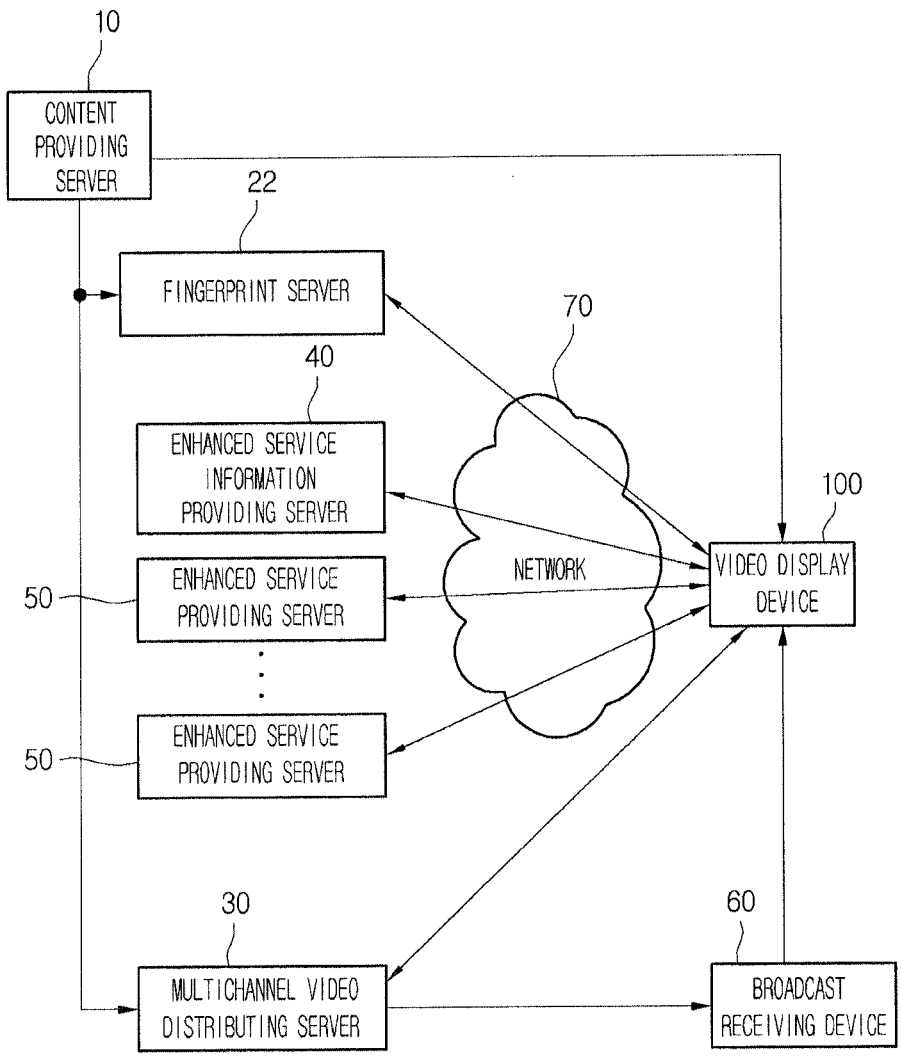
[Fig .5]

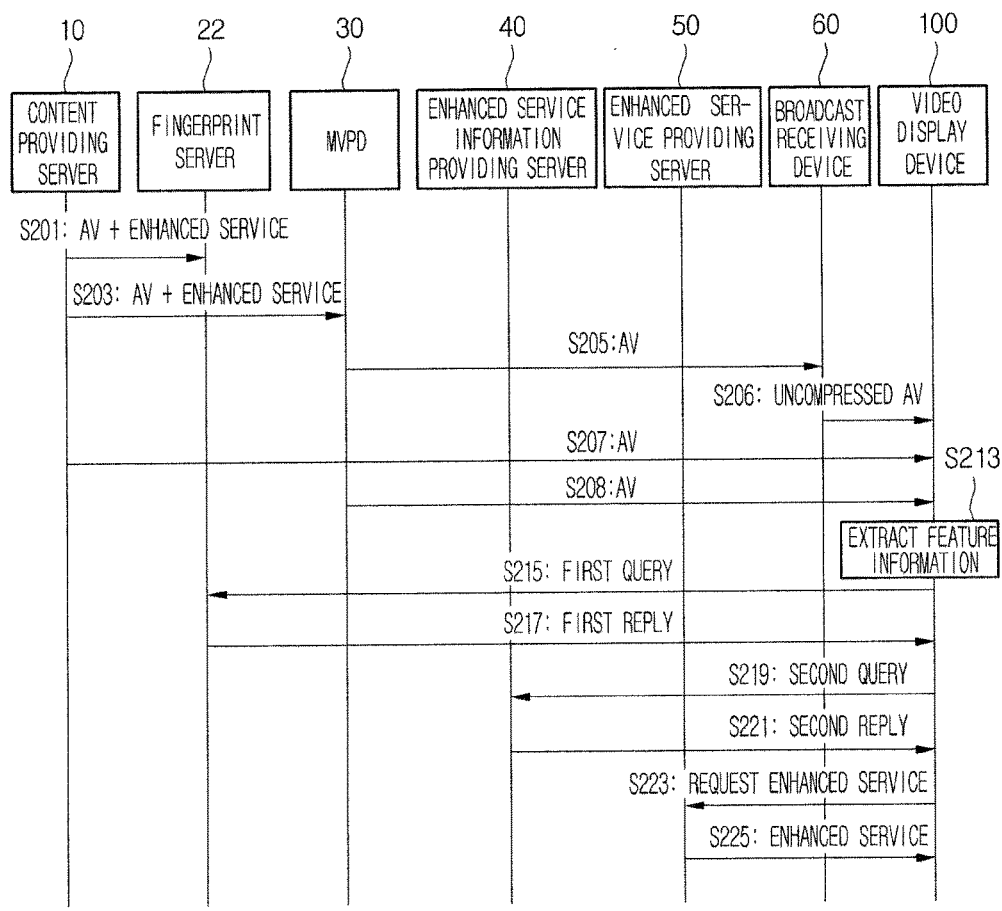
[Fig .6]

[Fig .7]
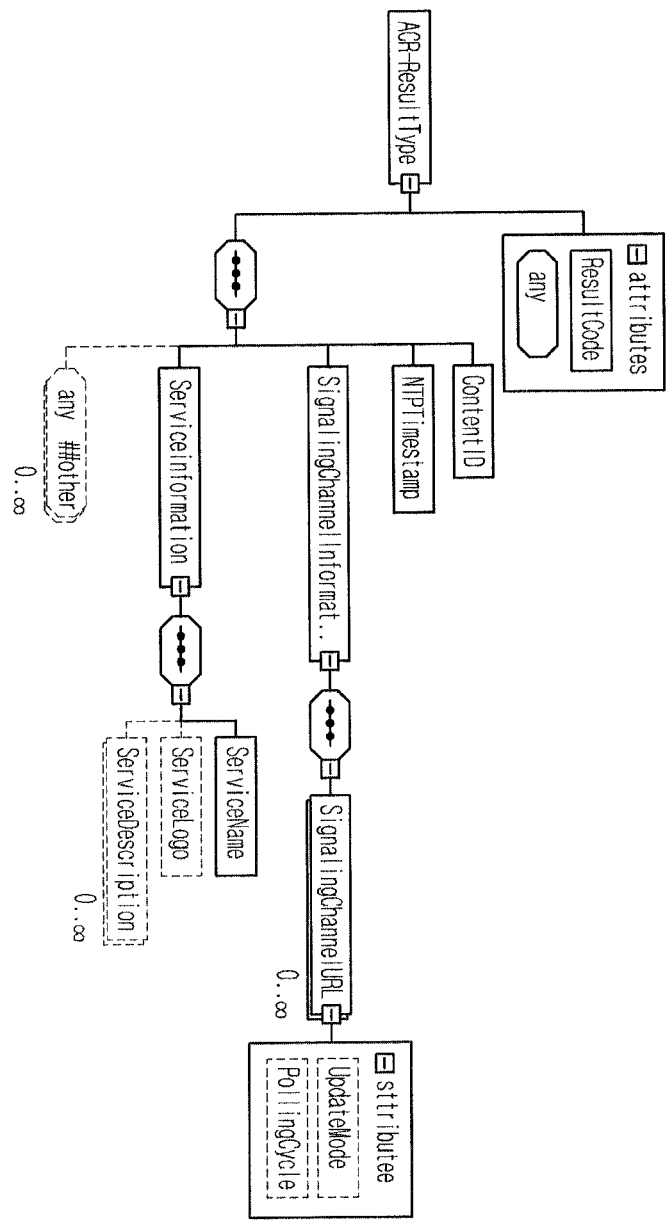

[Fig .8]
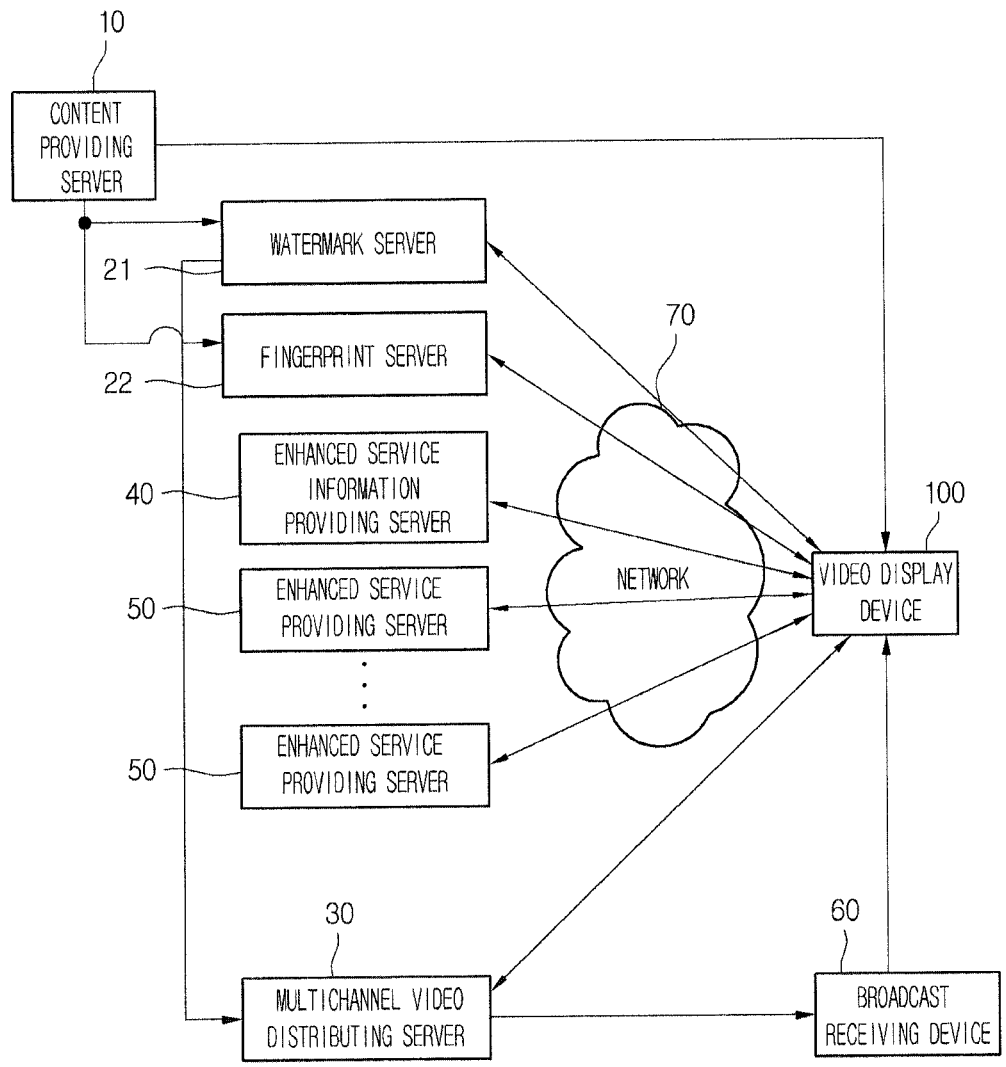

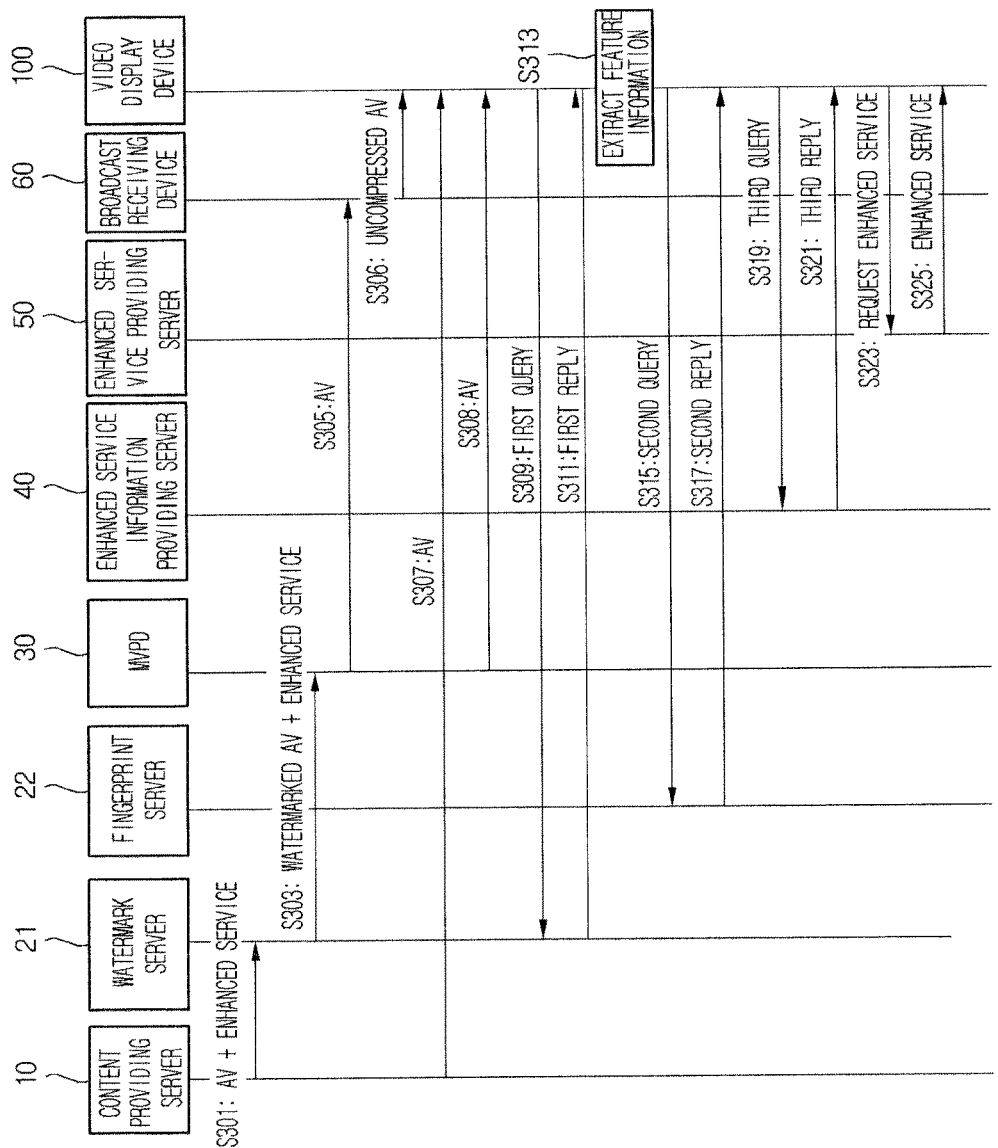
[Fig. 9]

[Fig .10]
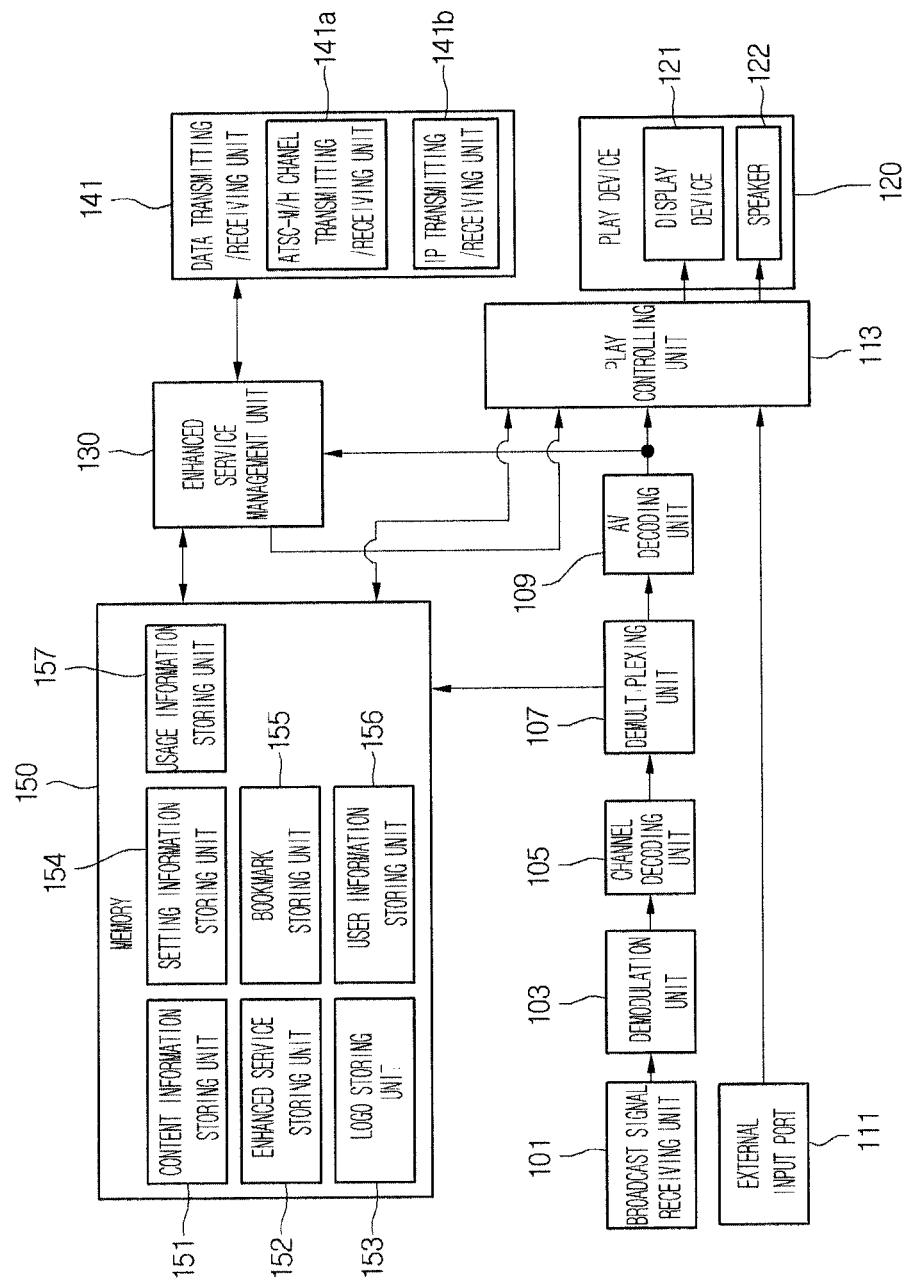

[Fig .11]
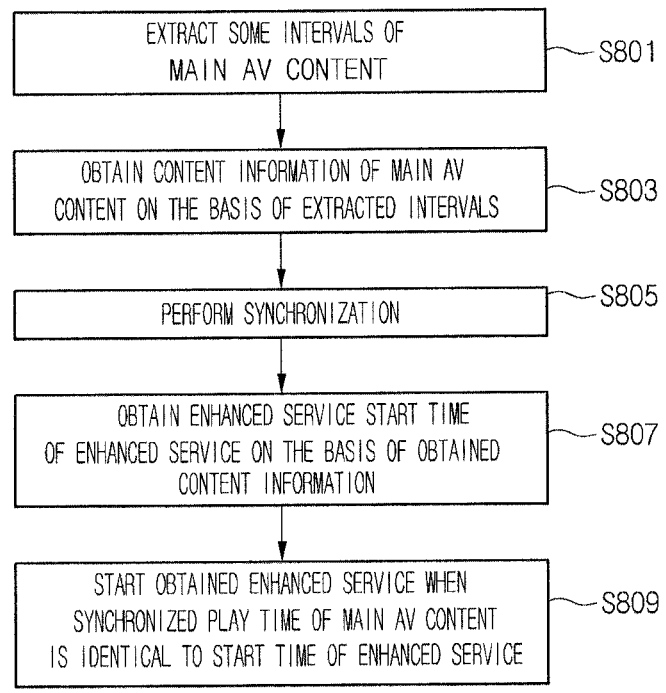

[Fig .12]
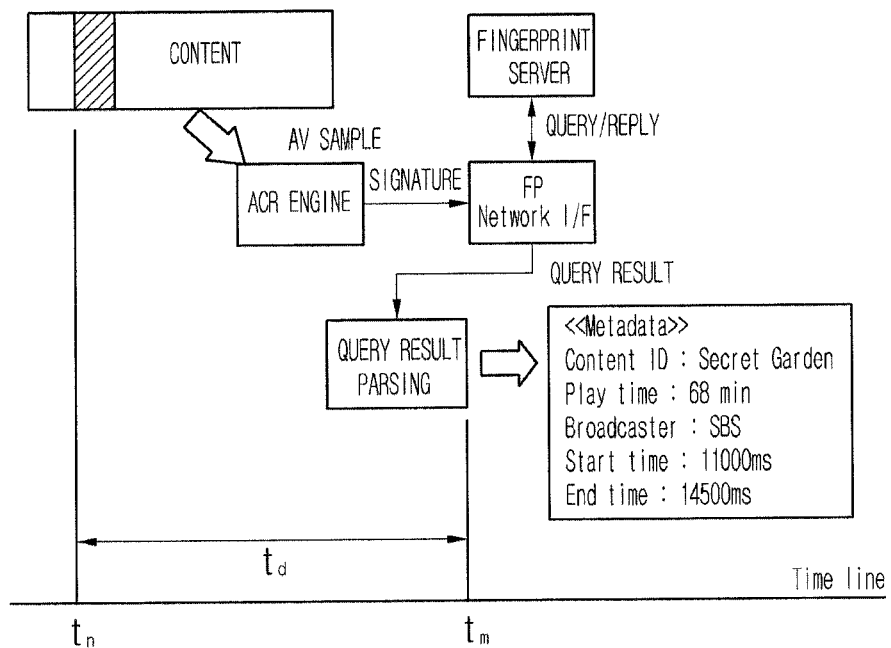

[Fig .13]
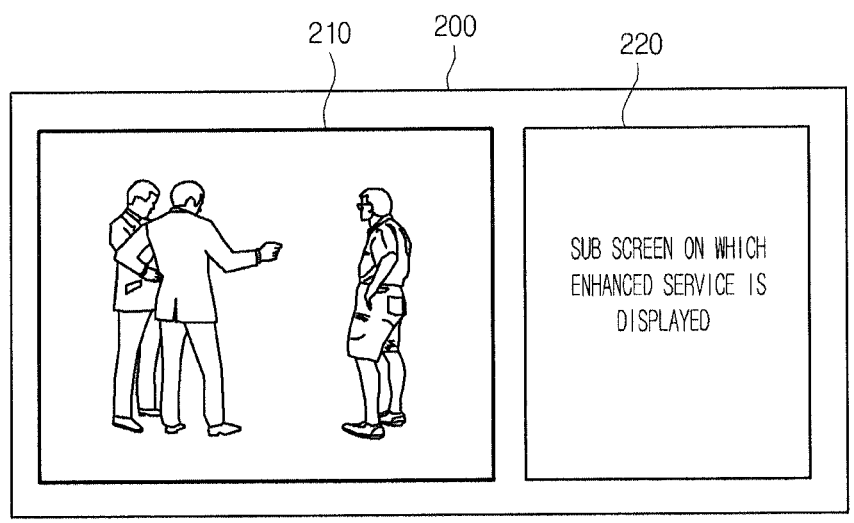

[Fig .14]
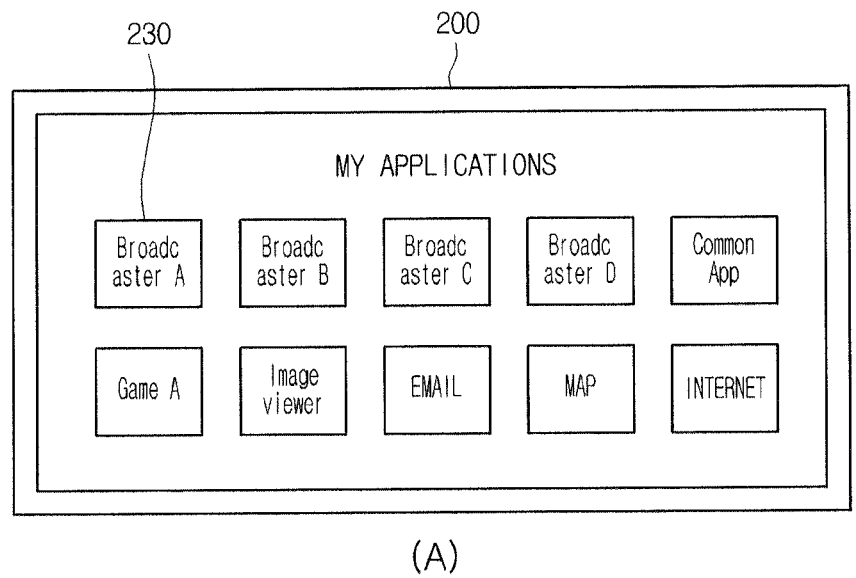
(A)
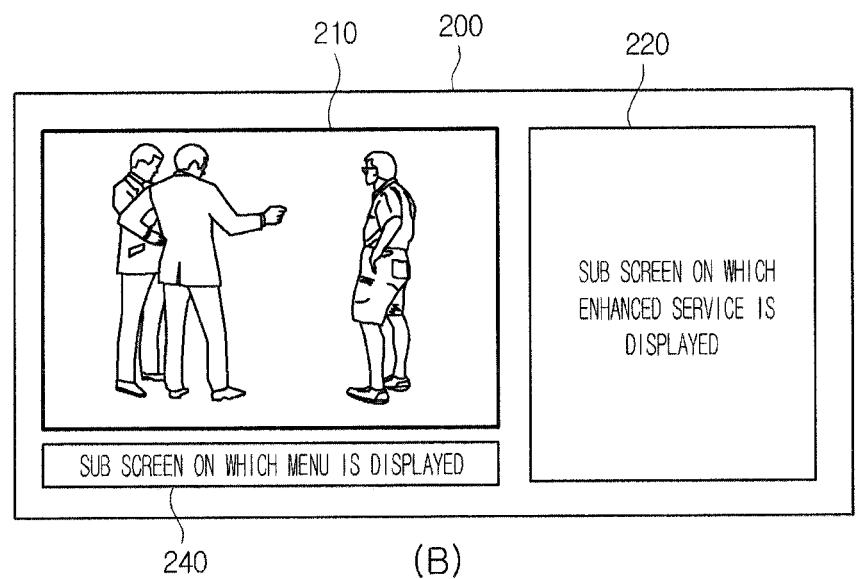
(B)

[Fig .15]
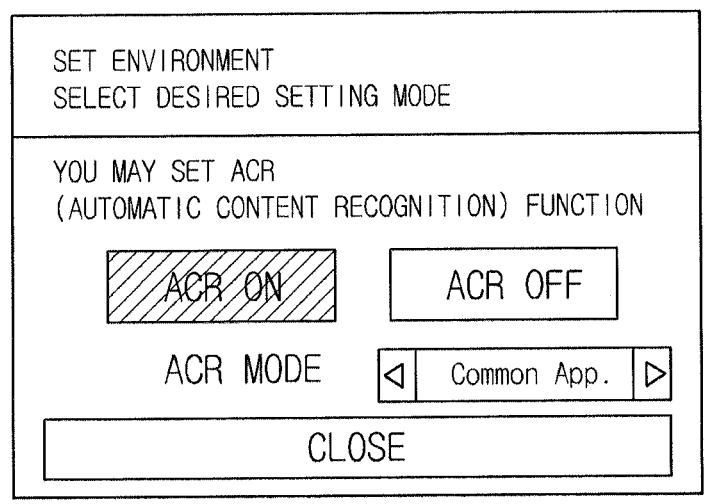

[Fig .16]
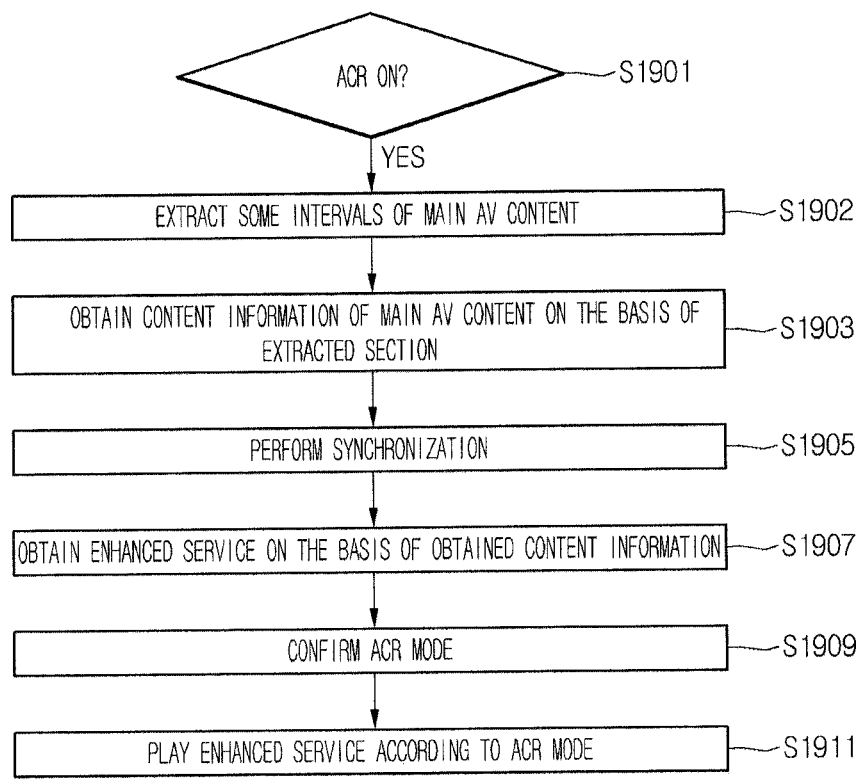

[Fig .17]
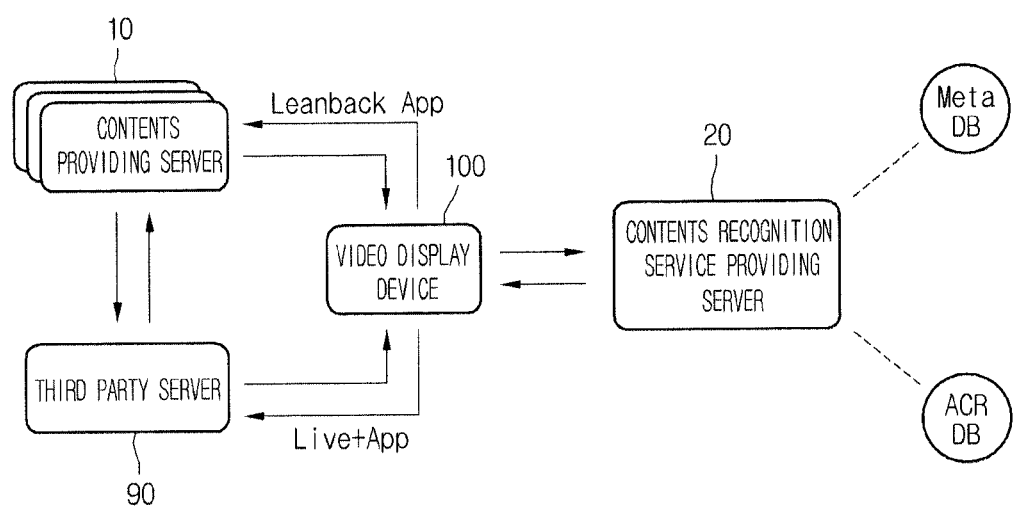

[Fig .18]
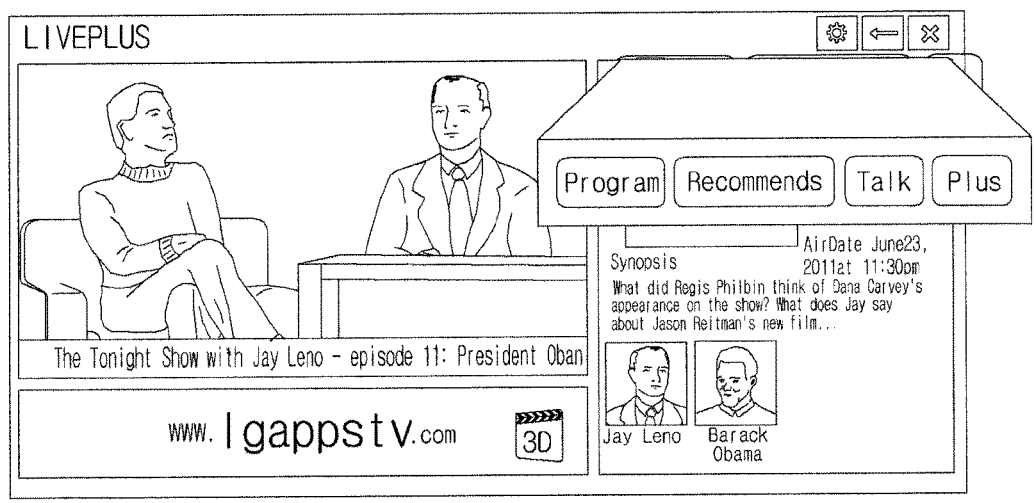

[Fig .19]
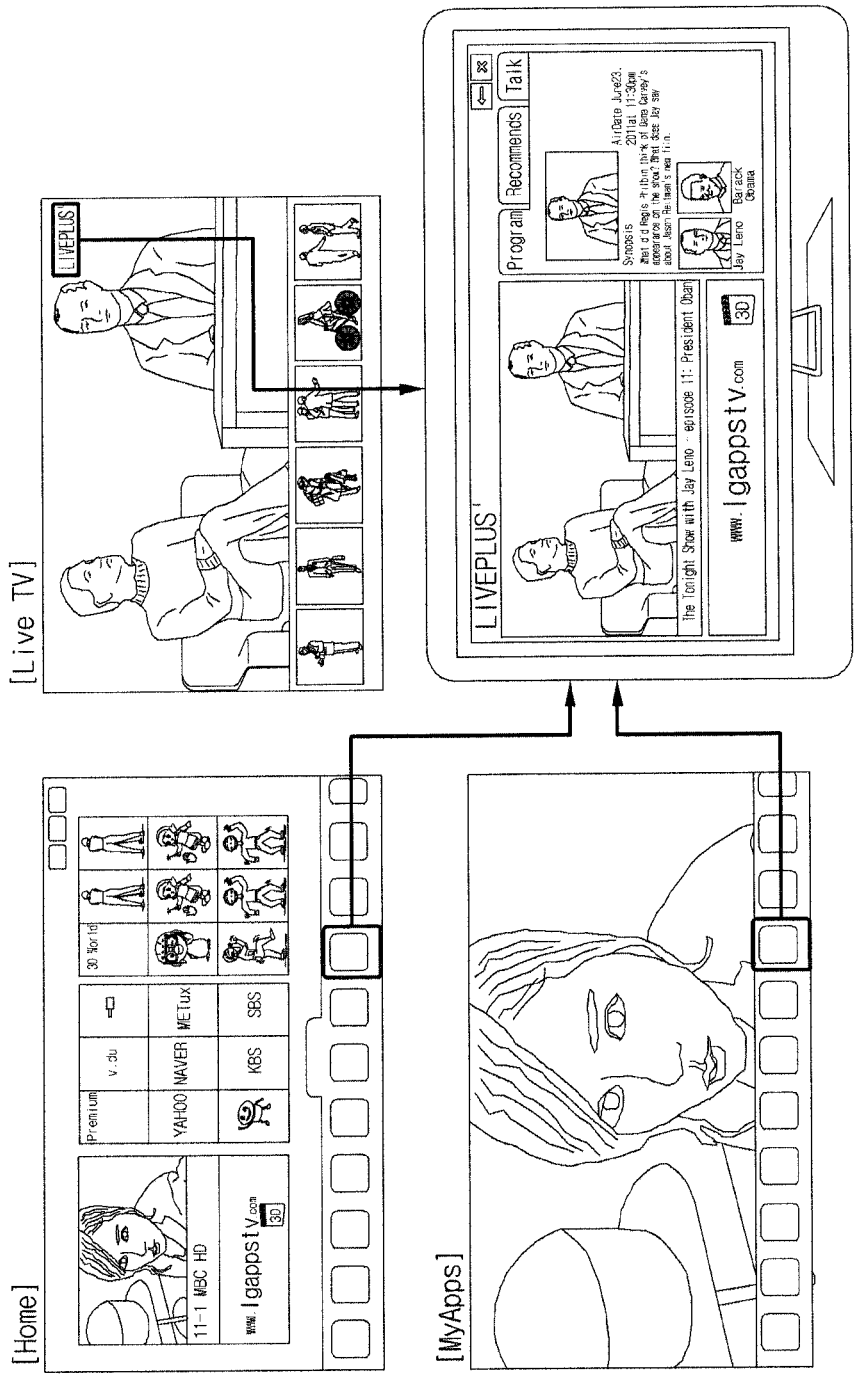

[Fig .20]
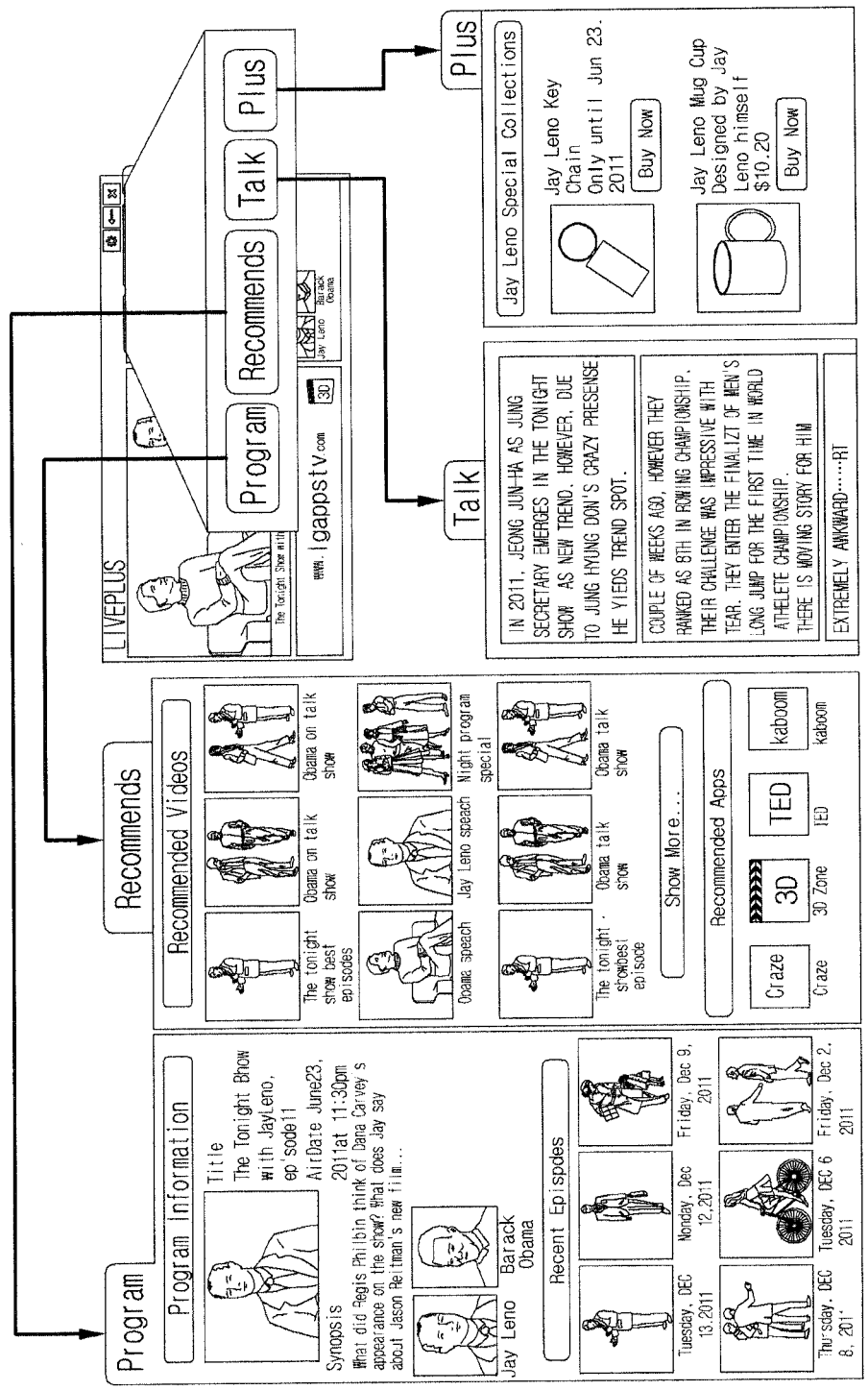

[Fig .21]
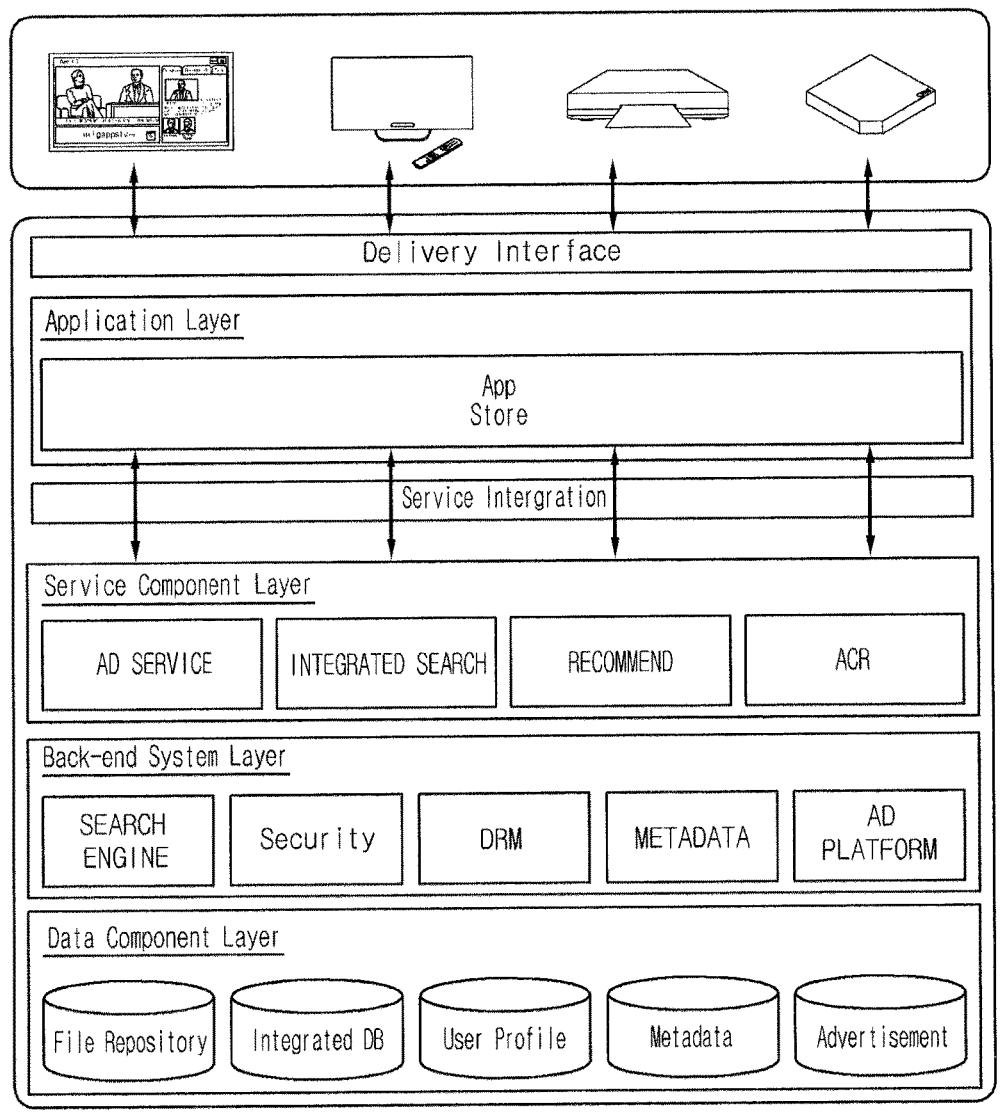

[Fig .22]
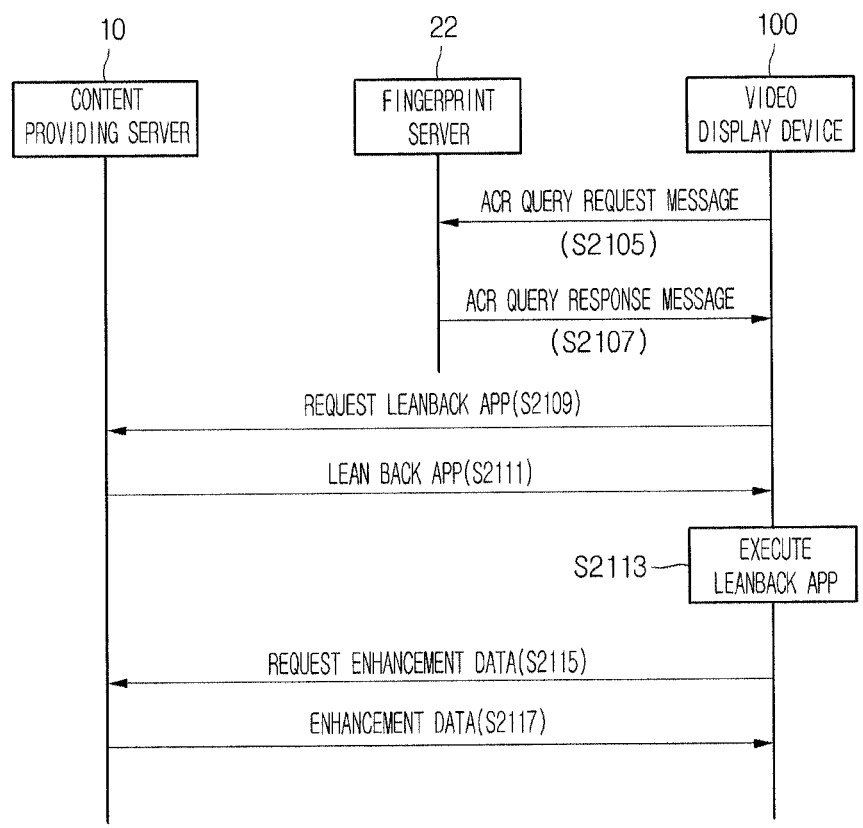

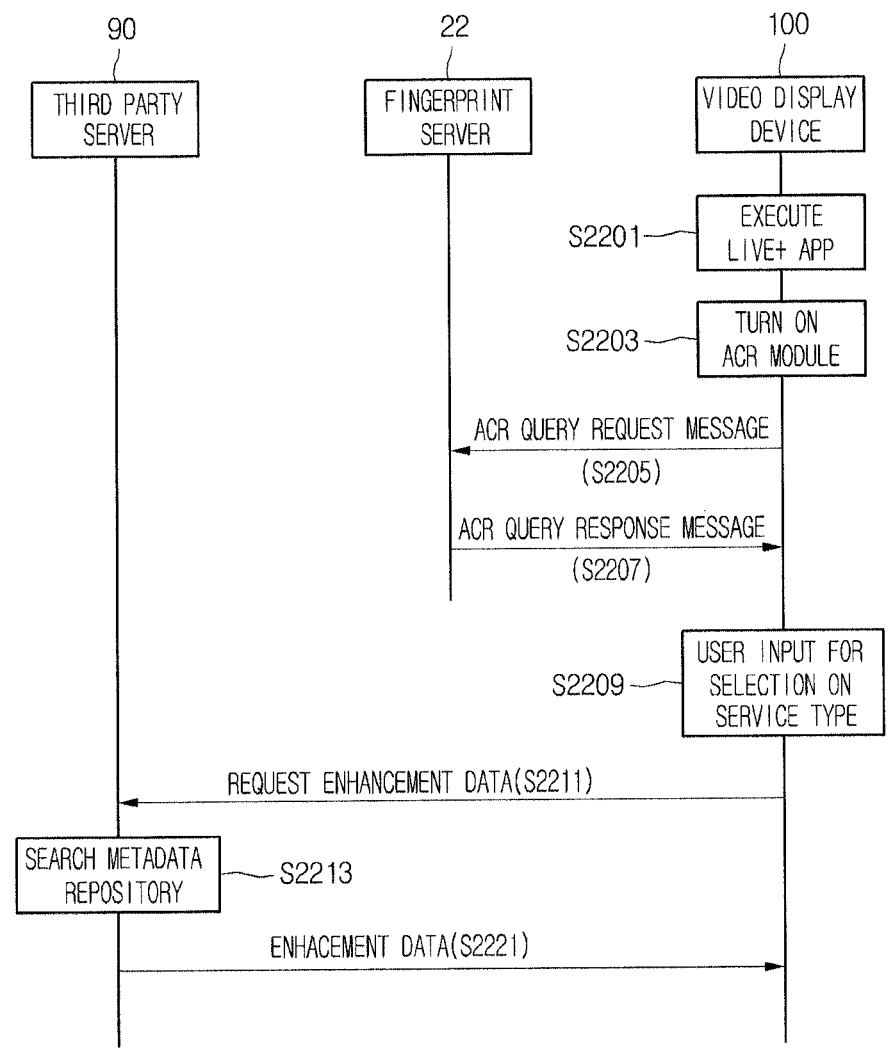
[Fig .23]

[Fig .24]
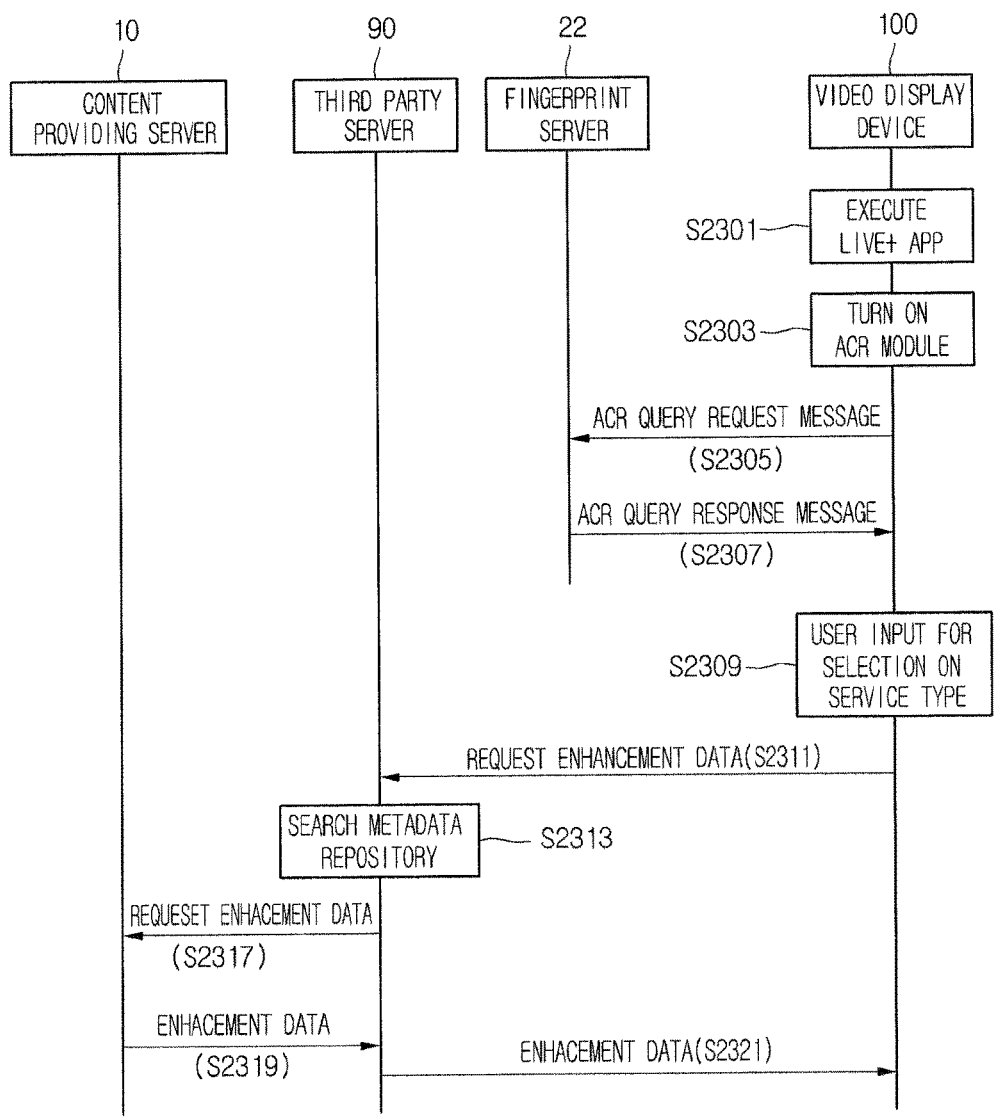

[Fig .25]
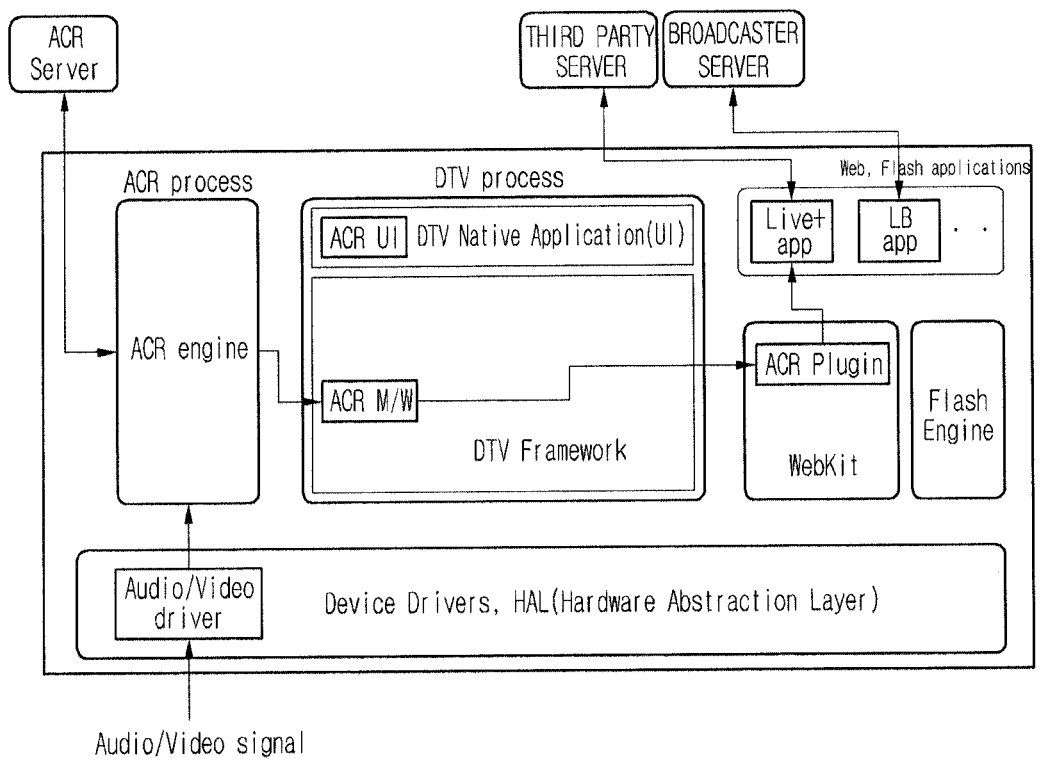

[Fig .26]
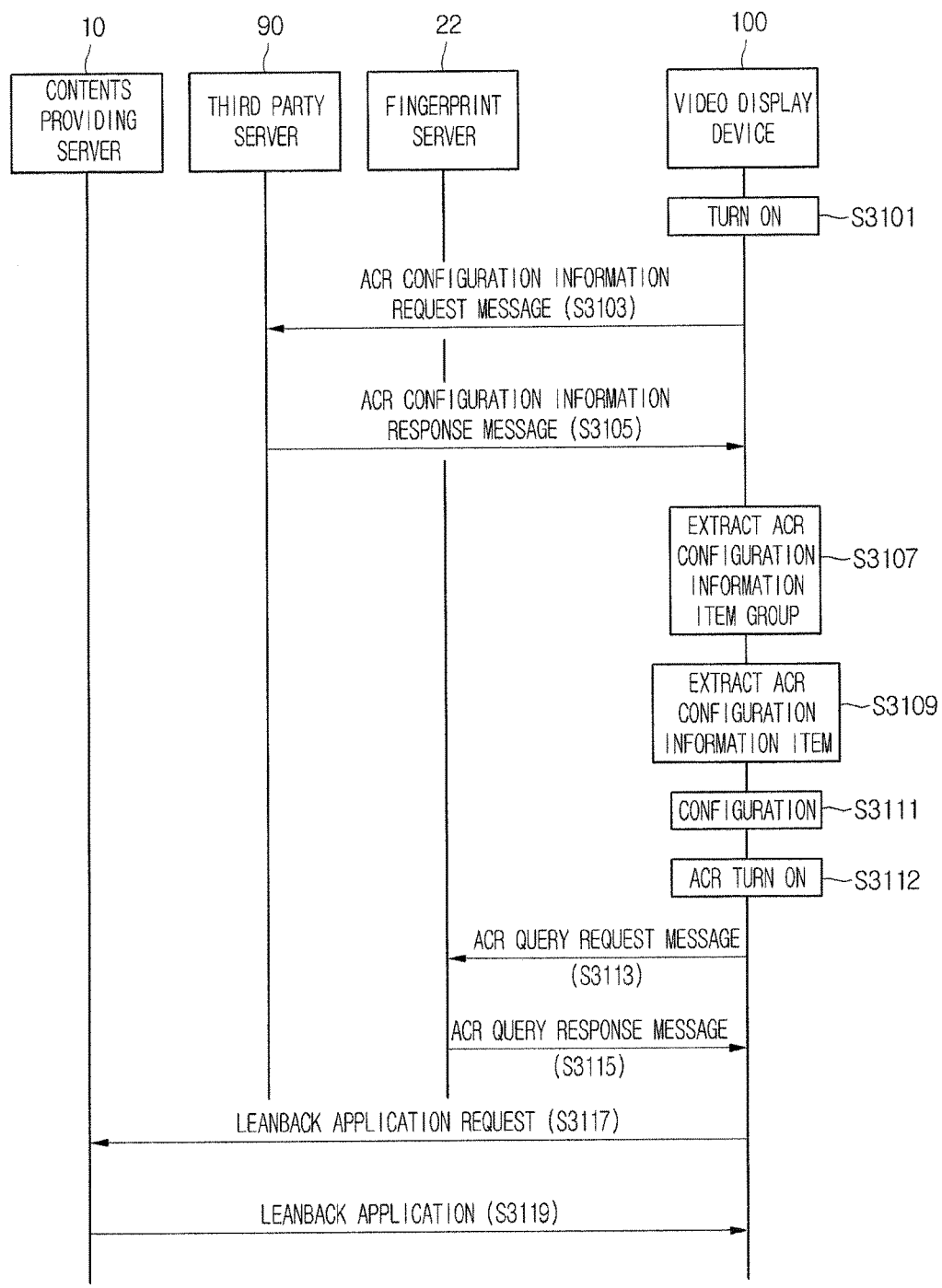

[Fig .27]
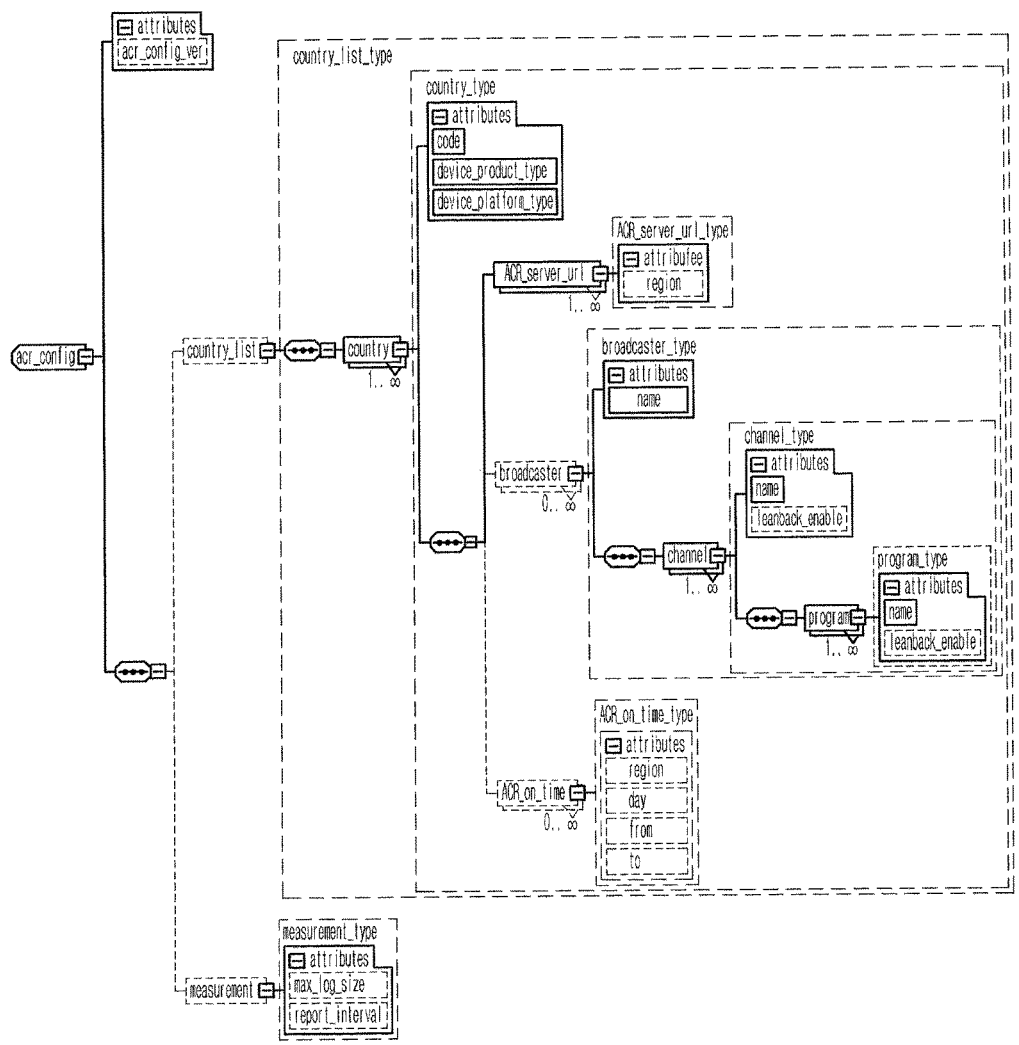

[Fig .28]
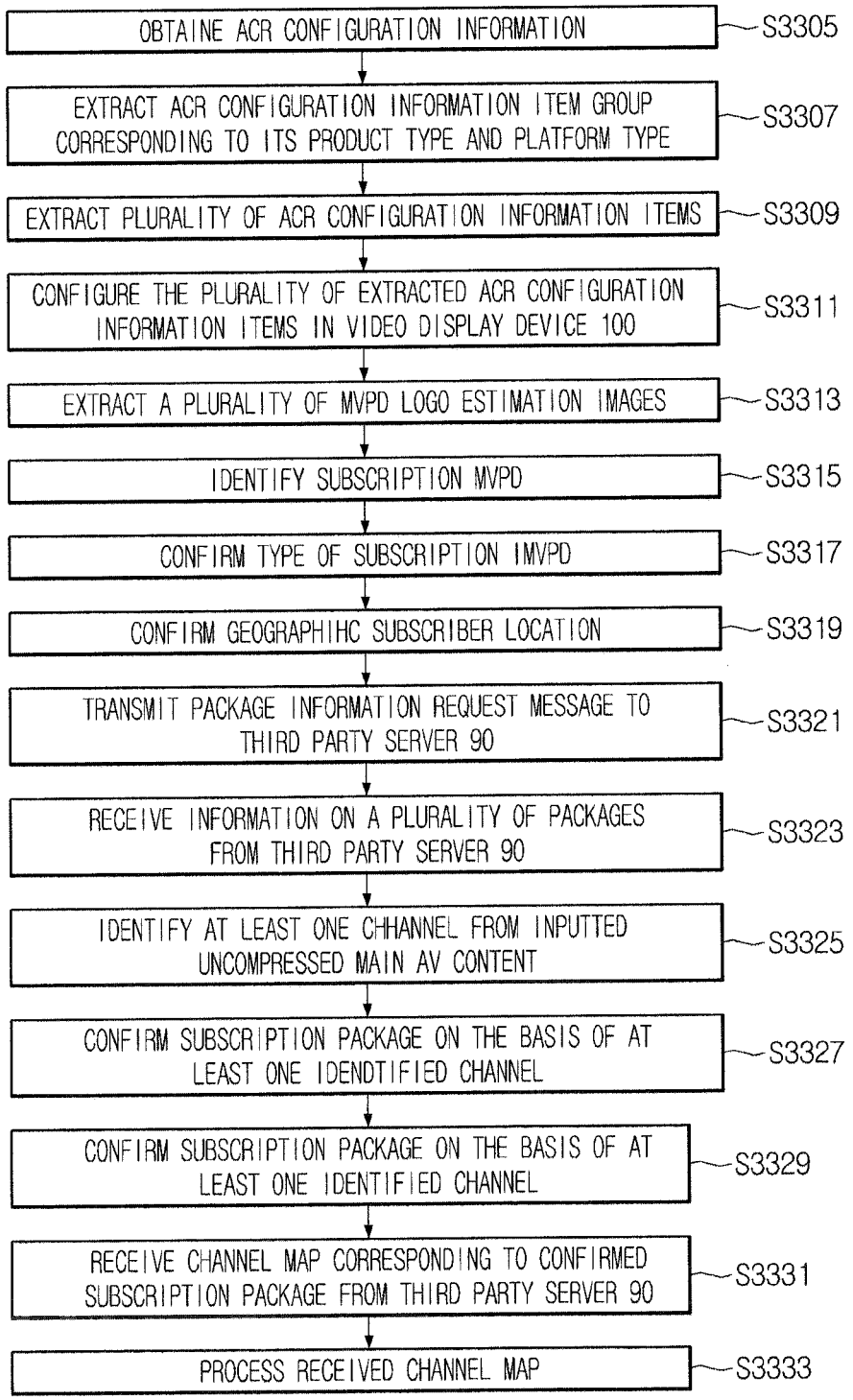

[Fig .29]
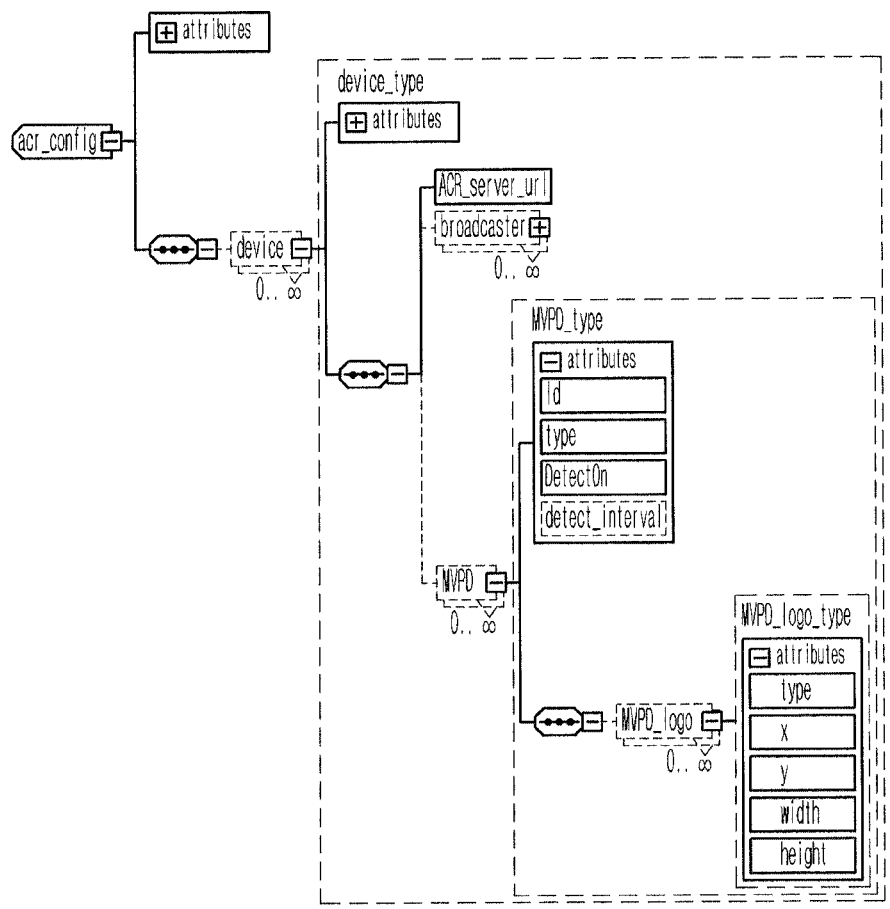

[Fig .30]

[Fig .31]
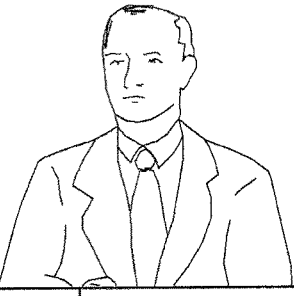

[Fig .32]
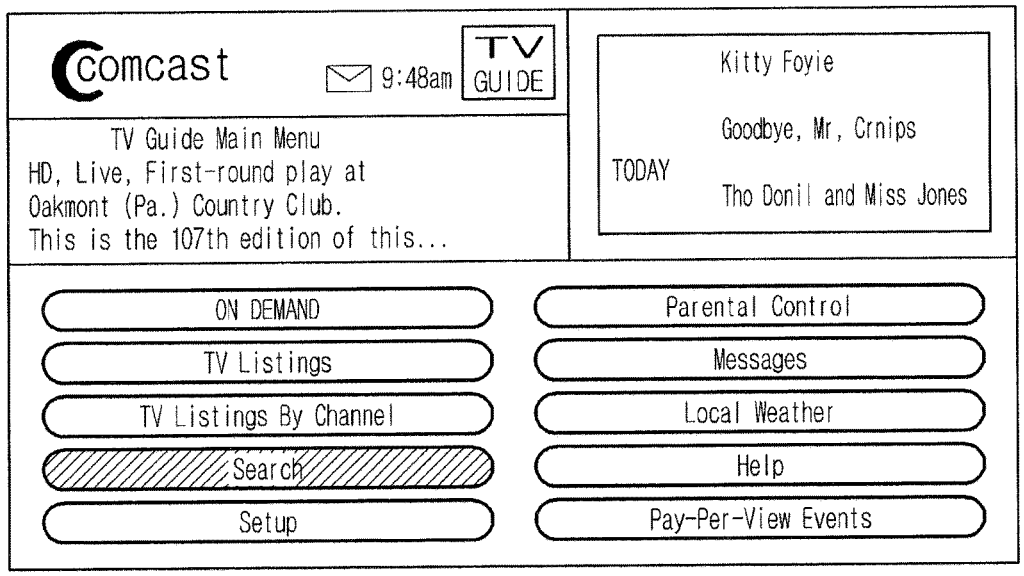

[Fig .33]
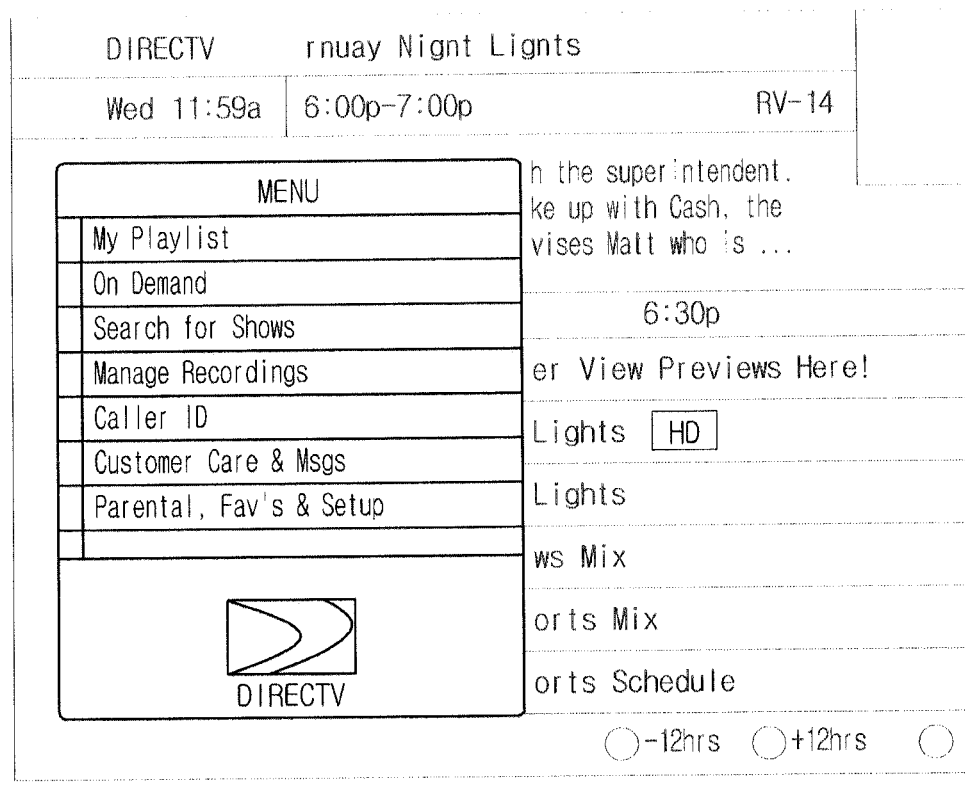

[Fig .34]
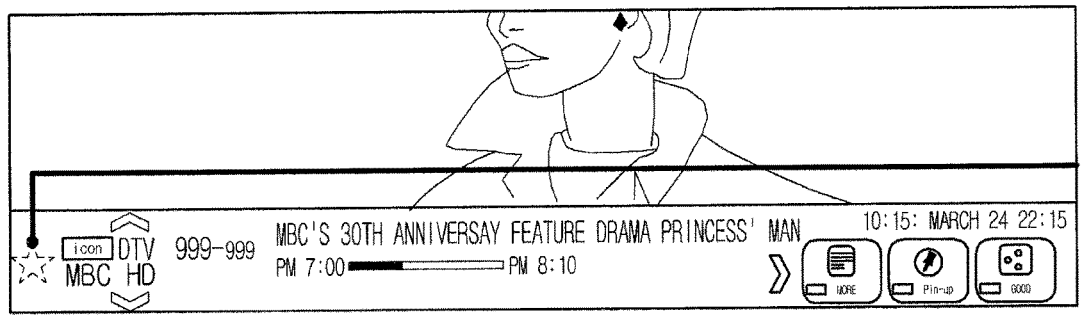

[Fig .35]

| BROADCAST GUIDE | 2010/7/20 P.M 1:59 | | | | | | | | | |
|---|---|---|---|---|---|---|---|---|---|---|
| #COOK VERSION(HD) | | | | | | | | | | |
| DTV 10-1 EBS DTV | 2:11: TUES 20 JULY 2010 1:41 P.M. TO 2:11 P.M. | | | | | | ☐ DETAIL INFORMATION | | | |

| 7/20(TUE) | | 02:00 P.M. | | | | 03:00 P.M. | | | | |
|---|---|---|---|---|---|---|---|---|---|---|
| DTV 6-1 | ◀ ACESS! MOVIE WORLD… | SBS… | | SEE HOME (JULY 20) | | | IDEA HOW MUCH (12 YEARS)… | | | |
| DTV 7-1 | ◀ HUMAN DRAMA… | HD KBS NETWORK SPECIALTIES VETERAN FIRE… | | | … | … | KID SCIENTIST… | | HD HOOTERS… | |
| DTV 9-1 | ◀ HD QUESTIONABL… | HD … | | HD KBS BROADCASTING BOOTH | | | | | HD … | |
| DTV 10-1 | ◀ … | #COOKING VERSION(HD) | … | ELEMENTARY YEAR 1… | ELEMENTARY YEAR 3… | ELEMENTARY YEAR 5 E… | … | FART… | … | … |
| DTV 11-1 | ◀ [HD] MBC WEEKEND PLANNING DRAMA… | | | WOMAN IN THE WORLD… | | | <TV TABLE> KIDS MEAL CLASSROOMS BEST | | | |

✧ MOVE    ◉ BROADCAST INFORMATION    [EXIT] EXIT

[Fig .36]
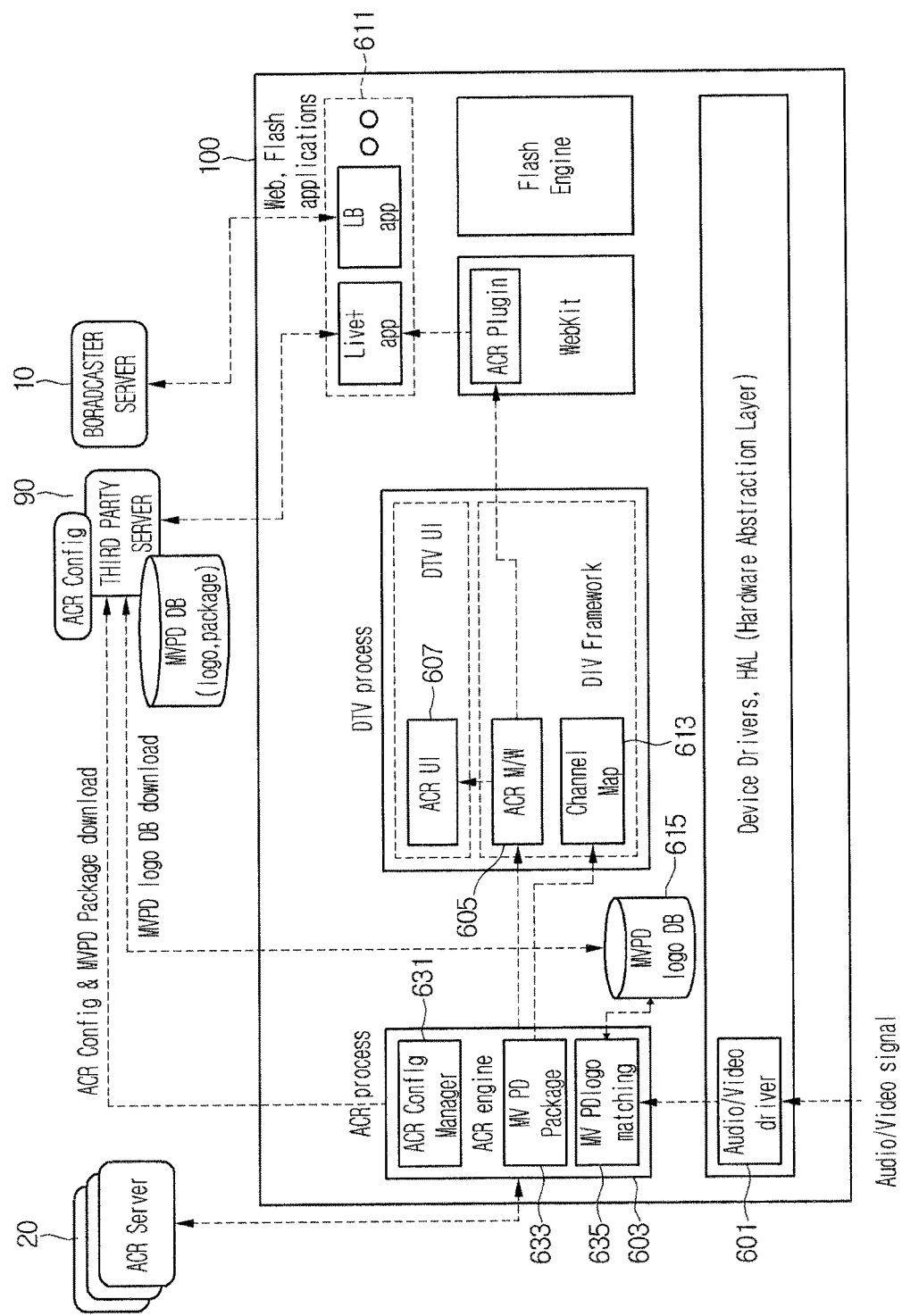

[Fig .37]
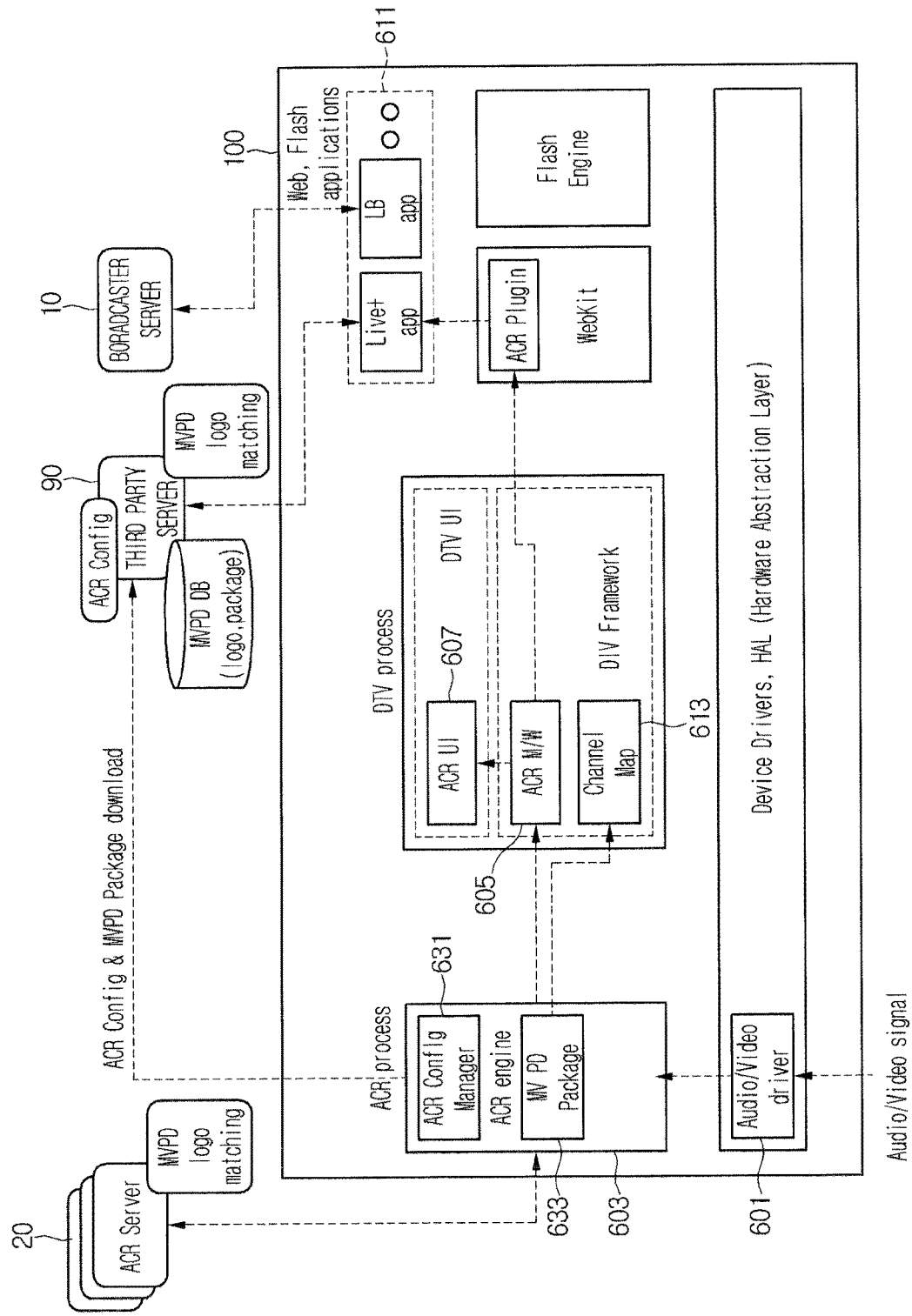

[Fig .38]
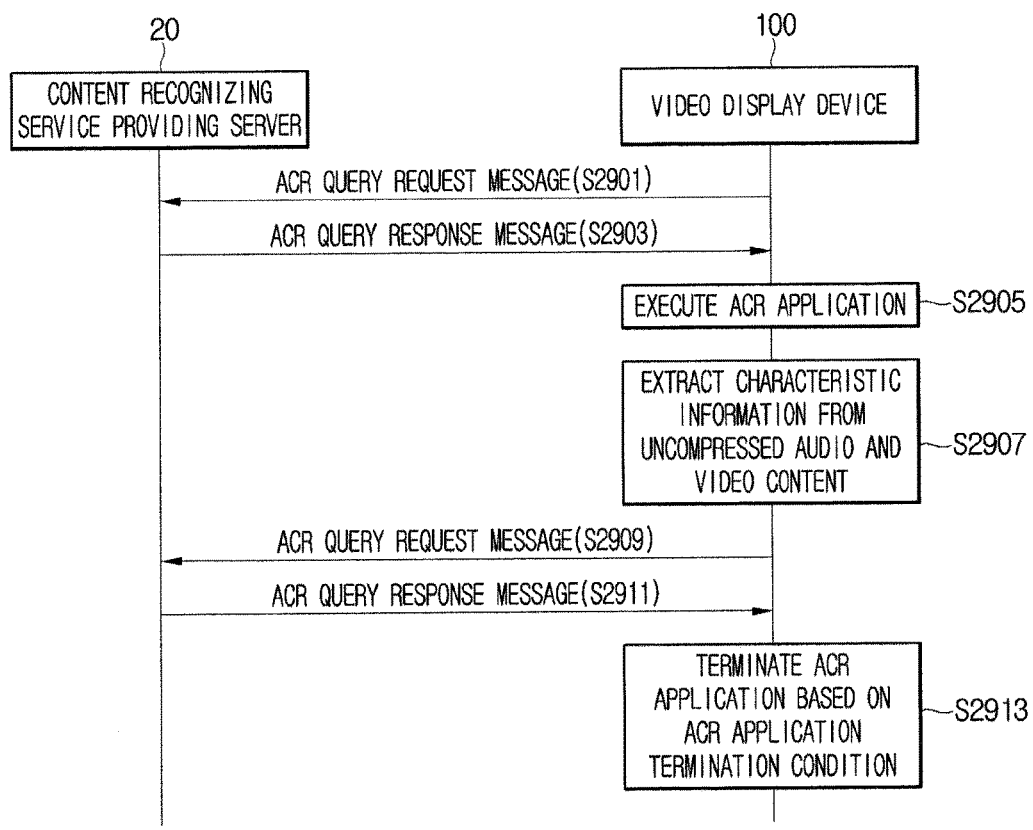

[Fig .39]

|  | Name |
|---|---|
| Property | readonly ACRMetadata metadata |
|  | readonly String backendURL |
| Method | ACRMetadata getACRMetadata() |
|  | String getBackendURL() |
|  | void NotifyACRAppLaunched(Boolean bApp, String url, String dsec) |
|  | void SetAppInfo(String state, String url) |
|  | void SetForceAliveTime(number aliveTime) |
| Event | function onContentChanged(String contentId) |
|  | function onMediaTimeUpdated(Number mediaTime) |
|  | function onAppShow(String state) |
|  | function onAppHide() |

[Fig .40]
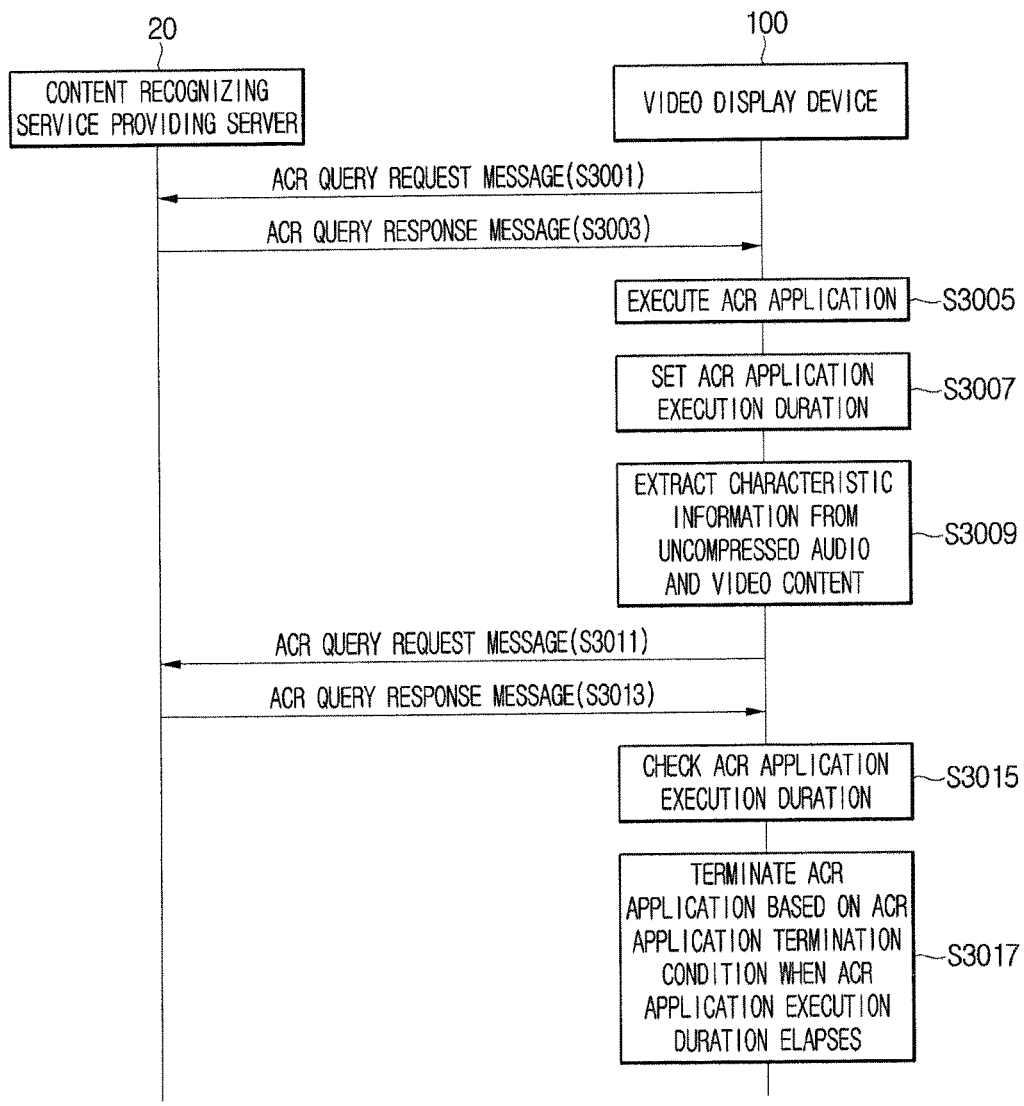

[Fig .41]

|  | Name |
|---|---|
| Property | readonly ACRMetadata metadata |
|  | readonly String backendURL |
| Method | ACRMetadata getACRMetadata() |
|  | String getBackendURL() |
|  | void NotifyACRAppLaunched(Boolean bApp, String url, String dsec) |
|  | void SetAppInfo(String state, String url) |
|  | void SetForceAliveTime(number aliveTime) |
|  | void SetKeepingAppSession(Boolean bApp) |
| Event | function onContentChanged(String contentId) |
|  | function onMediaTimeUpdated(Number mediaTime) |
|  | function onAppShow(String state) |
|  | function onAppHide() |
|  | function onSelectAppClose() |

[Fig .42]
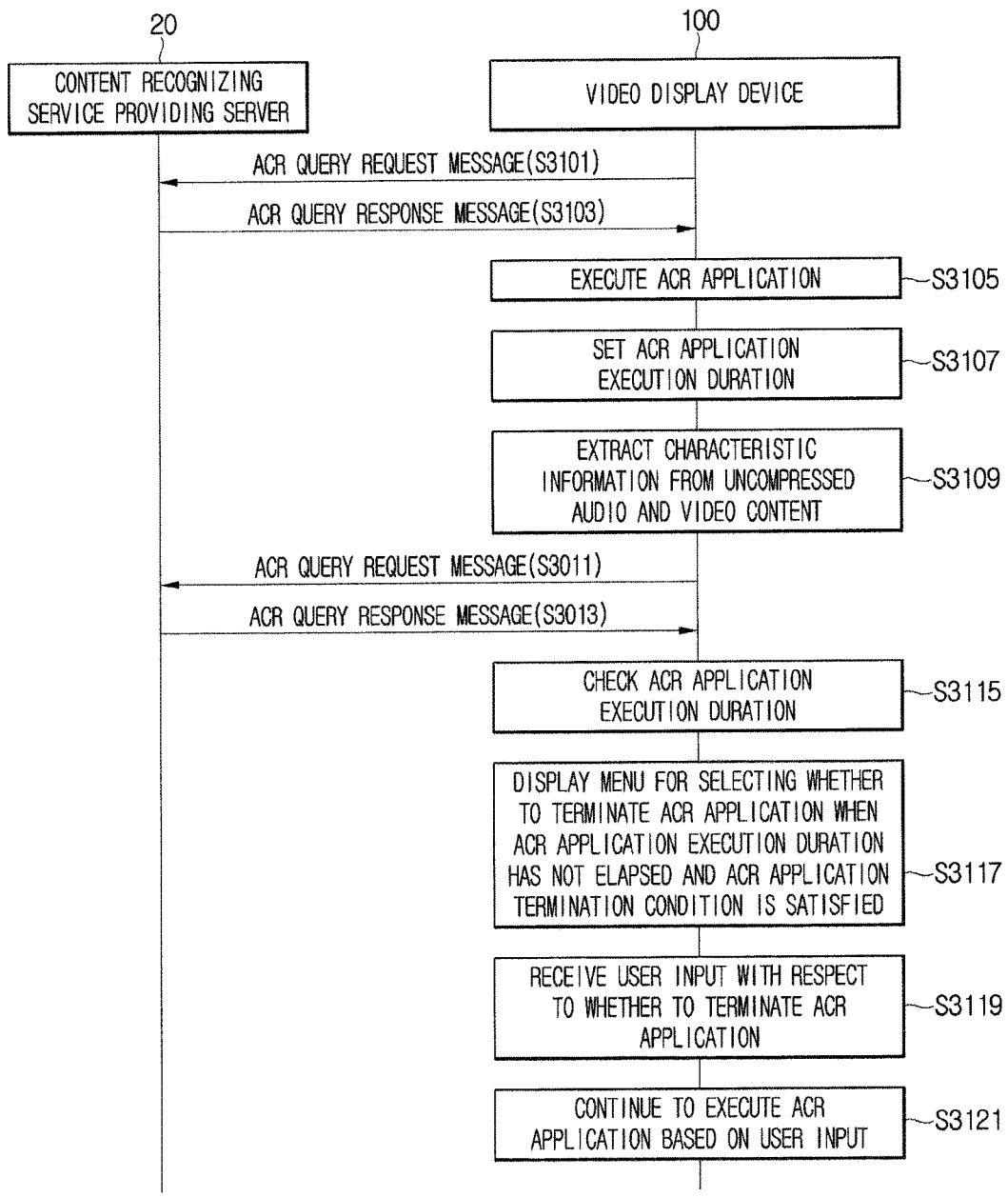

[Fig .43]

|  | Name |
|---|---|
| Property | readonly ACRMetadata metadata |
|  | readonly String backendURL |
| Method | ACRMetadata getACRMetadata() |
|  | String getBackendURL() |
|  | void NotifyACRAppLaunched(Boolean bApp, String url, String dsec) |
|  | void SetAppInfo(String state, String url) |
|  | void SetForceAliveTime(number lifeTime) |
|  | void SetKeepingAppSession(Boolean bApp) |
|  | void SetTVBrowserClose(void) |
| Event | function onContentChanged(String contentId) |
|  | function onMediaTimeUpdated(Number mediaTime) |
|  | function onAppShow(String state) |
|  | function onAppHide() |
|  | function onSelectAppClose() |

[Fig .44]
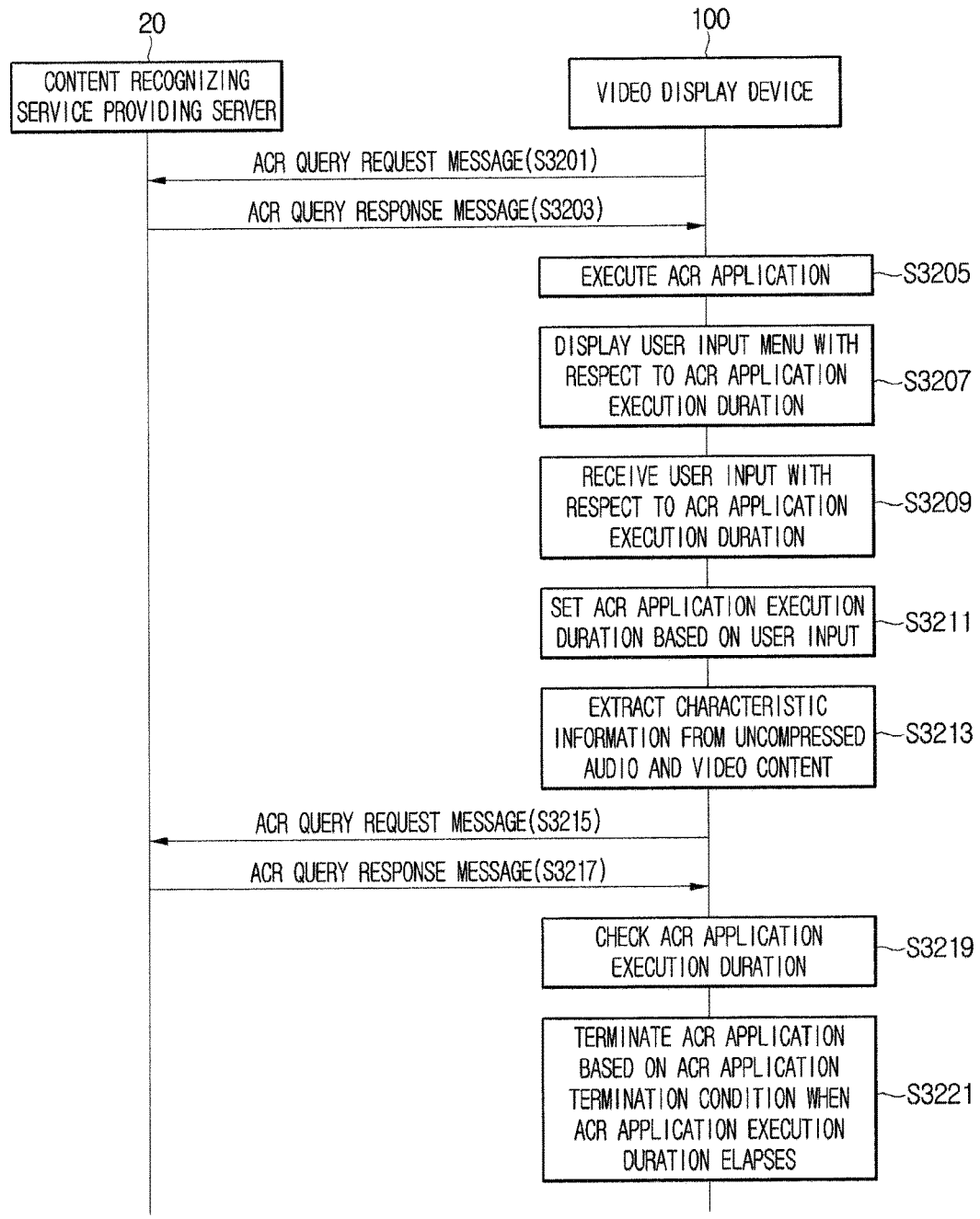

[Fig .45]
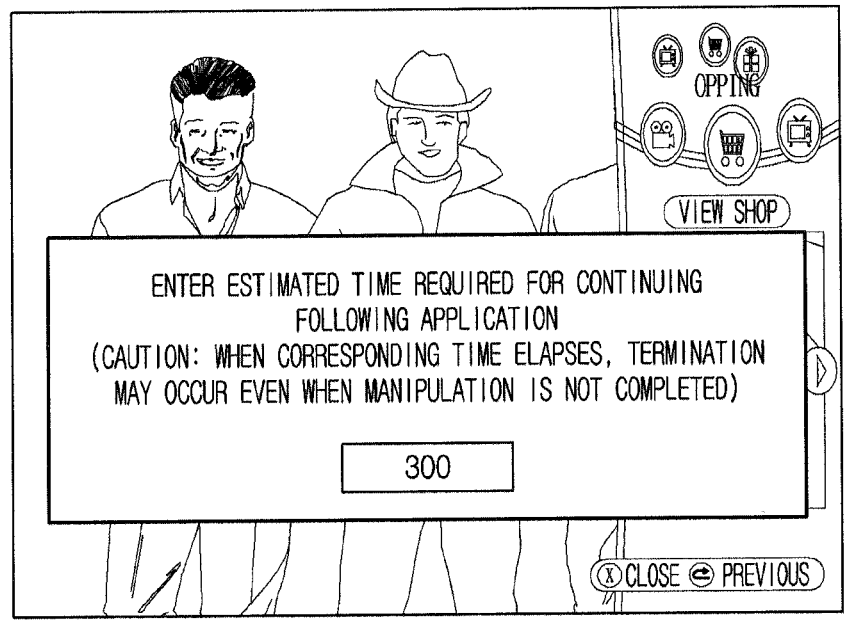

[Fig .46]

[Fig .47]
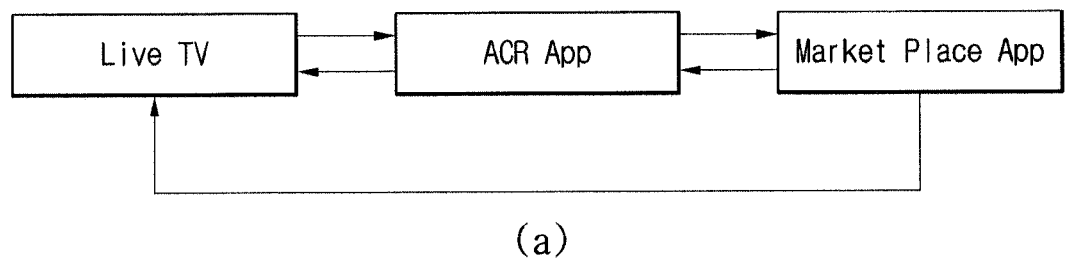
(a)
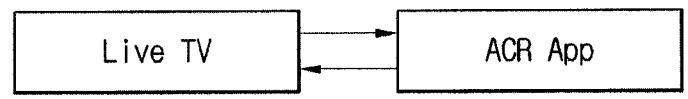
(b)

[Fig .48]
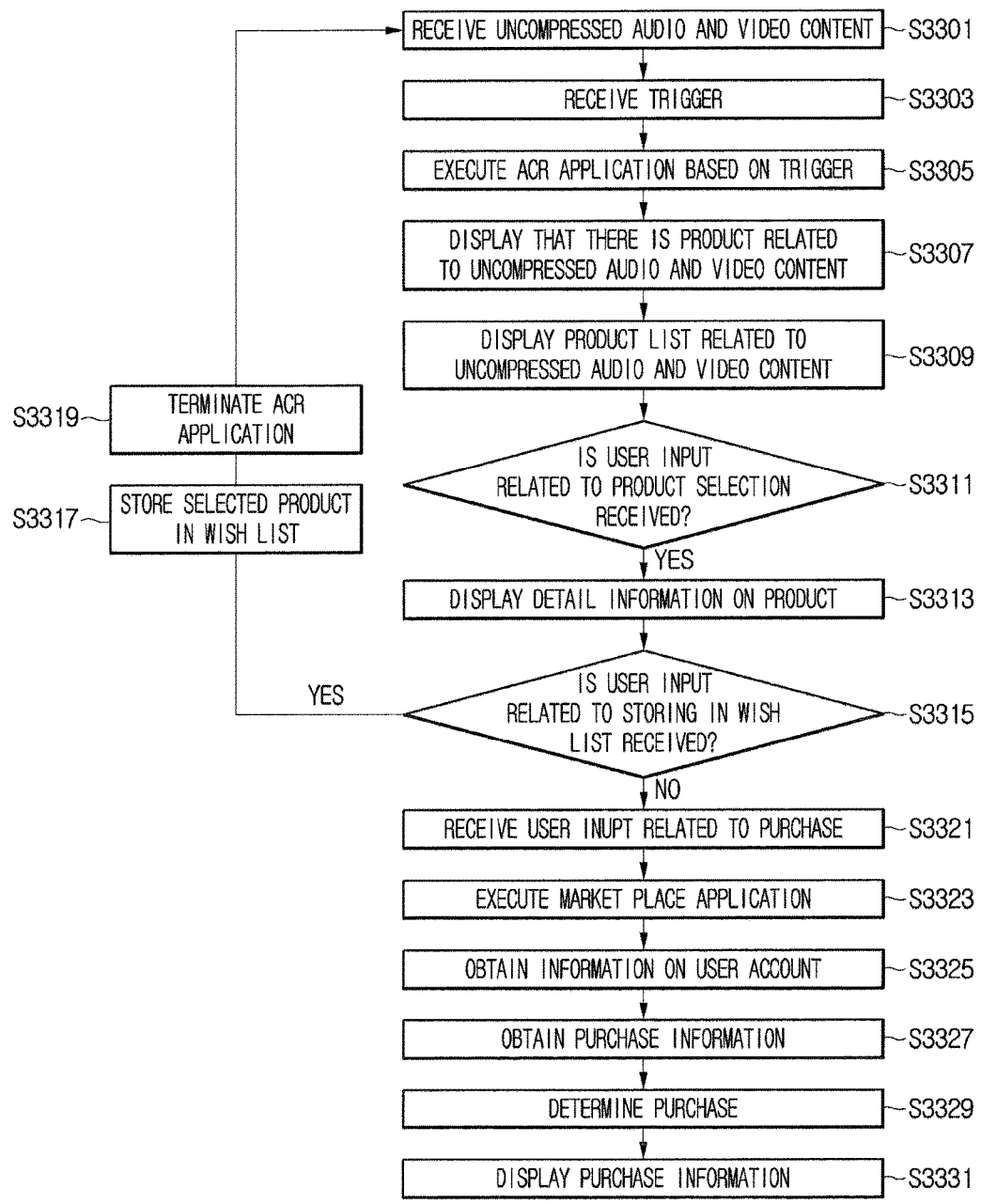

[Fig .49]
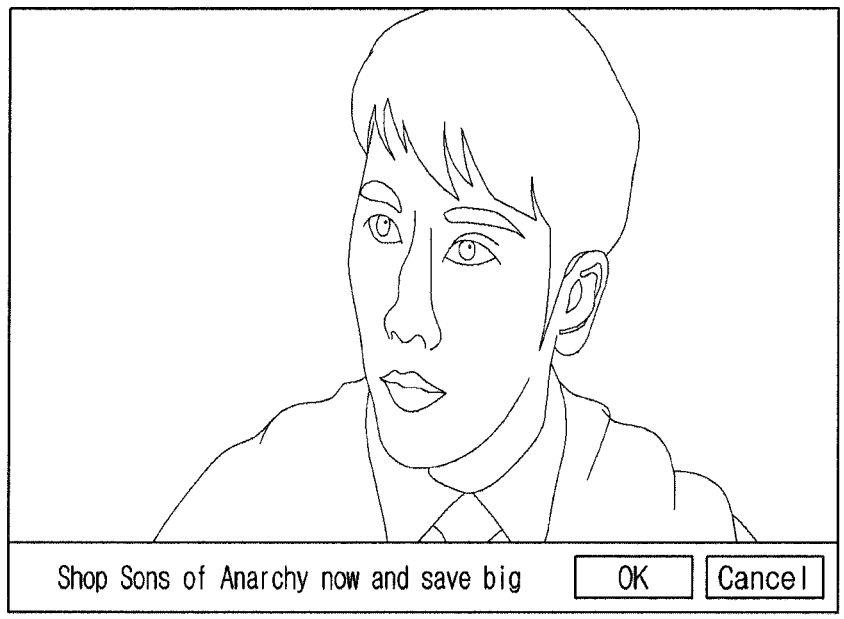

[Fig. 50A]
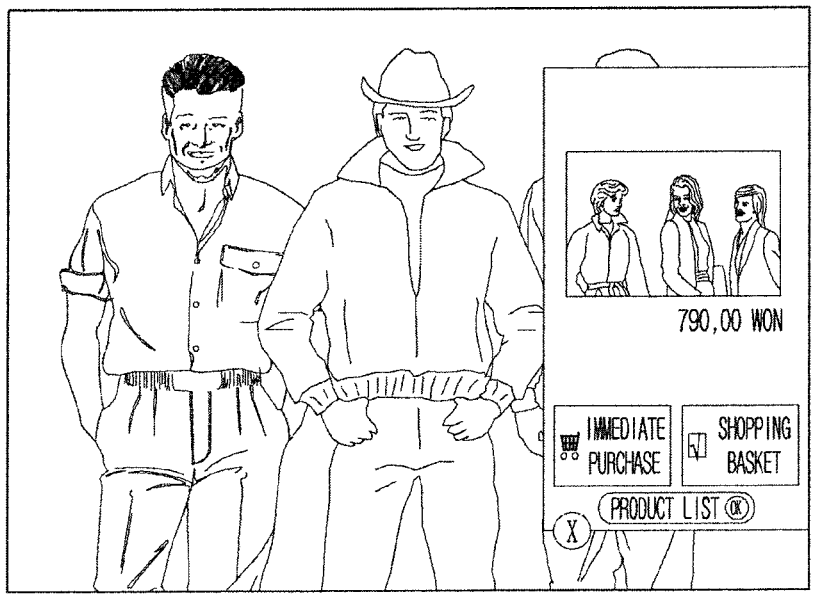
[Fig. 50B]

[Fig .51]
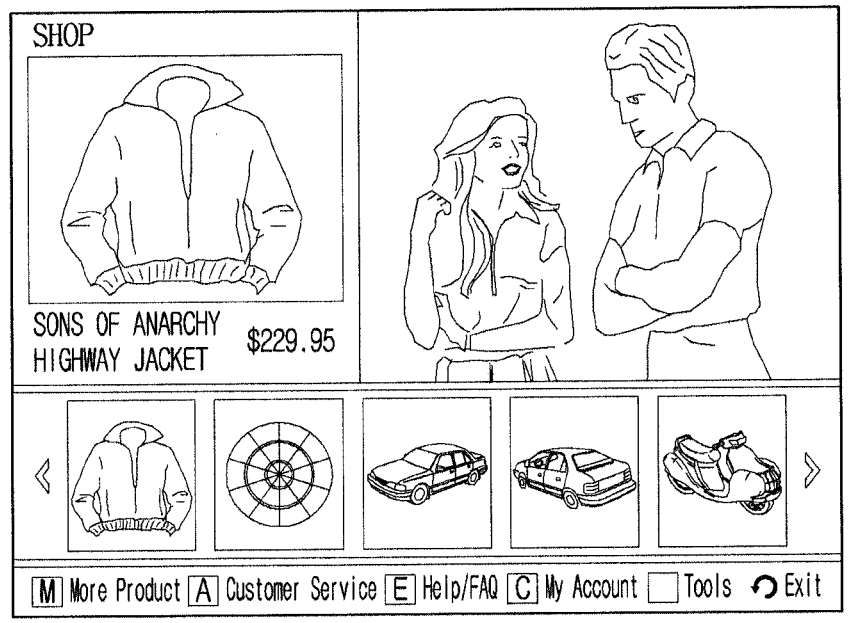

[Fig .52]

[Fig .53]
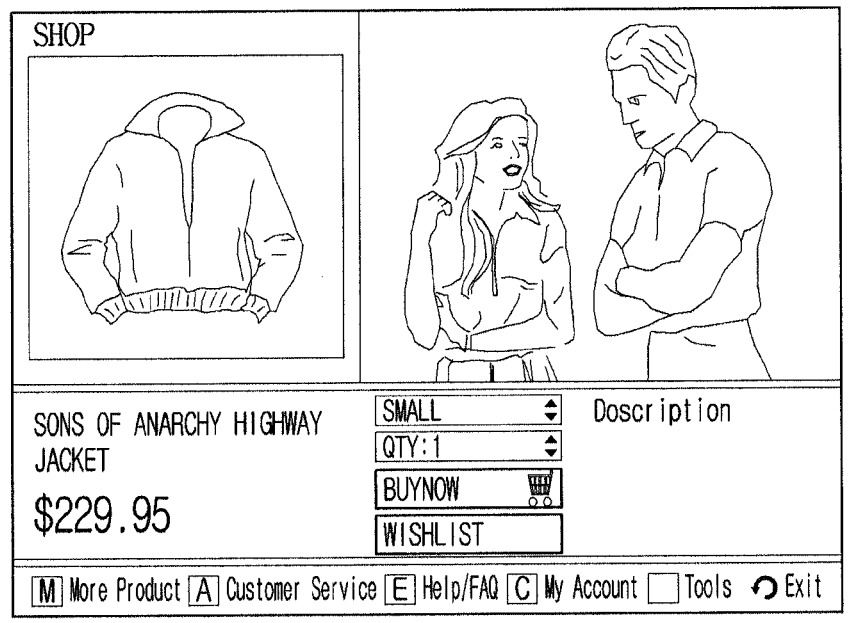

[Fig .54]
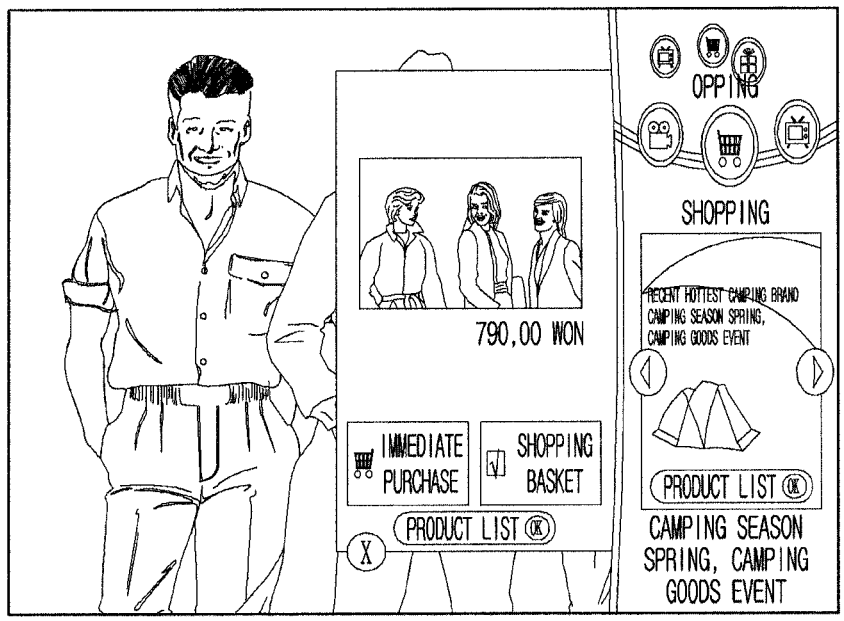

[Fig .55]

| SHOP | | 🛒 ❓ |
|---|---|---|
| | How would you like to checkout? | |
| ShopTV Sign In<br>Phone Number<br>[XXX-XXX-XXXX] ❓<br>Zip Code<br>[5 digits] ❓<br>[Sign in] | On your Smartphone? ⓞⓡ<br>Enter your mobile number to continue checkout, standard Text message rates apply.<br>Mobile<br>[XXX-XXX-XXXX] ❓ | On your tv?<br>Enter your payment info on screen using your TV remote control<br>[Checkout Now] |
| ☐VISA ☐DISCOVER | No Smartphone?<br>No problem! [Send] | |
| | Order by Phone: 1-800-380-5697 | |
| | [A] Home ↻ Return ☐ Exit | |

[Fig .56]

| SHOP | |
|---|---|
| Enter Billing info provide shipping and payment information. You can save your info as you go for faster checkout next time using your Shop TV Member Account. | Credit Card<br>*Credit Card Number<br>`XXXX-XXXX-XXXX-XXXX-X`<br>*Expiration Date<br>`MM`  `YY`<br>Secuity Code<br>`123` ⊙<br>☑ Save Payment info<br>Shipping Address<br>*First Name<br>`JORDAN`<br>*Last Name<br>`DEGRAZIA` |

[A] Home  ↻ Return  ☐ Exit

[Fig .57]

| SHOP | | | | |
|---|---|---|---|---|
| SHIPPING ADDRESS | CART REVIEW | | | EDIT CART |
| JARED WOLF 464 S. SAULS. ⇅ | ITEM | ITEM | UNIT PRICE | PRICE |
| SHIPPING METHOD | Barbie Collector Holiday 2012 Barbie Doll | 1 | $29.95 | $29.95 |
| STANDARD (2-6 DAYS)$5.95 ⇅ | | | | |
| PAYMENT METHOD | | | | |
| VISA: 2636 ⇅ | | | | |
| EDIT PAYMENT METHOD | | | | |
| | | | TOTAL | $68.95 |
| | CONTINUE SHOPPING | PLACE ORDER | | |
| | | [A] Home  ↻ Return  ☐ Exit | | |

[Fig .58]

[Fig .59]

[Fig .60]
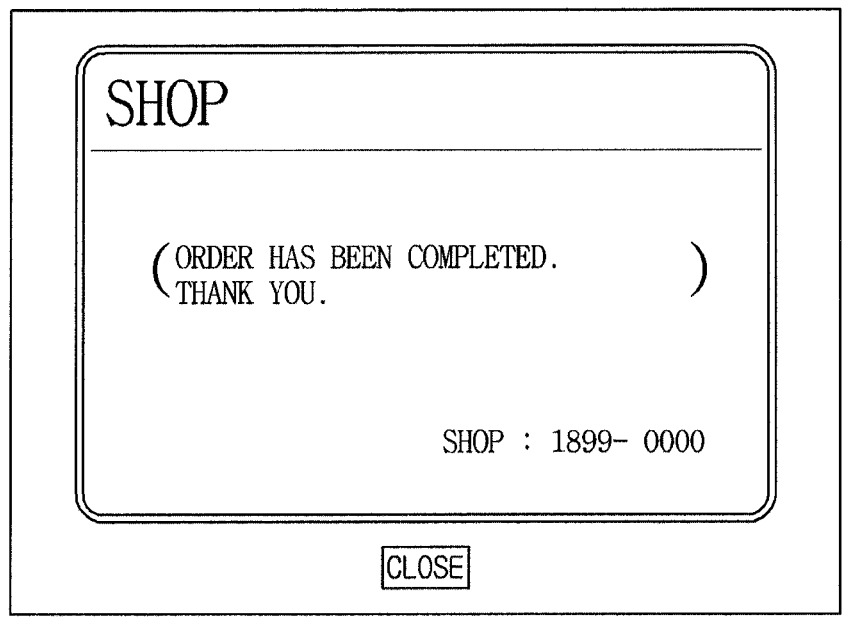

[Fig .61]
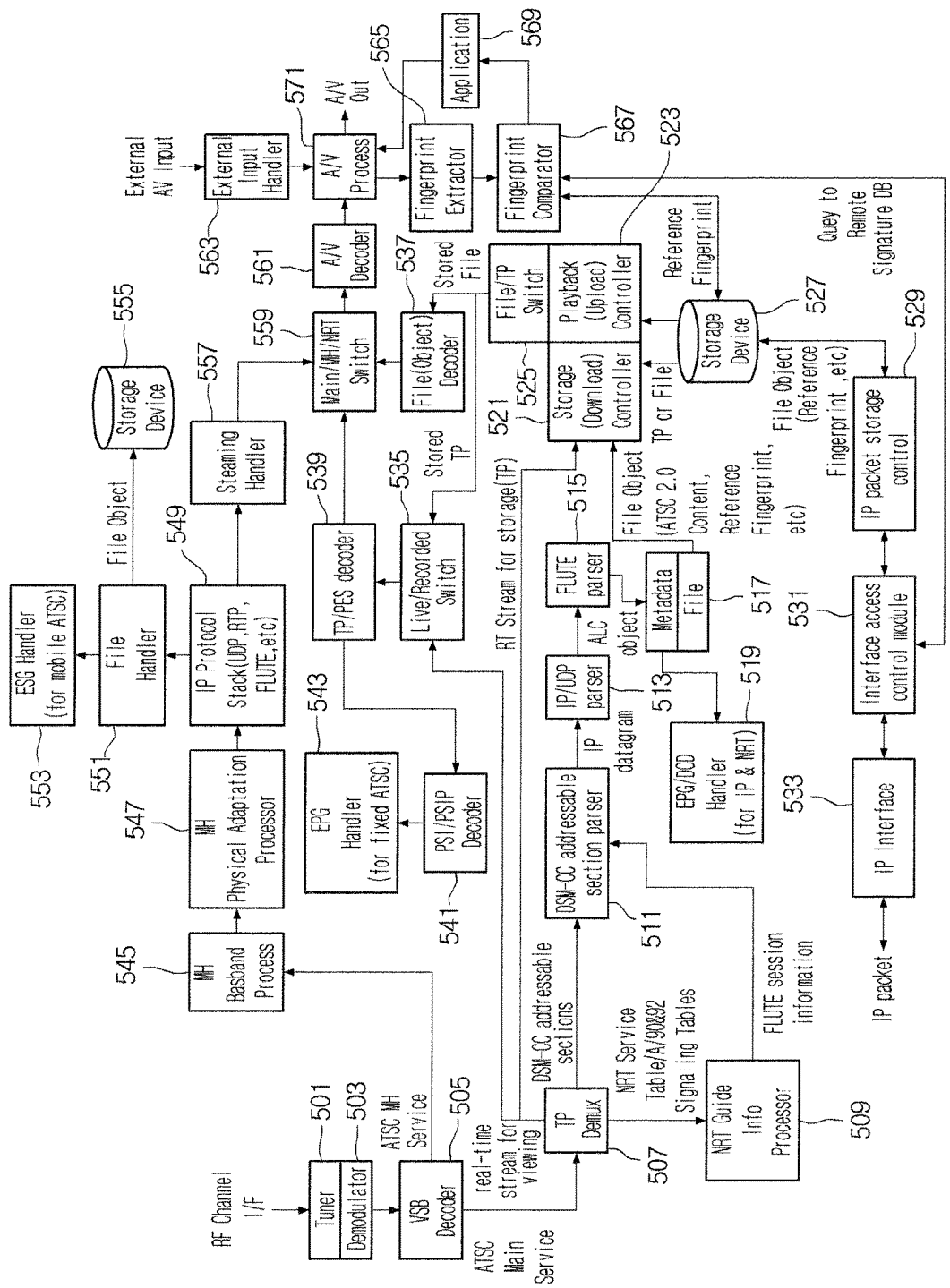

[Fig .62]
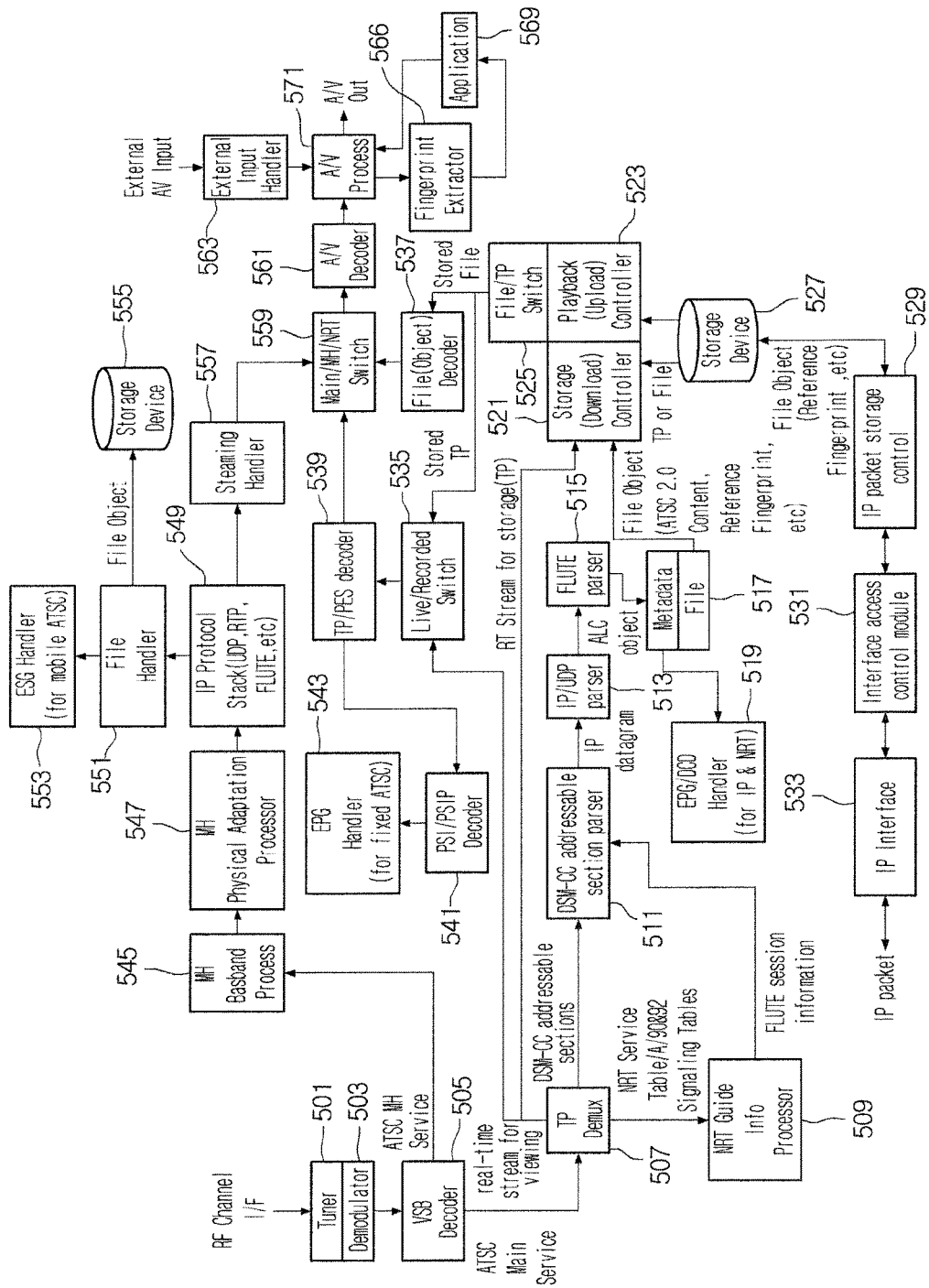

IMAGE DISPLAY DEVICE AND METHOD FOR OPERATING SAME

CROSS REFERENCE TO RELATED APPLICATIONS

This application is the National Phase of PCT International Application No. PCT/KR2014/005089, filed on Jun. 10, 2014, which claims priority under 35 U.S.C. 119(e) to U.S. Provisional Application No. 61/833,935, filed on Jun. 12, 2013 and 61/846,087 filed on Jul. 15, 2013, all of which are hereby expressly incorporated by reference into the present application.

TECHNICAL FIELD

The present disclosure relates to a video display device and an operating method thereof.

BACKGROUND ART

As digital broadcasting is paving the way for its extensive spread, a broadcasting station transmits both main audio-visual (AV) contents and enhanced service data, which may be linked to the main audio and video contents to provide information and services or may be separately provided for other purposes.

However, a video display device in each home may unlikely receive broadcast signals directly through air under a current broadcasting environment. Rather, most of cases, a video display device in each home is connected to a broadcast receiving device to display uncompressed audio-visual contents that the broadcast receiving device provides.

Additionally, the broadcast receiving device receives contents from a server (called a Multichannel Video Programming Distributor (MVPD)). The MVPD receives a broadcast signal from a broadcasting station, extracts contents from the received broadcast signal, converts the extracted content into signals having a proper format for transmission, and provides the converted signals to a broadcast receiving device. During these processes, the MVPD may exclude extracted enhanced service data or may add another enhanced service data, so that the broadcasting receiving device is compelled to receive an enhanced service dependent on the MVPD.

The MVPD provides a plurality of channels, which are provided by contents providers, to a broadcast receiving device.

Since the broadcast receiving device extracts main AV data from signal received from the MVPD and provides only uncompressed audio-visual data to a video display device, only enhanced services provided from the broadcast receiving device not the video display device are available.

DISCLOSURE OF THE INVENTION

Technical Problem

Embodiments provide a video display device that efficiently operates an application associated with uncompressed audio and video content, and an operating method thereof. In particular, embodiments provide a video display device that efficiently controls the duration of an application associated with uncompressed audio and video content, and an operating method of a video display device.

Technical Solution

In one embodiment, a method of operating a video display device including a display unit includes obtaining uncompressed audio and video content; receiving first content information including a trigger based on first characteristic information extracted from the uncompressed audio and video content; executing an application related to the uncompressed audio and video content based on the trigger; receiving second content information related to the uncompressed content based on second characteristic information extracted from the uncompressed audio and video content; and terminating the application when the content information satisfies an application termination condition.

The terminating of the application may include determining whether to change the uncompressed content; and terminating the application when the uncompressed content is changed.

The determining of the uncompressed content may include comparing content identification information in the first content information with content identification information in the second content information.

The method may further include receiving third content information related to the uncompressed content based on third characteristic information extracted from the uncompressed audio and video content; and re-executing the terminated application when the content identification information in the first content information is a same as content identification information in the third content information.

The re-executing of the terminated application may include re-executing the terminated application from an execution point where the application is terminated.

The determining of the uncompressed content may include determining whether to change the uncompressed content based on a fade out of audio or video in the uncompressed content.

The terminating of the application may include determining whether to change a content provider of the uncompressed content; and terminating the application when the content provider of the uncompressed content is changed.

The determining of whether to change the content provider of the uncompressed content may include comparing content provider identification information in the first content information with content provider identification information in the second content information.

The terminating of the application may include determining whether to change a channel of the uncompressed content; and terminating the application when the channel of the uncompressed content is changed.

The determining of whether to change the channel of the uncompressed content may include comparing channel identification information in the first content information with channel identification information in the second content information.

The terminating of the application may include terminating the application when the second content information represents content recognition failure.

The executing of the application related to the uncompressed audio and video content based on the trigger may include setting an execution duration being a minimum time for which an execution state is maintained, from when the application termination condition is satisfied for a first time after execution of the application, to when the application is terminated, and if the content information satisfies the application termination condition, the terminating of the application may include terminating the application when the execution duration elapses.

The setting of the execution duration may include setting an execution duration based on a characteristic of the application.

The terminating of the application may include terminating the application when the execution duration elapses.

In another embodiment, a video display device includes a reception unit obtaining uncompressed audio and video content; a display unit displaying the uncompressed audio and video content; and an enhanced service management unit receiving first content information including a trigger based on first characteristic information extracted from the uncompressed audio and video content, executing an application related to the uncompressed audio and video content based on the trigger, receiving second content information related to the uncompressed content based on second characteristic information extracted from the uncompressed audio and video content, and terminating the application when the content information satisfies an application termination condition.

Advantageous Effects

According to an embodiment of the present invention, an enhanced service independent from an MVPD is provided. Especially, according to an embodiment of the present invention, even when a broadcaster or a content provider does not provide enhanced service, the enhanced service is provided through a third party server independent from the broadcaster or the content provider.

Additionally, according to various embodiments of the present invention, main audio and video content related information search, chatting, news search, digital media download, product catalogue download, and product purchase are possible without an inconvenient text input through a remote controller.

Additionally, according to an embodiment of the present invention, an enhanced service exceeding the bandwidth of a wireless channel is provided.

A video display device according to an embodiment of the present invention may obtain a channel map on the basis of uncompressed AV data inputted through an external input.

A third party server according to an embodiment of the present invention provides information on whether to allow a leanback app to a video display device in order to prevent the leanback app from seriously affecting the stability of the video display device.

By notifying the URL address of an ACR server that is locally close to a video display device according to an embodiment of the present invention, the video display device performs contents recognition fast and reduces network latency.

A third party server according to an embodiment of the present invention may prevent unnecessary resource consumption by providing information on an ACR on time interval to a video playback device.

A video display device according to an embodiment may efficiently control an application associated with uncompressed audio and video content.

A video display device according to an embodiment may efficiently control the duration of an application associated with uncompressed audio and video content.

BRIEF DESCRIPTION OF THE DRAWINGS

FIG. 1 is a block diagram illustrating the network topology according to the embodiment.

FIG. 2 is a block diagram illustrating a watermark based network topology according to an embodiment.

FIG. 3 is a ladder diagram illustrating a data flow in a watermark based network topology according to an embodiment.

FIG. 4 is view illustrating a watermark based content recognition timing according to an embodiment.

FIG. 5 is a block diagram illustrating a fingerprint based network topology according to an embodiment.

FIG. 6 is a ladder diagram illustrating a data flow in a fingerprint based network topology according to an embodiment.

FIG. 7 is a view illustrating an XML schema diagram of ACR-Resulttype containing a query result according to an embodiment.

FIG. 8 is a block diagram illustrating a watermark and fingerprint based network topology according to an embodiment.

FIG. 9 is a ladder diagram illustrating a data flow in a watermark and fingerprint based network topology according to an embodiment.

FIG. 10 is a block diagram illustrating the video display device according to the embodiment.

FIG. 11 is a flowchart illustrating a method of synchronizing a playback time of a main audio and video content with a playback time of an enhanced service according to an embodiment.

FIG. 12 is a conceptual diagram illustrating a method of synchronizing a playback time of a main audio and video content with a playback time of an enhanced service according to an embodiment.

FIG. 13 is a screen when an auto playing application is executed according to an embodiment.

FIG. 14 is a screen when a content provider application is executed according to an embodiment.

FIG. 15 is a view of a user interface for controlling an ACR function according to an embodiment.

FIG. 16 is a flowchart illustrating a method of controlling a video display device according to the embodiment.

FIG. 17 is a view illustrating a network topology according to an embodiment of the present invention.

FIG. 18 is a view illustrating a Live+ app according to various embodiments of the present invention.

FIG. 19 is a view illustrating a method of executing a Live+ app according to various embodiments of the present invention.

FIG. 20 is a view illustrating a tab function of a Live+ app according to an embodiment of the present invention.

FIG. 21 is a view illustrating an architecture of the third party server 90 according to an embodiment of the present invention.

FIG. 22 is a ladder diagram illustrating an operation of a video display device for an automatic execution application according to an embodiment of the present invention.

FIG. 23 is a ladder diagram illustrating an operation of a video display device for a channel-independent application according to an embodiment of the present invention.

FIG. 24 is a ladder diagram illustrating an operation of a video display device for a channel-independent application according to another embodiment of the present invention.

FIG. 25 is a conceptual diagram illustrating a video display device according to an embodiment of the present invention.

FIG. 26 is a ladder diagram illustrating an operation of a video display device according to another embodiment of the present invention.

FIG. 27 is an XML schema diagram of ACR configuration information according to an embodiment of the present invention.

FIG. 28 is a ladder diagram illustrating an operation of a video display device according to another embodiment of the present invention.

FIG. 29 is an XML schema diagram of ACR configuration information according to an embodiment of the present invention.

FIG. 30 is a view of an EPG window displaying the MVPD logo of Dish Network, a satellite operator, according to an embodiment of the present invention.

FIG. 31 is a view of an EPG window displaying the MVPD logo of Comcast, a Cable operator, according to an embodiment of the present invention.

FIG. 32 is a view of an EPG window displaying the MVPD logo of Comcast, a Cable operator, according to an embodiment of the present invention.

FIG. 33 is a view of a menu window displaying the MVPD logo of DirecTV, a satellite operator, according to an embodiment of the present invention.

FIG. 34 is a view of channel map processing according to an embodiment of the present invention.

FIG. 35 is a view of channel map processing according to an embodiment of the present invention.

FIG. 36 is a conceptual diagram of a video display device according to an embodiment of the present invention.

FIG. 37 is a conceptual diagram of a video display device according to an embodiment of the present invention.

FIG. 38 shows how a video display device executes and terminates an ACR application according to an embodiment.

FIG. 39 shows an ACR plug-in interface to which a duration related method is added according to another embodiment.

FIG. 40 shows how a video display device executes an ACR application and performs exceptional handling related to the termination of the ACR application according to still another embodiment.

FIG. 41 shows an ACR plug-in interface to which a method and an event are been added which are required in order to enable a user to select whether to terminate an ACR application according to still another embodiment.

FIG. 42 shows how a video display device determines based on a user input whether to terminate an ACR application according to still another embodiment.

FIG. 43 shows an ACR plug-in interface to which a method is added which is required in order to enable an ACR application to terminate a browser according to still another embodiment.

FIG. 44 shows how a video display device determines the duration of an ACR application based on a user input according to still another embodiment.

FIG. 45 shows a graphic user interface of a video display device that receives a user input related to the duration of an ACR application according to still another embodiment.

FIG. 46 shows a user interface of a video display device that terminates an ACR application due to the elapse of the duration of the ACR application according to still another embodiment.

FIG. 47 is a block diagram that shows the operations of a live TV application for uncompressed audio and video content viewing, an ACR application, and a market place application for product purchase according to an embodiment.

FIG. 48 shows the operation of a video display device that performs product purchase related to uncompressed audio and video content according to an embodiment.

FIG. 49 shows a graphic user interface of a video display device displaying that there is a product related to uncompressed audio and video content according to an embodiment.

FIGS. 50A and 50B shows a graphic user interface of a video display device displaying that there is a product related to uncompressed audio and video content according to an embodiment.

FIG. 51 shows a graphic user interface of a video display device that displays a list of products related to uncompressed audio and video content according to an embodiment.

FIG. 52 shows a graphic user interface of a video display device that displays a list of products related to uncompressed audio and video content according to an embodiment.

FIG. 53 shows a graphic user interface of a video display device that displays detail information on a product related to uncompressed audio and video content according to an embodiment.

FIG. 54 shows a graphic user interface of a video display device that displays detail information on a product related to uncompressed audio and video content according to an embodiment.

FIG. 55 shows a graphic user interface of a video display device that receives account information from a user for product purchase related to uncompressed audio and video content according to an embodiment.

FIG. 56 shows a graphic user interface of a video display device that receives payment information from a user for product purchase related to uncompressed audio and video content according to an embodiment.

FIG. 57 shows a graphic user interface of a video display device that receives delivery information from a user for product purchase related to uncompressed audio and video content according to an embodiment.

FIG. 58 shows a graphic user interface of a video display device that receives delivery information from a user for product purchase related to uncompressed audio and video content according to an embodiment.

FIG. 59 shows a graphic user interface of a video display device displaying that the purchase of a product related to uncompressed audio and video content has been completed according to an embodiment.

FIG. 60 shows a graphic user interface of a video display device displaying that the purchase of a product related to uncompressed audio and video content has been completed according to an embodiment.

FIG. 61 is a block diagram that shows the structure of a fingerprint based video display device according to another embodiment.

FIG. 62 is a block diagram that shows the structure of a watermark based video display device according to still another embodiment.

MODE FOR CARRYING OUT THE INVENTION

Hereinafter, a mobile terminal relating to the present invention will be described in more detail with reference to the accompanying drawings. Noun suffixes such as "engine", "module", and "unit" for components in description below are given or mixed in consideration of easiness in writing the specification. That is, the noun suffixes themselves does not have respectively distinguishable meanings or roles.

A network topology will be described with reference to FIGS. 1 to 9 according to an embodiment.

FIG. 1 is a block diagram illustrating the network topology according to the embodiment.

As shown in FIG. 1, the network topology includes a content providing server 10, a content recognizing service providing server 20, a multi channel video distributing server 30, an enhanced service information providing server 40, a plurality of enhanced service providing servers 50, a broadcast receiving device 60, a network 70, and a video display device 100.

The content providing server 10 may correspond to a broadcasting station and broadcasts a broadcast signal including main audio-visual contents. The broadcast signal may further include enhanced services. The enhanced services may or may not relate to main audio-visual contents. The enhanced services may have formats such as service information, metadata, additional data, compiled execution files, web applications, Hypertext Markup Language (HTML) documents, XML documents, Cascading Style Sheet (CSS) documents, audio files, video files, ATSC 2.0 contents, and addresses such as Uniform Resource Locator (URL). There may be at least one content providing server.

The content recognizing service providing server 20 provides a content recognizing service that allows the video display device 100 to recognize content on the basis of main audio-visual content. The content recognizing service providing server 20 may or may not edit the main audio-visual content. There may be at least one content recognizing service providing server.

The content recognizing service providing server 20 may be a watermark server that edits the main audio-visual content to insert a visible watermark, which may look a logo, into the main audio-visual content. This watermark server may insert the logo of a content provider at the upper-left or upper-right of each frame in the main audio-visual content as a watermark.

Additionally, the content recognizing service providing server 20 may be a watermark server that edits the main audio-visual content to insert content information into the main audio-visual content as an invisible watermark.

Additionally, the content recognizing service providing server 20 may be a fingerprint server that extracts characteristic information from some frames or audio samples of the main audio-visual content and stores it. This characteristic information is called signature.

The multi channel video distributing server 30 receives and multiplexes broadcast signals from a plurality of broadcasting stations and provides the multiplexed broadcast signals to the broadcast receiving device 60. Especially, the multi channel video distributing server 30 performs demodulation and channel decoding on the received broadcast signals to extract main audio-visual content and enhanced service, and then, performs channel encoding on the extracted main audio-visual content and enhanced service to generate a multiplexed signal for distribution. At this point, since the multi channel video distributing server 30 may exclude the extracted enhanced service or may add another enhanced service, a broadcasting station may not provide services led by it. There may be at least one multi channel video distributing server.

The broadcasting device 60 may tune a channel selected by a user and receives a signal of the tuned channel, and then, performs demodulation and channel decoding on the received signal to extract a main audio-visual content. The broadcasting device 60 decodes the extracted main audio-visual content through H.264/Moving Picture Experts Group-4 advanced video coding (MPEG-4 AVC), Dolby AC-3 or Moving Picture Experts Group-2 Advanced Audio Coding (MPEG-2 AAC) algorithm to generate an uncompressed main audio-visual (AV) content. The broadcast receiving device 60 provides the generated uncompressed main audio and video content to the video display device 100 through its external input port.

The enhanced service information providing server 40 provides enhanced service information on at least one available enhanced service relating to a main audio and video content in response to a request of a video display device. There may be at least one enhanced service providing server. The enhanced service information providing server 40 may provide enhanced service information on the enhanced service having the highest priority among a plurality of available enhanced services.

The enhanced service providing server 50 provides at least one available enhanced service relating to a main audio and video content in response to a request of a video display device. There may be at least one enhanced service providing server.

The video display device 100 may be a television, a notebook computer, a hand phone, and a smart phone, each including a display unit. The video display device 100 may receive an uncompressed main audio and video content from the broadcast receiving device 60 or a broadcast signal including an encoded main audio and video content from the contents providing server 10 or the multi channel video distributing server 30. The video display device 100 may receive a content recognizing service from the content recognizing service providing server 20 through the network 70, an address of at least one available enhanced service relating to a main audio and video content from the enhanced service information providing server 40 through the network 70, and at least one available enhanced service relating to a main audio and video content from the enhanced service providing server 50.

At least two of the content providing server 10, the content recognizing service providing server 20, the multi channel video distributing server 30, the enhanced service information providing server 40, and the plurality of enhanced service providing servers 50 may be combined in a form of one server and may be operated by one provider.

FIG. 2 is a block diagram illustrating a watermark based network topology according to an embodiment.

As shown in FIG. 2, the watermark based network topology may further include a watermark server 21.

As shown in FIG. 2, the watermark server 21 edits a main audio and video content to insert content information into it. The multi channel video distributing server 30 may receive and distribute a broadcast signal including the modified main audio and video content. Especially, a watermark server may use a digital watermarking technique described below.

A digital watermark is a process for inserting information, which may be almost undeletable, into a digital signal. For example, the digital signal may be audio, picture, or video. If the digital signal is copied, the inserted information is included in the copy. One digital signal may carry several different watermarks simultaneously.

In visible watermarking, the inserted information may be identifiable in a picture or video. Typically, the inserted information may be a text or logo identifying a media owner. If a television broadcasting station adds its logo in a corner of a video, this is an identifiable watermark.

In invisible watermarking, although information as digital data is added to audio, picture, or video, a user may be aware of a predetermined amount of information but may not recognize it. A secret message may be delivered through the invisible watermarking.

One application of the watermarking is a copyright protection system for preventing the illegal copy of digital media. For example, a copy device obtains a watermark from digital media before copying the digital media and determines whether to copy or not on the bases of the content of the watermark.

Another application of the watermarking is source tracking of digital media. A watermark is embedded in the digital media at each point of a distribution path. If such digital media is found later, a watermark may be extracted from the digital media and a distribution source may be recognized from the content of the watermark.

Another application of invisible watermarking is a description for digital media.

A file format for digital media may include additional information called metadata and a digital watermark is distinguished from metadata in that it is delivered as an AV signal itself of digital media.

The watermarking method may include spread spectrum, quantization, and amplitude modulation.

If a marked signal is obtained through additional editing, the watermarking method corresponds to the spread spectrum. Although it is known that the spread spectrum watermark is quite strong, not much information is contained because the watermark interferes with an embedded host signal.

If a marked signal is obtained through the quantization, the watermarking method corresponds to a quantization type. The quantization watermark is weak, much information may be contained.

If a marked signal is obtained through an additional editing method similar to the spread spectrum in a spatial domain, a watermarking method corresponds to the amplitude modulation.

FIG. 3 is a ladder diagram illustrating a data flow in a watermark based network topology according to an embodiment.

First, the content providing server 10 transmits a broadcast signal including a main audio and video content and an enhanced service in operation S101.

The watermark server 21 receives a broadcast signal that the content providing server 10 provides, inserts a visible watermark such as a logo or watermark information as an invisible watermark into the main audio and video content by editing the main audio and video content, and provides the watermarked main audio and video content and enhanced service to the MVPD 30 in operation S103.

The watermark information inserted through an invisible watermark may include at least one of a watermark purpose, content information, enhanced service information, and an available enhanced service. The watermark purpose represents one of illegal copy prevention, viewer ratings, and enhanced service acquisition.

The content information may include at least one of identification information of a content provider that provides main audio and video content, main audio and video content identification information, time information of a content section used in content information acquisition, names of channels through which main audio and video content is broadcasted, logos of channels through which main audio and video content is broadcasted, descriptions of channels through which main audio and video content is broadcasted, a usage information reporting address, a usage information reporting period, the minimum usage time for usage information acquisition, and available enhanced service information relating to main audio and video content.

If the video display device 100 uses a watermark to acquire content information, the time information of a content section used for content information acquisition may be the time information of a content section into which a watermark used is embedded. If the video display device 100 uses a fingerprint to acquire content information, the time information of a content section used for content information acquisition may be the time information of a content section where characteristic information is extracted. The time information of a content section used for content information acquisition may include at least one of the start time of a content section used for content information acquisition, the duration of a content section used for content information acquisition, and the end time of a content section used for content information acquisition.

The usage information reporting address may include at least one of a main audio and video content watching information reporting address and an enhanced service usage information reporting address. The usage information reporting period may include at least one of a main audio and video content watching information reporting period and an enhanced service usage information reporting period. A minimum usage time for usage information acquisition may include at least one of a minimum watching time for a main audio and video content watching information acquisition and a minimum usage time for enhanced service usage information extraction.

On the basis that a main audio and video content is watched for more than the minimum watching time, the video display device 100 acquires watching information of the main audio and video content and reports the acquired watching information to the main audio and video content watching information reporting address in the main audio and video content watching information reporting period.

On the basis that an enhanced service is used for more than the minimum usage time, the video display device 100 acquires enhanced service usage information and reports the acquired usage information to the enhanced service usage information reporting address in the enhanced service usage information reporting period.

The enhanced service information may include at least one of information on whether an enhanced service exists, an enhanced service address providing server address, an acquisition path of each available enhanced service, an address for each available enhanced service, a start time of each available enhanced service, an end time of each available enhanced service, a lifetime of each available enhanced service, an acquisition mode of each available enhanced service, a request period of each available enhanced service, priority information each available enhanced service, description of each available enhanced service, a category of each available enhanced service, a usage information reporting address, a usage information reporting period, and the minimum usage time for usage information acquisition.

The acquisition path of available enhanced service may be represented with IP, an ATSC broadcasting network or Advanced Television Systems Committee-Mobile/Handheld (ATSC M/H). If the acquisition path of available enhanced service is ATSC M/H, enhanced service information may further include frequency information and channel information. An acquisition mode of each available enhanced service may represent Push or Pull.

Moreover, the watermark server 21 may insert watermark information as an invisible watermark into the logo of a main audio and video content.

For example, the watermark server 21 may insert a barcode at a predetermined position of a logo. At this point, the predetermined position of the logo may correspond to the first line at the bottom of an area where the logo is displayed. The video display device 100 may not display a barcode when receiving a main audio and video content including a logo with the barcode inserted.

For example, the watermark server 21 may insert a barcode at a predetermined position of a logo. At this point, the log may maintain its form.

For example, the watermark server 21 may insert N-bit watermark information at each of the logos of M frames. That is, the watermark server 21 may insert M*N watermark information in M frames.

The MVPD 30 receives broadcast signals including watermarked main audio and video content and enhanced service and generates a multiplexed signal to provide it to the broadcast receiving device 60 in operation S105. At this point, the multiplexed signal may exclude the received enhanced service or may include new enhanced service.

The broadcast receiving device 60 tunes a channel that a user selects and receives signals of the tuned channel, demodulates the received signals, performs channel decoding and AV decoding on the demodulated signals to generate an uncompressed main audio and video content, and then, provides the generated uncompressed main audio and video content to the video display device 100 in operation S106.

Moreover, the content providing server 10 also broadcasts a broadcast signal including a main audio and video content through a wireless channel in operation S107.

Additionally, the MVPD 30 may directly transmit a broadcast signal including a main audio and video content to the video display device 100 without going through the broadcast receiving device 60 in operation S108.

The video display device 100 may receive an uncompressed main audio and video content through the broadcast receiving device 60. Additionally, the video display device 100 may receive a broadcast signal through a wireless channel, and then, may demodulate and decode the received broadcast signal to obtain a main audio and video content. Additionally, the video display device 100 may receive a broadcast signal from the MVPD 30, and then, may demodulate and decode the received broadcast signal to obtain a main audio and video content. The video display device 100 extracts watermark information from some frames or a section of audio samples of the obtained main audio and video content. If watermark information corresponds to a logo, the video display device 100 confirms a watermark server address corresponding to a logo extracted from a corresponding relationship between a plurality of logos and a plurality of watermark server addresses. When the watermark information corresponds to the logo, the video display device 100 cannot identify the main audio and video content only with the logo. Additionally, when the watermark information does not include content information, the video display device 100 cannot identify the main audio and video content but the watermark information may include content provider identifying information or a watermark server address. When the watermark information includes the content provider identifying information, the video display device 100 may confirm a watermark server address corresponding to the content provider identifying information extracted from a corresponding relationship between a plurality of content provider identifying information and a plurality of watermark server addresses. In this manner, when the video display device 100 cannot identify a main audio and video content the video display device 100 only with the watermark information, it accesses the watermark server 21 corresponding to the obtained watermark server address to transmit a first query in operation S109.

The watermark server 21 provides a first reply to the first query in operation S111. The first reply may include at least one of content information, enhanced service information, and an available enhanced service.

If the watermark information and the first reply do not include an enhanced service address, the video display device 100 cannot obtain enhanced service. However, the watermark information and the first reply may include an enhanced service address providing server address. In this manner, the video display device 100 does not obtain a service address or enhanced service through the watermark information and the first reply. If the video display device 100 obtains an enhanced service address providing server address, it accesses the enhanced service information providing server 40 corresponding to the obtained enhanced service address providing server address to transmit a second query including content information in operation S119.

The enhanced service information providing server 40 searches at least one available enhanced service relating to the content information of the second query. Later, the enhanced service information providing server 40 provides to the video display device 100 enhanced service information for at least one available enhanced service as a second reply to the second query in operation S121.

If the video display device 100 obtains at least one available enhanced service address through the watermark information, the first reply, or the second reply, it accesses the at least one available enhanced service address to request enhanced service in operation S123, and then, obtains the enhanced service in operation S125.

FIG. 4 is a view illustrating a watermark based content recognition timing according to an embodiment.

As shown in FIG. 4, when the broadcast receiving device 60 is turned on and tunes a channel, and also, the video display device 100 receives a main audio and video content of the turned channel from the broadcast receiving device 60 through an external input port 111, the video display device 100 may sense a content provider identifier (or a broadcasting station identifier) from the watermark of the main audio and video content. Then, the video display device 100 may sense content information from the watermark of the main audio and video content on the basis of the sensed content provider identifier.

At this point, as shown in FIG. 4, the detection available period of the content provider identifier may be different from that of the content information. Especially, the detection available period of the content provider identifier may be shorter than that of the content information. Through this, the video display device 100 may have an efficient configuration for detecting only necessary information.

FIG. 5 is a block diagram illustrating a fingerprint based network topology according to an embodiment.

As shown in FIG. 5, the network topology may further include a fingerprint server 22.

As shown in FIG. 5, the fingerprint server 22 does not edit a main audio and video content, but extracts characteristic information from some frames or a section of audio samples of the main audio and video content and stores the extracted characteristic information. Then, when receiving the characteristic information from the video display device 100, the fingerprint server 22 provides an identifier and time information of an audio and video content corresponding to the received characteristic information.

FIG. 6 is a ladder diagram illustrating a data flow in a fingerprint based network topology according to an embodiment.

First, the content providing server 10 transmits a broadcast signal including a main audio and video content and an enhanced service in operation S201.

The fingerprint server 22 receives a broadcast signal that the content providing server 10, extracts a plurality of pieces of characteristic information from a plurality of frame sections or a plurality of audio sections of the main audio and video content, and establishes a database for a plurality of query results corresponding to the plurality of characteristic information in operation S203. The query result may include at least one of content information, enhanced service information, and an available enhanced service.

The MVPD 30 receives broadcast signals including a main audio and video content and enhanced service and generates a multiplexed signal to provide it to the broadcast receiving device 60 in operation S205. At this point, the multiplexed signal may exclude the received enhanced service or may include new enhanced service.

The broadcast receiving device 60 tunes a channel that a user selects and receives signals of the tuned channel, demodulates the received signals, performs channel decoding and AV decoding on the demodulated signals to generate an uncompressed main audio and video content, and then, provides the generated uncompressed main audio and video content to the video display device 100 in operation S206.

Moreover, the content providing server 10 also broadcasts a broadcast signal including a main audio and video content through a wireless channel in operation S207.

Additionally, the MVPD 30 may directly transmit a broadcast signal including a main audio and video content to the video display device 100 without going through the broadcast receiving device 60 in operation S208.

The video display device 100 may receive an uncompressed main audio and video content through the broadcast receiving device 60. Additionally, the video display device 100 may receive a broadcast signal through a wireless channel, and then, may demodulate and decode the received broadcast signal to obtain a main audio and video content. Additionally, the video display device 100 may receive a broadcast signal from the MVPD 30, and then, may demodulate and decode the received broadcast signal to obtain a main audio and video content. The video display device 100 extracts characteristic information from some frames or a section of audio samples of the obtained main audio and video content in operation S213.

The video display device 100 accesses the fingerprint server 22 corresponding to the predetermined fingerprint server address to transmit a first query including the extracted characteristic information in operation S215.

The fingerprint server 22 provides a query result as a first reply to the first query in operation S217. If the first reply corresponds to fail, the video display device 100 accesses the fingerprint server 22 corresponding to another fingerprint server address to transmit a first query including the extracted characteristic information.

The fingerprint server 22 may provide Extensible Markup Language (XML) document as a query result. Examples of the XML document containing a query result will be described with reference to FIG. 7 and Table 1.

FIG. 7 is a view illustrating an XML schema diagram of ACR-Resulttype containing a query result according to an embodiment.

As shown in FIG. 7, ACR-Resulttype containing a query result includes ResultCode attributes and ContentID, NTPTimestamp, SignalingChannelInformation, and ServiceInformation elements.

For example, if the ResultCode attribute has 200, this may mean that the query result is successful. For example, if the ResultCode attribute has 404, this may mean that the query result is unsuccessful.

The SignalingChannelInformation element includes a SignalingChannelURL, and the SignalingChannelURL element includes an UpdateMode and PollingCycle attributes. The UpdateMode attribute may have a Pull value or a Push value. The ServiceInformation element includes ServiceName, ServiceLogo, and ServiceDescription elements.

Table 1 illustrates an XML schema of ACR-ResultType containing the query result.

TABLE 1

```
<xs:complexType name="ACR-ResultType">
    <xs:sequence>
        <xs:elementname="ContentID" type="xs:anyURI"/>
        <xs:elementname="NTPTimestamp"
        type="xs:unsignedLong"/>
        <xs:elementname="SignalingChannelInformation">
            <xs:complexType>
                <xs:sequence>
                    <xs:element name="SignalingChannelURL"
                    maxOccurs="unbounded">
                        <xs:complexType>
                            <xs:simpleContent>
                                <xs:extension base="xs:anyURI">
                                    <xs:attribute name="UpdateMode">
                                        <xs:simpleType>
                                            <xs:restriction base="xs:string">
                                                <xs:enumeration value="Pull"/>
                                                <xs:enumeration value="Push"/>
                                            </xs:restriction>
                                        </xs:simpleType>
                                    </xs:attribute>
                                    <xs:attribute name="PollingCycle"
                                    type="xs:unsignedInt"/>
                                </xs:extension>
                            </xs:simpleContent>
                        </xs:complexType>
                    </xs:element>
                </xs:sequence>
            </xs:complexType>
        </xs:element>
        <xs:element name="ServiceInformation">
            <xs:complexType>
                <xs:sequence>
                    <xs:element name="ServiceName"
                    type="xs:string"/>
                    <xs:element name="ServiceLogo"
                    type="xs:anyURI" minOccurs="0"/>
                    <xs:element name="ServiceDescription"
                    type="xs:string"
minOccurs="0" maxOccurs="unbounded"/>
                </xs:sequence>
            </xs:complexType>
        </xs:element>
        <xs:any namespace="##other" processContents="skip"
        minOccurs="0"
maxOccurs="unbounded"/>
    </xs:sequence>
    <xs:attribute name="ResultCode" type="xs:string"
    use="required"/>
    <xs:anyAttribute processContents="skip"/>
</xs:complexType>
```

As the ContentID element, an ATSC content identifier may be used as shown in Table 2.

TABLE 2

| Syntax | The Number of bits | format |
|---|---|---|
| ATSC_content_identifier( ) { | | |
| TSID | 16 | uinsbf |
| reserved | 2 | bslbf |
| end_of_day | 5 | uimsbf |
| unique_for | 9 | uimsbf |
| content_id | var | |
| } | | |

As shown in Table 2, the ATSC content identifier has a structure including TSID and a house number.

The 16 bit unsigned integer TSID may be an identifier of a transmission stream or packet that transmits content. For example, the TSID may carry a transport stream identifier.

The 5 bit unsigned integer end_of_day is set with an hour in a day of when a content_id value can be reused after broadcasting is finished.

The 9 bit unsigned integer unique_for is set with the number of day of when the content_id value cannot be reused.

Content_id represents a content identifier. The video display device 100 reduces unique_for by 1 in a corresponding time to end_of_day daily and presumes that content_id is unique if unique_for is not 0.

Moreover, as the ContentID element, a global service identifier for ATSC-M/H service may be used as described below.

The global service identifier has the following form.
urn:oma:bcast:iauth:atsc:service:<region>:<xsid>:<serviceid>

Here, <region> is an international country code including two characters regulated by ISO 639-2. <xsid> for local service is a decimal number of TSID as defined in <region>, and <xsid> (regional service) (major >69) is "0". <serviceid> is defined with <major> or <minor>. <major> represent a Major Channel number, and <minor> represents a Minor Channel Number.

Examples of the global service identifier are as follows.
urn:oma:bcast:iauth:atsc:service:us:1234:5.1
urn:oma:bcast:iauth:atsc:service:us:0:100.200

Moreover, as the ContentID element, an ATSC content identifier may be used as described below.

The ATSC content identifier has the following form.
urn:oma:bcast:iauth:atsc:content:<region>:<xsidz>:<contentid>:<unique_for>:<end_of_day>

Here, <region> is an international country code including two characters regulated by ISO 639-2. <xsid> for local service is a decimal number of TSID as defined in <region>, and may be followed by "."<serviceid>. <xsid> for (regional service) (major >69) is <serviceid>. <content_id> is a base64 sign of a content_id field defined in Table 2, <unique_for> is a decimal number sign of an unique_for field defined in Table 2, and <end_of_day> is a decimal number sign of an end_of_day field defined in Table 2.

Hereinafter, FIG. 6 is described again.

If the query result does not include an enhanced service address or enhanced service but includes an enhanced service address providing server address, the video display device 100 accesses the enhanced service information providing server 40 corresponding to the obtained enhanced service address providing server address to transmit a second query including content information in operation S219.

The enhanced service information providing server 40 searches at least one available enhanced service relating to the content information of the second query. Later, the enhanced service information providing server 40 provides to the video display device 100 enhanced service information for at least one available enhanced service as a second reply to the second query in operation S221.

If the video display device 100 obtains at least one available enhanced service address through the first reply or the second reply, it accesses the at least one available enhanced service address to request enhanced service in operation S223, and then, obtains the enhanced service in operation S225.

When the UpdateMode attribute has a Pull value, the video display device 100 transmits an HTTP request to the enhanced service providing server 50 through SignalingChannelURL and receives an HTTP reply including a PSIP binary stream from the enhanced service providing server 50 in response to the request. In this case, the video display device 100 may transmit the HTTP request according to a Polling period designated as the PollingCycle attribute. Additionally, the SignalingChannelURL element may have an update time attribute. In this case, the video display device 100 may transmit the HTTP request according to an update time designated as the update time attribute.

If the UpdateMode attribute has a Push value, the video display device 100 may receive update from a server asynchronously through XMLHTTPRequest API. After the video display device 100 transmits an asynchronous request to a server through XMLHTTPRequest object, if there is a change of signaling information, the server provides the signaling information as a reply through the channel. If there is limitation in session standby time, a server generates a session timeout reply and a receiver recognizes the generated timeout reply to transmit a request again, so that a signaling channel between the receiver and the server may be maintained for all time.

FIG. 8 is a block diagram illustrating a watermark and fingerprint based network topology according to an embodiment.

As shown in FIG. 8, the watermark and fingerprint based network topology may further include a watermark server 21 and a fingerprint server 22.

As shown in FIG. 8, the watermark server 21 inserts content provider identifying information into a main audio and video content. The watermark server 21 may insert content provider identifying information as a visible watermark such as a logo or an invisible watermark into a main audio and video content.

The fingerprint server 22 does not edit a main audio and video content, but extracts characteristic information from some frames or a certain section of audio samples of the main audio and video content and stores the extracted characteristic information. Then, when receiving the characteristic information from the video display device 100, the fingerprint server 22 provides an identifier and time information of an audio and video content corresponding to the received characteristic information.

FIG. 9 is a ladder diagram illustrating a data flow in a watermark and fingerprint based network topology according to an embodiment.

First, the content providing server 10 transmits a broadcast signal including a main audio and video content and an enhanced service in operation S301.

The watermark server 21 receives a broadcast signal that the content providing server 10 provides, inserts a visible watermark such as a logo or watermark information as an invisible watermark into the main audio and video content by editing the main audio and video content, and provides the watermarked main audio and video content and enhanced service to the MVPD 30 in operation S303. The watermark information inserted through an invisible watermark may include at least one of content information, enhanced service information, and an available enhanced service. The content information and enhanced service information are described above.

The MVPD 30 receives broadcast signals including watermarked main audio and video content and enhanced service and generates a multiplexed signal to provide it to the broadcast receiving device 60 in operation S305. At this point, the multiplexed signal may exclude the received enhanced service or may include new enhanced service.

The broadcast receiving device 60 tunes a channel that a user selects and receives signals of the tuned channel, demodulates the received signals, performs channel decoding and AV decoding on the demodulated signals to generate an uncompressed main audio and video content, and then, provides the generated uncompressed main audio and video content to the video display device 100 in operation S306.

Moreover, the content providing server 10 also broadcasts a broadcast signal including a main audio and video content through a wireless channel in operation S307.

Additionally, the MVPD 30 may directly transmit a broadcast signal including a main audio and video content to the video display device 100 without going through the broadcast receiving device 60 in operation S308.

The video display device 100 may receive an uncompressed main audio and video content through the broadcast receiving device 60. Additionally, the video display device 100 may receive a broadcast signal through a wireless channel, and then, may demodulate and decode the received broadcast signal to obtain a main audio and video content. Additionally, the video display device 100 may receive a broadcast signal from the MVPD 30, and then, may demodulate and decode the received broadcast signal to obtain a main audio and video content. The video display device 100 extracts watermark information from audio samples in some frames or periods of the obtained main audio and video content. If watermark information corresponds to a logo, the video display device 100 confirms a watermark server address corresponding to a logo extracted from a corresponding relationship between a plurality of logos and a plurality of watermark server addresses. When the watermark information corresponds to the logo, the video display device 100 cannot identify the main audio and video content only with the logo. Additionally, when the watermark information does not include content information, the video display device 100 cannot identify the main audio and video content but the watermark information may include content provider identifying information or a watermark server address. When the watermark information includes the content provider identifying information, the video display device 100 may confirm a watermark server address corresponding to the content provider identifying information extracted from a corresponding relationship between a plurality of content provider identifying information and a plurality of watermark server addresses. In this manner, when the video display device 100 cannot identify a main audio and video content the video display device 100 only with the watermark information, it accesses the watermark server 21 corresponding to the obtained watermark server address to transmit a first query in operation S309.

The watermark server 21 provides a first reply to the first query in operation S311. The first reply may include at least one of a fingerprint server address, content information, enhanced service information, and an available enhanced service. The content information and enhanced service information are described above.

If the watermark information and the first reply include a fingerprint server address, the video display device 100 extracts characteristic information from some frames or a certain section of audio samples of the main audio and video content in operation S313.

The video display device 100 accesses the fingerprint server 22 corresponding to the fingerprint server address in the first reply to transmit a second query including the extracted characteristic information in operation S315.

The fingerprint server 22 provides a query result as a second reply to the second query in operation S317.

If the query result does not include an enhanced service address or enhanced service but includes an enhanced service address providing server address, the video display device 100 accesses the enhanced service information providing server 40 corresponding to the obtained enhanced service address providing server address to transmit a third query including content information in operation S319.

The enhanced service information providing server 40 searches at least one available enhanced service relating to the content information of the third query. Later, the enhanced service information providing server 40 provides to the video display device 100 enhanced service information for at least one available enhanced service as a third reply to the third query in operation S321.

If the video display device 100 obtains at least one available enhanced service address through the first reply, the second reply, or the third reply, it accesses the at least one available enhanced service address to request enhanced service in operation S323, and then, obtains the enhanced service in operation S325.

Then, referring to FIG. 10, the video display device 100 will be described according to an embodiment.

FIG. 10 is a block diagram illustrating the video display device according to the embodiment.

As shown in FIG. 10, the video display device 100 includes a broadcast signal receiving unit 101, a demodulation unit 103, a channel decoding unit 105, a demultiplexing unit 107, an AV decoding unit 109, an external input port 111, a play controlling unit 113, a play device 120, an enhanced service management unit 130, a data transmitting/receiving unit 141, and a memory 150.

The broadcast signal receiving unit 101 receives a broadcast signal from the content providing server 10 or MVPD 30.

The demodulation unit 103 demodulates the received broadcast signal to generate a demodulated signal.

The channel decoding unit 105 performs channel decoding on the demodulated signal to generate channel-decoded data.

The demultiplexing unit 107 separates a main audio and video content and enhanced service from the channel-decoded data. The separated enhanced service is stored in an enhanced service storage unit 152.

The AV decoding unit 109 performs AV decoding on the separated main audio and video content to generate an uncompressed main audio and video content.

Moreover, the external input port 111 receives an uncompressed main audio and video content from the broadcast receiving device 60, a digital versatile disk (DVD) player, a Blu-ray disk player, and so on. The external input port 111 may include at least one of a DSUB port, a High Definition Multimedia Interface (HDMI) port, a Digital Visual Interface (DVI) port, a composite port, a component port, and an S-Video port.

The play controlling unit 113 controls the play device 120 to play at least one of an uncompressed main audio and video content that the AV decoding unit 109 generates and an uncompressed main audio and video content received from the external input port 111 according to a user's selection.

The play device 120 includes a display unit 121 and a speaker 123. The display unit 21 may include at least one of a liquid crystal display (LCD), a thin film transistor-liquid crystal display (TFT LCD), an organic light-emitting diode (OLED), a flexible display, and a 3D display.

The enhanced service management unit 130 obtains content information of the main audio and video content and obtains available enhanced service on the basis of the obtained content information. Especially, as described above, the enhanced service management unit 130 may obtain the identification information of the main audio and video content on the basis of some frames or a certain section of audio samples the uncompressed main audio and video content. This is called automatic contents recognition (ACR) in this specification.

The data transmitting/receiving unit 141 may include an Advanced Television Systems Committee-Mobile/Handheld (ATSC-M/H) channel transmitting/receiving unit 141a and an IP transmitting/receiving unit 141b.

The memory 150 may include at least one type of storage medium such as a flash memory type, a hard disk type, a multimedia card micro type, a card type memory such as SD or XD memory, Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, and optical disk. The video display device 100 may operate in linkage with a web storage performing a storage function of the memory 150 in the Internet.

The memory 150 may include a content information storage unit 151, an enhanced service storage unit 152, a logo storage unit 153, a setting information storage unit 154, a bookmark storage unit 155, a user information storage unit 156, and a usage information storage unit 157.

The content information storage unit 151 stores a plurality of content information corresponding to a plurality of characteristic information.

The enhanced service storage unit 152 may store a plurality of enhanced services corresponding to a plurality of characteristic information or a plurality of enhanced services corresponding to a plurality of content information.

The logo storage unit 153 stores a plurality of logos. Additionally, the logo storage unit 153 may further store content provider identifiers corresponding to the plurality of logos or watermark server addresses corresponding to the plurality of logos.

The setting information storage unit 154 stores setting information for ACR.

The bookmark storage unit 155 stores a plurality of bookmarks.

The user information storage unit 156 stores user information. The user information may include at least one of at least one account information for at least one service, regional information, family member information, preferred genre information, video display device information, and a usage information range. The at least one account information may include account information for a usage information measuring server and account information of social network service such as Twitter and Facebook. The regional information may include address information and zip codes. The family member information may include the number of family members, each member's age, each member's sex, each member's religion, and each member's job. The preferred genre information may be set with at least one of sports, movie, drama, education, news, entertainment, and other genres. The video display device information may include information such as the type, manufacturer, firmware version, resolution, model, OS, browser, storage device availability, storage device capacity, and network speed of a video display device. Once the usage information range is set, the video display device 100 collects and reports main audio and video content watching information and enhanced service usage information within the set range. The usage information range may be set in each virtual channel. Additionally, the usage information measurement allowable range may be set over an entire physical channel.

The usage information providing unit 157 stores the main audio and video content watching information and the enhanced service usage information, which are collected by the video display device 100. Additionally, the video display device 100 analyzes a service usage pattern on the basis of the collected main audio and video content watching information and enhanced service usage information, and stores the analyzed service usage pattern in the usage information storage unit 157.

The enhanced service management unit 130 may obtain the content information of the main audio and video content from the fingerprint server 22 or the content information storage unit 151. If there is no content information or sufficient content information, which corresponds to the extracted characteristic information, in the content information storage unit 151, the enhanced service management unit 130 may receive additional content information through the data transmitting/receiving unit 141. Moreover, the enhanced service management unit 130 may update the content information continuously.

The enhanced service management unit 130 may obtain available enhanced service from the enhanced service providing server 50 or the enhanced service storage unit 153. If there is no enhanced service or sufficient enhanced service in the enhanced service storage unit 153, the enhanced service management unit 130 may update enhanced service through the data transmitting/receiving unit 141. Moreover, the enhanced service management unit 130 may update the enhanced service continuously.

The enhanced service management unit 130 may extracts a logo from the main audio and video content, and then, may make a query to the logo storage unit 155 to obtain a content provider identifier or watermark server address, which is corresponds to the extracted logo. If there is no logo or a sufficient logo, which corresponds to the extracted logo, in the logo storage unit 155, the enhanced service management unit 130 may receive an additional logo through the data transmitting/receiving unit 141. Moreover, the enhanced service management unit 130 may update the logo continuously.

The enhanced service management unit 130 may compare the logo extracted from the main audio and video content with the plurality of logos in the logo storage unit 155 through various methods. The various methods may reduce the load of the comparison operation.

For example, the enhanced service management unit 130 may perform the comparison on the basis of color characteristics. That is, the enhanced service management unit 130 may compare the color characteristic of the extracted logo with the color characteristics of the logos in the logo storage unit 155 to determine whether they are identical or not.

Moreover, the enhanced service management unit 130 may perform the comparison on the basis of character recognition. That is, the enhanced service management unit 130 may compare the character recognized from the extracted logo with the characters recognized from the logos in the logo storage unit 155 to determine whether they are identical or not.

Furthermore, the enhanced service management unit 130 may perform the comparison on the basis of the contour of the logo. That is, the enhanced service management unit 130 may compare the contour of the extracted logo with the contours of the logos in the logo storage unit 155 to determine whether they are identical or not.

Then, referring to FIGS. 11 and 12, a method of synchronizing a playback time of a main audio and video content with a playback time of an enhanced service according to an embodiment will be described.

FIG. 11 is a flowchart illustrating a method of synchronizing a playback time of a main audio and video content with a playback time of an enhanced service according to an embodiment.

Enhanced service information may include a start time of an enhanced service. At this point, the video display device 100 may need to start the enhanced service at the start time. However, since the video display device 100 receives a signal transmitting an uncompressed main audio and video content with no time stamp, the reference time of a plying time of the main audio and video content is different from that of a start time of the enhanced service. Although the video display device 100 receives a main audio and video content having time information, the reference time of a plying time of the main audio and video content may be different from that of a start time of the enhanced service, like rebroadcasting. Accordingly, the video display device 100 may need to synchronize the reference time of the main audio and video content with that of the enhanced service. Especially, the video display device 100 may need to synchronize the playback time of the main audio and video content with the start time of the enhanced service.

First, the enhanced service management unit 130 extracts a certain section of a main audio and video content in operation S801. The section of the main audio and video content may include at least one of some video frames or a certain audio section of the main audio and video content. Time that the enhanced service management unit 130 extracts the section of the main audio and video content is designated as Tn.

The enhanced service management unit 130 obtains content information of a main audio and video content on the basis of the extracted section. In more detail, the enhanced service management unit 130 decodes information encoded with invisible watermark in the extracted section to obtain content information. Additionally, the enhanced service management unit 130 may extract characteristic information in the extracted section, and obtain the content information of the main audio and video content from the fingerprint server 22 or the content information storage unit 151 on the basis of the extracted characteristic information. Time that the enhanced service management unit 130 obtains the content information is designated as Tm.

Moreover, the content information includes a start time Ts of the extracted section. After the content information acquisition time Tm, the enhanced service management unit 130 synchronizes the playback time of the main audio and video content with the start time of the enhanced service on the biases of Ts, Tm, and Tn. In more detail, the enhanced service management unit 130 regards the content information acquisition time Tm as a time Tp calculated by the following Equation 1.

$$Tp=Ts+(Tm-Tn) \quad \text{[Equation 1]}$$

Then, the enhanced service management unit 130 obtains an enhanced service and its start time Ta on the obtained content information in operation S807.

If the synchronized playback time of the main audio and video content is identical to the start time Ta of the enhanced service, the enhanced service management unit 130 starts the obtained enhanced service in operation S809. In addition, the enhanced service management unit 130 may regard a time of when Tx elapses after the content information acquisition time as Tp+Tx. In more detail, the enhanced service management unit 130 may start the enhanced service when the following Equation 2 is satisfied.

$$Tp+Tx=Ta \quad \text{[Equation 2]}$$

FIG. 12 is a conceptual diagram illustrating a method of synchronizing a playback time of a main audio and video content with a playback time of an enhanced service according to an embodiment.

As shown in FIG. 12, the video display device 100 extracts an AV sample during a system time Tn.

The video display device 100 extracts characteristic information from the extracted AV sample, and transmits a query including the extracted characteristic information to the fingerprint server 22 to receive a query result. The video display device 100 confirms whether a start time Ts of the extracted AV sample corresponds to 11000 ms at Tm by parsing the query result.

Accordingly, the video display device 100 regards the time of when the start time of the extracted AV sample is confirmed according to Equation 1 as Ts+(Tm−Tn), so that, after that, the playback time of the main audio and video content may be synchronized with the start time of the enhanced service.

Next, an ACR application will be described according to various embodiments with reference to FIGS. 13 to 14.

The ACR application may include an auto playing application, a content provider application, and a video display manufacturer application.

FIG. 13 is a screen when an auto playing application is executed according to an embodiment.

The auto playing application automatically plays an enhanced service even when a user makes no action. In this sense, the auto playing application is designated as a lean back application in this specification.

The auto playing application automatically plays an enhanced service such as scene related information that a content provider or broadcasting station provides during playing of the main audio and video content according to a playback time of the main audio and video content, without a user's input. That is, a content provider or broadcasting station entirely controls the auto playing application. For example, when an auto playing application relates to a specific channel or a specific content, as the video display device 100 enters a channel or content relating to the auto playing application, the video display device 100 may automatically execute a corresponding auto playing application without a user input. Then, when the video display device 100 becomes out of a channel or content relating to an auto playing application, it may automatically terminate a corresponding auto playing application without a user input. In this sense, an auto playing application will be referred to as a channel-dependent application or a content-dependent application in this specification.

As shown in FIG. 13, once the auto playing application is executed, the screen 200 may include a sub screen 210 where a reduced main audio and video content is played and a sub screen 220 where additional information is displayed. The sub screen 200 where additional information is displayed may be spatially separated from the sub screen 210 where a main audio and video content is played.

Moreover, when an auto playing application is executed, an area where additional information is displayed may be semi-transparent. In this case, the area where additional information is displayed may overlay on an area where a main audio and video content played.

FIG. 14 is a screen when a content provider application is executed according to an embodiment.

In this specification, the content provider application is designated as a full interactive application.

As shown in FIG. 14 (A), the video display device 100 downloads and stores a plurality of applications. FIG. 14 (A) illustrates icons 230 of the applications. A content provider application among the plurality of applications is an application created and distributed by a content provider, and thus, may be under control of the content provider.

A user of the video display device 100 may download a content provider application from an application store and determines whether to execute the downloaded content provider application.

FIG. 14 (B) is a screen when a content provider application is executed. As shown in FIG. 14 (B), the screen 200 may include the sub screen 210 where a reduced main audio and video content is played and the sub screen 220 where additional information is displayed.

A video display device manufacturer application is created and controlled by a video display device manufacturer, and may be stored in advance when the video display device 100 is manufactured. That is, the video display device manufacturer application may provide the same service and user interface regardless of a content provider or content.

The video display device manufacturer application may include an area where an enhanced service that a content provider provides is displayed and an area where an enhanced service that a video display device manufacturer provides is displayed, separately. A user of the video display device 100 may determine whether to execute the video display device manufacturer application.

The video display device manufacturer application may have two types.

The video display device manufacturer application of the first type has a resizing user interface. The video display device manufacturer application having the resizing user interface reduces the size of an area where a main audio and video content is displayed to display all the main audio and video content in a reduced area. Additionally, the video display device manufacturer application having the resizing user interface reshapes an area where an application is displayed with an L or inverse-L shaped structure.

The video display device manufacturer application of the second type has an overlay user interface. The video display device manufacturer application having the overlay user interface maintains the size of an area where a main audio and video content is displayed, and overlaps an area where an application is displayed on the main audio and video content. Since the area where an application is displayed covers the main audio and video content, an application area may be semi-transparent.

Like this, a video display device manufacturer application is not dependent on any single contents provider or any single channel. Although it is described that such an application is manufactured by a video display device manufacturer, the present invention is not limited thereto. An application not dependent on any single contents provider or any single channel is not executed by a channel change or is not terminated by a channel change. For convenience of description in this specification, an application not dependent on any single content provider or any single channel may be referred to as a channel-independent application, a video display device manufacturer application or a Live+ app.

Then, an on/off control of an ACR function will be described according to an embodiment with reference to FIGS. 15 and 16.

FIG. 15 is a view of a user interface for controlling an ACR function according to an embodiment.

As shown in FIG. 15, the play controlling unit 113 displays an ACR function setting window. A user may activate or deactivate the ACR function through the ACR function setting window.

When the ACR function is activated, a user may select an ACR mode. The ACR mode may be set with one of an auto playing application mode, a content provider application mode, and a video display manufacturer application mode.

When the ACR function mode is set in the above manner, the play controlling unit 113 stores setting information on a setting information storage unit 154.

FIG. 16 is a flowchart illustrating a method of operating a video display device according to the embodiment.

The enhanced service management unit 130 confirms whether the ACR function is turned on in operation S1901.

If the ACR function is deactivated, the enhanced service management unit 130 does not perform a content information obtaining procedure any more.

If the ACR function is activated, the enhanced service management unit 130 extracts a certain section of a main audio and video content in operation S1902.

The enhanced service management unit 130 obtains content information of the main audio and video content on the basis of the extracted section in operation S1903.

The enhanced service management unit 130 synchronizes the reference time of the main audio and video content with the reference time of an alternative advertisement in operation S1905.

The enhanced service management unit 130 obtains an enhanced service on the basis of the obtained content information in operation S1907. The enhanced service management unit 130 obtains enhanced service information on the basis of the content information, and then obtains an enhanced service on the basis of the enhanced service information.

Then, the enhanced service management unit 130 confirms the ACR mode in operation S1909.

The enhanced service management unit 130 plays the enhanced service according to the ACR mode in operation S1911.

In more detail, if the ACR mode is an automatic play application mode, the enhanced service management unit 130 executes an automatic play application, and the executed automatic play application plays the obtained enhanced service.

If the ACR mode is the content provider application mode, the enhanced service management unit 130 executes a content provider application corresponding to the obtained content information in background. The enhanced service management unit 130 displays a content provider application when receiving a user input corresponding to an enhanced service use. This content provider application may play the obtained enhanced service. Instead that the content provider application is automatically executed in background, it may be executed by a user input.

If the ACR mode is the video display device manufacturer application mode, the enhanced service management unit 130 executes its video display device manufacturer application in background. The enhanced service management unit 130 displays the video display device manufacturer application when receiving a user input corresponding to an enhanced service use. This video display device manufacturer application may play the obtained enhanced service. Instead that the video display device manufacturer application is automatically executed in background, it may be executed by a user input.

Next, third party enhanced service will be described according to an embodiment of the present invention with reference to FIGS. 17 to 42.

FIG. 17 is a view illustrating a network topology according to an embodiment of the present invention.

As shown in FIG. 17, the network topology includes a contents providing server 10 such as a Broadcaster/CP Backend server, a third party server 90 such as the enhanced service providing server 50, a contents recognition service providing server 20 such as an ACR server, and a video display device 100 such as an ACR Smart TV.

The video display device 100 may obtain broadcaster enhanced service from the contents providing server 10 by using a channel-dependent application or a Leanback app such as a contents-dependent application, and may obtain third party enhanced service from the third party server 90 by using a Live+ app such as a channel-independent application.

The Leanback app such as a channel-dependent application is an application that a broadcaster or a CP provides, and also provides a service synchronized by a program unit or a scene unit. Since a broadcaster is a subject to produce a program, it knows well which scene is in a program. Thus, the broadcaster may display the most suitable contents for a specific scene. Once the video display device 100 recognizes a program, it downloads a Leanback app from the contents providing server 10 of the corresponding program, and then, automatically executes the downloaded Leanback app. However, when the video display device 100 changes the current channel to another channel unrelated to the executed Leanback app, it automatically terminates the corresponding Leanback app, and if there is a Leanback app of the changed channel, it executes the corresponding Leanback app.

A Live+ app is an application that a third party provides (for example, a manufacturer), is pre-installed in a TV, and may be executed always regardless of a channel or program that a user currently watches, unlike the Leanback app. In relation to an ACR architecture that the present invention suggests, a Live+ app displays program related enhanced information and contents synchronized by a scene unit. The Live+ app has a consistent user interface and is always executed regardless of a program. The Live+ app may provide various services by using program related metadata even when a broadcaster does not provide program related additional information. For example, the Live+ app may provide basic information on a program and recommendation on movies in which a program actor appears. Since the Live+ app has an area assigned to a broadcaster/CP, it may display corresponding program related enhancement data on a corresponding area when the broadcaster provides program related additional information. For example, enhancement data that a broadcaster provides may include the replay of the previous broadcast of the program that a user currently watches and scene synchronized contents (for example, product purchase, place reservation, music source purchase and download, and product ad).

The video display device 100 includes an ACR module to extract a signature from uncompressed audio and video content and queries the contents recognition service providing server 20 through the extracted signature in order to recognize a program. Also, the video display device 100 drives a program related application on the basis of the recognized program. The Leanback app may be downloaded after the program recognition and then executed. The Live+ app may be pre-installed by a manufacturer when a TV is released, or may be downloaded from an app store and installed.

The contents recognition service providing server 20 stores the signatures of audio and/or video of a broadcasted program. The contents recognition service providing server 20 may extract and store the signature of a real-time broadcast by using a signature capture system, and may receive an ACR DB including a signature corresponding to a specific program from a broadcaster and then may store it. The ACR DB of the contents recognition service providing server 20 stores the content ID, signature, timestamp, and URL of a program. In this specification, two types of content IDs may be used.

The first type of content ID, as an ID that a broadcaster directly assigns, is an identifier that uniquely identifies a program in a broadcaster. The broadcaster may assign the content ID to the program in its desired format. The content ID may be used when program related enhancement data are requested to the content providing server 10.

The second type of content ID, as a global unique content ID, is an identifier that uniquely identifies a program nationally or globally. Since programs are transmitted through national broadcast channels, local broadcast channels, cable broadcasts, or satellite broadcasts, in order to extract the signatures of all the programs, a plurality of signature capture equipment may be installed in a plurality of areas. Also, in order to uniquely identify and distinguish each program nationally or globally, a global unique content ID may be assigned to each program. In order to map each program into a global unique content ID, a metadata database may be used. Since the metadata database includes program schedule information in addition to metadata such as program related additional information, the signature delivered from a capture system may be mapped into a certain program by using the metadata database. The capture system knows which area, channel, and time the extracted signature relates to, and thus, when the metadata database is searched with this information, a program may be found. The contents recognition service providing server 20 and the third party server 90 may share the metadata database, and may recognize a program through a global unique content ID by using the metadata database. The format of the global unique content ID may be designated by a third party operating a server, or may be provided from the metadata database.

All services that a Live+ app provides are provided from the third party server 90. The third party server 90 may receive a global unique content ID that the contents recognition service providing server 20 delivers, from the video display device 100. The third party server 90 may extract program related metadata corresponding to the global unique content ID from the metadata database through the global unique content ID, and on the basis of the extracted metadata, may provide program related various services to the video display device 100. Additionally, if there is additional information on the recognized program that a broadcaster provides, the third party server 90 accesses the broadcaster server in order to receive program related enhancement data, and processes and provides them to the video display device 100. The program related enhancement data that a broadcaster provides through a Live+ app have the same contents as but a different user interface from the enhancement data that a Leanback app. However, in another embodiment, according to broadcasters, the program related enhancement data that a broadcaster provides through a Live+ app may be different from those that a Leanback app provides.

There may be a plurality of contents providing servers 10 for a plurality of broadcasters or a plurality of CPs. The contents providing server 10 has a program targeted Leanback app and program related enhancement data that the Leanback app outputs.

FIG. 18 is a view illustrating a Live+ app according to various embodiments of the present invention.

The Live+ app may resize main AV media content in order to display it on the upper left area of the screen, may display program related additional information on the right area of the screen, and may display a program related ad on the bottom area of the screen. The Live+ app may display a plurality of tabs on the top area of the contents area in the right area. The plurality of tabs may include a program tab, a recommends tab, a talk tab, and a plus tap.

FIG. 19 is a view illustrating a method of executing a Live+ app according to various embodiments of the present invention.

The video display device 100 may display a home screen or a My Apps screen. The My Apps screen is a screen displaying a list of application installed in the video display device 100.

On receiving a user input selecting a Live+ app from a plurality of applications shown on the home screen or the My Apps screen, the video display device 100 may execute the Live+ app.

Additionally, while playing a broadcast, the video display device 100 may display a graphic notifying that there is a Live+ app at a predetermined time interval through a timer, and when receiving a user input relating to this graphic, may execute the Live+ app.

FIG. 20 is a view illustrating a tab function of a Live+ app according to an embodiment of the present invention.

The program tab provides basic information on a program that a viewer currently watches and the replay service of the program. The video display device 100 may fetch the program basic information from the Meta DB of the third party server 90. The video display device 100 may bring the information on the program replay service from the contents providing server 10 that creates a corresponding program, through the third party server 90.

The recommends tab may recommend another audio and video content relating to a current program, i.e. a movie or a video (for example, Youtube) or an app relating to the current program. The third party server 90 may determine a movie or a video for recommendation on the basis of the title, genre, or cast of the current program, and then may process the information about this to provide the recommendation tab of the Live+ app of the video display device 100.

The Talk tab provides a twitter article corresponding to the current program related conversation content. The third party server 90 may searches for the current program related twitter article on the basis of the title, genre, or cast of the current program, and then may process the searched article to provide the Talk tab of the Live+ app of the video display device 100.

The Plus tab is an area where a broadcaster displays the program related data. The Plug tab may provide information received from the broadcaster as it is, or may provide information that is received from a broadcaster server and processed by the third party server 90. There is no limit to the type and number of data that the Plus tab provides. The Plus tab may provide various enhancement data such as product purchase, place reservation, music source purchase, and product ad. However, when the information from a broadcaster server is provided to the Plus tab as it is, the third party server 90 processes the information from the broadcaster server to be fit for the position and size of the contents area of the Live+ app, and then provides the processed information to the video display device 100

FIG. 21 is a view illustrating an architecture of the third party server 90 according to an embodiment of the present invention.

As shown in FIG. 21, the third party server 90 includes an Application Layer, a Service Component Layer, a Back-end System Layer, and a Data Component Layer.

The application layer may communicate with various devices including the video display device 100 through a delivery interface. The application layer may include an AppStore component. The AppStore component may support an interface through which a developer registers an app, and also may support an interface through which a general user searches for, downloads, and installs an app. Additionally, the Live+ app may receive services such as ad, search, and recommendation in the third part server 90 through the AppStore component.

A service component layer may communicate with the application layer through a service integration interface. The service component layer includes an ad service component, an integration search component, a recommendation component, and an ACR component. The service component layer receives the processed data from the back-end system layer and delivers them to the application layer. The ACR component may obtain program related basic additional information through the metadata component of the back-end system layer by using the received Content ID, Global Content ID, timestamp, and broadcaster server URL from the video display device 100. Additionally, the ACR component may deliver the information on a program title and actors obtained from the metadata to the integration search component in order to a program related search result.

The back-end system layer reads original data from the data component layer and processes and delivers the data to the service component layer. The back-end system layer may include a search engine security component, a DRAM component, a metadata component, an ad platform component, and an ACR component.

The data component layer may have actual data. Here, the data component layer may include a file repository, an integrated DB, a user profile repository, a user profile repository, a metadata repository, and an ad data storage. The user profile repository may store information on a viewer or user's gender, age, region, income, family member, preferred genre, preferred channel, and preferred program. The metadata repository may include information on content's title, episode, director, synopsis, casts, genre, channel, and air time. The third party server 90 may receive information on a content from a metadata provider or real-time broadcast guide information (for example, in the case of ATSC terrestrial waves, PSIP), and then may store the received information in the metadata repository.

FIG. 22 is a ladder diagram illustrating an operation of a video display device for an automatic execution application according to an embodiment of the present invention.

First, the video display device 100 extracts characteristic information from some frames of the main audio and video content or a section of audio samples of the main audio and video content, and transmits an ACR query request message including the extracted characteristic information to a fingerprint server 22 corresponding to an ACR server in operation S2105.

The fingerprint server 22 queries characteristic information in the ACR query request message from an ACR DB to identify a program corresponding to the characteristic information, and provides an ACR query response message including contents information on the identified program to the video display device 100 in operation S2107. At this point, the ACR query response message may include information on whether program recognition is successful, contents information, and the URL of a Leanback app. As mentioned above, the content information may include the content ID and timestamp of the recognized program. Here, the format of the content ID may be a format that only a corresponding broadcaster recognizes. Especially, this is the case that a broadcaster provides the ACR DB of the corresponding program to the contents recognition service providing server 20.

When the program identification is successful and the Leanback app URL is valid, the video display device 100 requests a Leanback app through a corresponding Leanback app URL in operation S2109.

The contents providing server 10 provides the Leanback app that the video display device 100 requests to the video display device 100 in operation S2111. Consequently, the video display device 100 may download the Leanback app.

When the video display device 100 successfully downloads the Leanback app, it automatically executes a corresponding Leanback app in operation S2113.

The Leanback app executed in the video display device 100 obtains a content ID and a timestamp periodically from an ACR engine in the video display device 100, and transmits an enhancement data request message including the obtained content ID and timestamp to the contents providing server 10 in operation S2115, and then requests the enhancement data relating to a scene corresponding to the content ID and the timestamp.

The contents providing server 10 delivers the requested enhancement data to the Leanback app. Since the Leanback app is an application that a broadcaster provides, an interface of the contents providing server 10 of one broadcaster may be different from that of the contents providing server 10 of another broadcaster. When there is scene related additional information, the Leanback app may perform operations S2113 and S2117 repeatedly.

FIG. 23 is a ladder diagram illustrating an operation of a video display device for a channel-independent application according to an embodiment of the present invention.

On receiving a user input to execute an installed Live+ app, the video display device 100 executes the Live+ app in operation S2201.

When an ACR function is turned off, the Live+ app executed in the video display device 100 turns on the ACR module in operation S2203.

The video display device 100 extracts characteristic information from some frames of the main audio and video content or a section of audio samples of the main audio and video content, and transmits an ACR query request message including the extracted characteristic information to the ACR server corresponding to the fingerprint server 22 in operation S2205.

The fingerprint server 22 queries characteristic information in the ACR query request message from an ACR DB to identify a program corresponding to the characteristic information, and provides an ACR query response message including contents information on the identified program to the video display device 100 in operation S2207. At this point, the ACR query response message may include information on whether program recognition is successful and contents information. As mentioned above, the content information may include the global unique content ID and timestamp of the recognized program.

The Live+ app executed in the video display device 100 receives a user input for service type selection in operation S2209. At this point, the service type may correspond to at least one of a program type, a recommendation type, a conversation type, and a plus type. For example, enhancement data corresponding to the selected service type may be a real-time news article relating to cast members and a service recommending a movie in which a program cast member appears as a leading role.

The Live+ app executed in the video display device 100 obtains contents information on the currently recognized program from the ACR engine in the video display device 100, and transmits a program related content request message to the third party server 90 in operation S2211 in order to request enhancement data corresponding to the selected service type. At this point, the program related content request message may include content information on the currently recognized program and information on the selected service type.

The Live+ app may transmit an HTTP based request to the third party server 90 through ajax call. Parameters delivered at this point may include a service type, a Content ID, a Global Content ID, a timestamp, and a broadcaster server URL. The HTTP request may deliver a HTTP GET based parameter using the following syntax.

```
[HTTP GET syntax]
?service=<service name>&contentId=<Content ID>
&globalContentId-<Global Conent ID>&ts -<timestamp>
[&url=<broadcaster server URI>i
```

<service name> is the name of a service that a Live+ app requests. In this embodiment, the following <service name> may be used.

- "getProgram" is a service name for receiving program related basic information and previous episodes, and is used for a program tab of a Live+ app.
- "getRecommends": is a service name for receiving data of program related recommendation (Von recommendation and App recommendation), and is used for a recommends tab of a Live+ app.
- "getTalk": is a service name for receiving program related article/twitter, and is used for a talk tab of a Live+ app.
- "getPlus": is a service name for receiving program related enhancement data that a broadcaster provides, and is used for a plus tab of a Live+ app.

<Content ID> is a value that a broadcaster delivers to the contents recognition service providing server 20, and is a content ID that is internally used by a broadcaster in order to uniquely identify a program.

<Global Content ID> is used for uniquely and globally identifying a program, and for this, the contents recognition service providing server 20 and the third party server 90 may need to use the same Meta DB. The Global Content ID may follow the content id format of the Meta DB.

<timestamp> notifies the current watching time of the recognized program and is a value delivered from the contents recognition service providing server 20.

<broadcaster server URL> is delivered when a broadcaster provides program related enhancement data, and with this value, the third party server 90 may access a broadcaster server.

In order to locate enhancement data of a program corresponding to the delivered Global Content ID, the third party server 90 searches the metadata repository in operation S2213. The metadata repository returns a search result on the enhancement data of a program corresponding to the delivered Global Content ID, to the third party server 90.

The third party server 90 processes the received program enhancement data from the metadata repository and provides the processed enhancement data to the Live+ app executed in the video display device 100 in operation S2221. The third party server 90 may transmit the processed enhancement data in an HTTP based response through ajax call.

FIG. 24 is a ladder diagram illustrating an operation of a video display device for a channel-independent application according to another embodiment of the present invention.

On receiving a user input to execute an installed Live+ app, the video display device 100 executes the Live+ app in operation S2301.

When an ACR function is turned off, the Live+ app executed in the video display device 100 turns on the ACR module in operation S2203.

The ACR engine of the video display device 100 extracts characteristic information from some frames of the main audio and video content or a section of audio samples of the main audio and video content, and transmits an ACR query request message including the extracted characteristic information to the ACR server corresponding to the fingerprint server 22 in operation S2305.

The fingerprint server 22 queries characteristic information in the ACR query request message from an ACR DB to identify a program corresponding to the characteristic information, and provides an ACR query response message including contents information on the identified program to the ACR engine of the video display device 100 in operation S2307. At this point, the ACR query response message may include information on whether program recognition is successful, contents information, and the URL of the contents providing server 10. As mentioned above, the content information may include the global unique content ID of the recognized program and the content ID and timestamp that the broadcaster of the recognized program identifies. In another embodiment, the video display device 100 may have the URL of the contents providing server 10 in advance, not obtaining the URL from the ACR query response message.

The Live+ app executed in the video display device 100 receives a user input for service type selection in operation S2309. At this point, the service type may correspond to at least one of a program type, a recommendation type, a conversation type, and a plus type. For example, enhancement data corresponding to the selected service type may be a real-time news article relating to cast members and a service recommending a movie in which a program cast member appears as a leading role.

The Live+ app executed in the video display device 100 obtains contents information on the currently recognized program from the ACR engine in the video display device 100, and transmits a program related content request message to the third party server 90 in operation S2311 in order to request enhancement data corresponding to the selected service type. At this point, the program related content request message may include content information on the currently recognized program, information on the selected service type, and the URL of the broadcaster contents providing server 10.

In order to locate enhancement data of a program corresponding to the delivered Global Content ID, the third party server 90 searches the metadata repository in operation S2313. The metadata repository returns a search result on the enhancement data of a program corresponding to the delivered Global Content ID, to the third party server 90.

The third party server 90 accesses the delivered URL of the broadcaster contents providing server 10, and transmits a metadata request message including the delivered broadcaster content ID and timestamp to the contents providing server 10 in operation 2317 in order to request the current scene related enhancement data to the contents providing server 10.

The third party server 90 receives the current scene related enhancement data from the contents providing server 10 in operation S2319.

The third party server 90 processes one or a combination of the received program enhancement data from the metadata repository and the received program enhancement data from the contents providing server 10 and provides the processed enhancement data to the Live+ app executed in the video display device 100 in operation S2321.

FIG. 25 is a conceptual diagram illustrating a video display device according to an embodiment of the present invention.

As shown in FIG. 25, the video display device 100 includes an Audio/Video driver 601, an ACR engine 603, an ACR middleware 605, an ACR user interface 607, and an ACR Plug-in 609.

The audio/video driver 601 captures an audio/vide signal from an external input of a TV and delivers it to the ACR engine 603. The audio/video driver 601 may provide API to allow the ACR engine 603 to access an audio/video buffer. The audio/video driver 601 may also provide characteristic information on audio/video inputted from an external input such as HDMI. For example, the audio/video driver 601 may provide information such as a sample depth, a sampling rate, the number of channels (mono/stereo $\frac{5}{6}$), the number of samples, and a sample time, in the case of audio. In the case of video, the audio/video driver 601 may provide information such as a video format, and the width, height, stride, stream time, input type (HDMI1, HDMI2, composite, component, etc), and the number of frames per second of video.

The ACR engine 603 may be executed as an additional process, and may recognize a program by using the above mentioned various methods. The ACR engine 603 extracts a signature from an audio/video sample, and delivers the extracted signature to the ACR server to recognize content. As described above, the ACR engine 603 may call API to access an audio/video buffer depending on the implementation of a platform, and may deliver the audio/video stream captured by the audio/video driver 601 to an ACR process through a method such as a socket ACR engine 603 sends an ACR query request in addition to the signature to the ACR server, and receives an ACR query response including whether the content recognition is successful, a Content ID, a Global Content ID, a timestamp, a Leanback app URL, and a broadcaster server URL, from the ACR server. The ACR engine 603 may deliver the result from the ACR server to the ACR middleware 605.

The ACR middleware 605 is a module corresponding to the middleware of a DTV process, and processes an ACR control and an ACR query response from the ACR engine 603. The ACR middleware 605 controls ACR by executing or terminating an ACR process or starting or stopping the ACR engine 603. Additionally, the ACR middleware 605 stores values such as a Content ID, a Global Content ID, and a timestamp by parsing the ACR query response. The ACR middleware 605 may provide API to transmit the stored value to an ACR UI or may transmit the stored value to the ACR user interface 607 through a message queue and a global variable. Additionally, in order to deliver data such as a Content ID, a Global Content ID, and a timestamp to an ACR application such as a Live+ app or a Leanback app, the ACR middleware 605 may deliver the data to a web browser through Inter-Process Communication (IPC) of a shared memory and socket.

The ACR user interface 607 may display a UI to a user for ACR control of ACR On/Off, or may display information on the name and time of a recognized program to a user through a status bar UI of a TV.

When the ACR middleware 605 delivers data such as a Content ID, a Global Content ID, and a timestamp, which are to be delivered to an ACR application, to a browser, the ACR plug-in 609 receives the data. The ACR plug-in 609 may deliver a corresponding value to an ACR application through a Plug-in Object Interface. An interface of the ACR plug-in 609 according to an embodiment is shown below.

|  | Name |
|---|---|
| Property | Readonly ACRMetadata metadata |
|  | Readonly String backendURL |
| Method | backendURL getACRMetadata( ) |
|  | String getBackendURL( ) |
|  | Void NotifyACRAppLaunched(Boolean bApp, String url, String desc) |
|  | Void SetAppInfo(String state, String url) |
| Event | function onContentChanged(String contentId) |
|  | function onMediaTimeUpdated(Number mediaTime) |
|  | function onAppShow(String state) |
|  | function onAppHide( ) |

As mentioned above, the metadata provide basic metadata on a recognized program.

backendURL represents the URL of a broadcaster/CP server.

getACRMetadata( ) is a function for obtaining basic metadata on a recognized program and returns the same value as metadata Property.

getBackendURL( ) is a function for returning the URL of a broadcaster/CP server.

NotifyACRAppLaunched( ) is a function for notifying an application of a 2nd screen when the 2nd screen such as a mobile terminal and a TV are paired and an ACR application executes a specific URL or app on a TV.

SetAppInfo( ) is a function for notifying the current state of an ACR application and the app URL of a 2nd screen version of a corresponding application.

onContentChanged( ) is a callback function called when a recognized program is changed.

onMediaTimeUpdated( ) is a callback function called each time a timestamp is changed through ACR.

onAppShow( ) is a callback function called when an application in a 2nd screen moves to a TV, with the TV and 2nd screen paired.

onAppHide( ) is a callback function called when an application in a TV moves to a 2nd screen, with the TV and 2nd screen paired.

FIG. 26 is a ladder diagram illustrating an operation of a video display device according to another embodiment of the present invention.

First, once the video display device 100 is turned on in operation S3101, it transmits to a third party server 90 an ACR configuration information request message that request an ACR configuration information in operation S3103. The third party server 90 may be an enhanced service providing server that is not dependent on any single channel and may include enhanced services for a plurality of channels. Additionally, the third party server 90 may be a server that is not dependent on any single channel, any contents provider, and any MVPD (service provider).

The ACR configuration information request message may be an HTTP GET based request message, and as a parameter, may include information on the version of ACR configuration information applied to the video display device 100, information on product type, and information on platform type. The ACR configuration information request message may have a syntax below.

[HTTP GET syntax]
?ACRConfigVer=<version>[&ProductType=<productType>]
[&PlatformVer=<platformVer>]

In the above syntax, <version> indicates information on the version of ACR configuration information applied to the video display device 100. If no ACR configuration information is applied to the video display device 100, <version> may have the value of 0.

<productType> indicates information on a product type of the video display device 100. For example, if the video display device 100 is a smart TV, a value of <productType> may be "smart TV". Additionally, if the video display device 100 is a Blu-ray Disk Player (BDP), a value of <productType> may be "BDP". If the ACR configuration information request message does not include <productType>, it may request ACR configuration information on all types of products.

<platformVer> indicates information on a platform type of the video display device 100. For example, if a platform type of the video display device 100 is "NetCast and its version is "3.0", a value of <platformVer> may be "NetCast3.0".

If the ACR configuration information request message does not include <platformVer>, it may request ACR configuration information on all types of platforms.

If a predetermined condition is satisfied, the video display device 100 may transmit the ACR configuration information request message to the third party server 90. For example, as soon as the video display device 100 is turned on, it may instantly transmit the ACR configuration information request message to the third party server 90. Additionally, the video display device 100 may periodically transmit the ACR configuration information request message to the third party server 90. Additionally, the video display device 100 may transmit the ACR configuration information request message to the third party server 90 at a predetermined time point.

In response to the ACR configuration information request message, the third party server 90 an ACR configuration information response message including ACR configuration information to the video display device 100 in operation S3105.

Especially, the ACR configuration information response message may include at least one ACR configuration information item group corresponding to an ACR configuration information version of an ACR configuration information request message, a product type, and a platform type If the ACR configuration information version that the third party server 90 has is identical to that of the ACR configuration information request message, the ACR configuration information response message may not include ACR configuration information.

When the ACR configuration information is changed without the ACR configuration information request message, the ACR configuration information response message may be transmitted to the video display device 100.

Then, ACR configuration information according to an embodiment of the present invention is described with reference to FIG. 27.

FIG. 27 is an XML schema diagram of ACR configuration information according to an embodiment of the present invention.

Especially, Tables 3 and 4 illustrate an XML schema of ACR configuration information according to the embodiment of FIG. 27.

As shown in FIG. 27 and Tables 3 and 4, ACR configuration information according to an embodiment of the present invention, as one XML document, includes an ACR_config element, that is, a top element.

The ACR_config element may include an ACR_config_ver attribute indicating an ACR configuration version, and as a sub-element, includes a country_list element and a measurement element.

TABLE 4

```
<xs:complexType name="channel_type">
    <xs:sequence>
        <xs:element name="program" type="program_type"
            maxOccurs="unbounded"/>
    </xs:sequence>
    <xs:attribute name="name" type="xs:string" use="required"/>
    <xs:attribute name="leanback_enable" type="xs:boolean"
        use="optional" default="true"/>
</xs:complexType>
<xs:complexType name="program_type">
    <xs:attribute name="name" type="xs:string" use="required"/>
    <xs:attribute name="leanback_enable" type="xs:boolean"
        use="optional" default="true"/>
</xs:complexType>
<xs:complexType name="measurement_type">
    <xs:attribute name="max_log_size" type="xs:integer"
        use="optional"/>
    <xs:attribute name="report_interval" type="xs:integer"
        use="optional"/>
</xs:complexType>
</xs:schema>
```

TABLE 3

```
<?xml version="1.0" encoding="UTF-8"?>
<xs:schema xmlns:xs="http://www.w3.org/2001/XMLSchema" elementFormDefault="qualified"
attributeFormDefault="unqualified">
    <xs:complexType name="acr_config">
        <xs:sequence>
            <xs:element name="country_list" type="country_list_type" minOccurs="0"/>
            <xs:element name="measurement" type="measurement_type" minOccurs="0"/>
        </xs:sequence>
        <xs:attribute name="acr_config_ver" type="xs:string" use="required"/>
    </xs:complexType>
    <xs:complexType name="country_list_type">
        <xs:sequence>
            <xs:element name="country" type="country_type" maxOccurs="unbounded"/>
        </xs:sequence>
    </xs:complexType>
    <xs:complexType name="country_type">
        <xs:sequence>
            <xs:element name="ACR_server_url" type="ACR_server_url_type" maxOccurs="unbounded"/>
            <xs:element name="broadcaster" type="broadcaster_type" minOccurs="0" maxOccurs="unbounded"/>
            <xs:element name="ACR_on_time" type="ACR_on_time_type" minOccurs="0"
maxOccurs="unbounded"/>
        </xs:sequence>
        <xs:attribute name="code" type="xs:string" use="required"/>
        <xs:attribute name="device_product_type" type="xs:string" use="required"/>
        <xs:attribute name="device_platform_type" type="xs:string" use="required"/>
    </xs:complexType>
    <xs:complexType name="ACR_server_url_type">
        <xs:attribute name="region" type="xs:string" use="optional"/>
    </xs:complexType>
    <xs:complexType name="ACR_on_time_type">
        <xs:attribute name="region" type="xs:string" use="optional"/>
        <xs:attribute name="day" type="xs:string" use="optional"/>
        <xs:attribute name="from" type="xs:time" use="optional"/>
        <xs:attribute name="to" type="xs:time" use="optional"/>
    </xs:complexType>
    <xs:complexType name="broadcaster_type">
        <xs:sequence>
            <xs:element name="channel" type="channel_type" maxOccurs="unbounded"/>
        </xs:sequence>
        <xs:attribute name="name" type="xs:string" use="required"/>
    </xs:complexType>
```

A country_list element includes at least one country element. Each country element includes an ACR configuration information item group applied to each country corresponding to this country element. The country_list element includes a plurality of ACR configuration information item groups applied to a plurality of countries, respectively.

Each country element code includes a code attribute, a device_product_type attribute, a device_platform_type attribute, at least one ACR_server_url element, at least one broadcaster element, and at least one ACR_on_time element.

The code attribute contains an identification code that identifies a country to which an ACR configuration information item of a country element including the code attribute is applied, and especially, this identification code may conform ISO 639 language code.

The device_product_type attribute contains a type of a product to which the ACR configuration information item of a country element including the device product attribute is applied. For example, a value of a device_product_type attribute may be "smart TV" or "BDP".

The device_platform_type attribute contains a platform type and/or version of a product to which the ACR configuration information item of a country element including the device platform attribute is applied. For example, if a platform type of a product to which an ACR configuration information item is applied is "NetCast" and its version is "3.0", a value of a device_platform_type attribute may be "NetCast3.0".

That is, each country element includes an ACR configuration information item group corresponding to a country attribute, a device product type attribute, and a device platform type attribute. The ACR configuration information item group includes a plurality of ACR configuration information items corresponding to a country attribute, a device product type attribute, and a device platform type attribute.

Although it will be described below, the plurality of ACR configuration information items corresponding to a country attribute, a device product type attribute, and a device platform type attribute may include a list of at least one ACR server address for at least one region in the country of the country attribute, information on whether to allow a leanback app, and a turn on time interval of an ACR function for at least one region in the country of the country attribute.

The information on whether to allow a leanback app includes driving permit information on a leanback app and driving limit information on a leanback app. The driving permit information on a leanback app may include a list of broadcasters permitting the driving of a leanback app, a list of channels permitting the driving a leanback app, and a list of programs permitting the driving of leanback app. The driving limit information on a leanback app may include a list of broadcasters limiting the driving of a leanback app, a list of channels limiting the driving a leanback app, and a list of programs limiting the driving of leanback app. In such a way, the third party server 90 provides the information on whether to allow a leanback app to the video display device 100 in order to prevent the leanback app from seriously affecting the stability of the video display device 100.

Each ACR_server_url element includes a region attribute, and a value of each ACR_server_url element may indicate the address (for example, URL) of an ACR server (for example, fingerprint server) applied to a region corresponding to the region attribute. A value of the ACR_server_url element having no region attribute may indicate the address (for example, URL) of an ACR server applied to all regions of a country corresponding to the ACR_server_url element.

In such a way, by notifying the URL address of an ACR server that is locally close to the video display device 100, the video display device 100 performs contents recognition fast and reduces network latency.

Each broadcaster element includes a name attribute, a leanback_enable element, and at least one channel element.

A value of the name attribute of the broadcaster element indicates the name of a broadcaster corresponding to the broadcaster element. In a broader sense, the identifier of a broadcaster may be used.

A value of the leanback_enable element of the broadcaster element indicates whether to drive a leanback app for broadcaster corresponding to the broadcaster element. For example, if a value of the leanback_enable element of the broadcaster element is "true", the video display device 100 downloads and executes a leanback app for broadcaster corresponding to the broadcaster element. On the other hand, if a value of the leanback_enable element of the broadcaster element is "false", the video display device 100 does not download and execute a leanback app for broadcaster corresponding to the broadcaster element. If the broadcaster element does not have the leanback_enable element, a value of the leanback_enable element of the broadcaster element may be regarded as "true" or "false" by default.

Each channel element includes a name attribute, a leanback_enable element, and at least one program element.

A value of the name attribute of the channel element indicates the name of a channel corresponding to the channel element. In a broader sense, the identifier of a channel may be used.

A value of the leanback_enable element of the channel element indicates whether to drive a leanback app for channel corresponding to the channel element. For example, if a value of the leanback_enable element of the channel element is "true", the video display device 100 downloads and executes a leanback app for channel corresponding to the channel element. On the other hand, if a value of the leanback_enable element of the channel element is "false", the video display device 100 does not download and execute a leanback app for channel corresponding to the channel element. If the channel element does not have the leanback_enable element, a value of the leanback_enable element of the channel element may be regarded as "true" or "false" by default.

If a value of the leanback_enable element of the channel element is different from that of the leanback_enable element of the broadcaster element, it has priority.

Each program element includes a name attribute, a leanback_enable element, and at least one program element.

A value of the name attribute of the program element indicates the name of a program corresponding to the program element. In a broader sense, the identifier of a program may be used.

A value of the leanback_enable element of the program element indicates whether to drive a leanback app for program corresponding to the program element. For example, if a value of the leanback_enable element of the program element is "true", the video display device 100 downloads and executes a leanback app for program corresponding to the program element. On the other hand, if a value of the leanback_enable element of the program element is "false", the video display device 100 does not download and execute a leanback app for program corresponding to the program element. If the program element does not have the leanback_enable element, a value of the leanback_enable element of the program element may be regarded as "true" or "false" by default.

If a value of the leanback_enable element of the program element is different from that of the leanback_enable element of the channel element, it has priority.

Each ACR_on_time element includes a region attribute, a day attribute, a from attribute, and a to attribute.

A value of the region attribute of the ACR_on_time element indicates a region to which an ACR on time interval corresponding to the ACR_on_time element is applied. If the ACR_on_time element does not have the region attribute, an ACR on time interval corresponding to the ACR_on_time element may be applied all regions of a country corresponding to the country element including the ACR_on_time element.

A value of the day attribute of the ACR_on_time element indicates a day on which an ACR on time interval corresponding to the ACR_on_time element starts. Especially, a value of the day attribute of the ACR_on_time element indicates a day of the week on which an ACR on time interval corresponding to the ACR_on_time element starts. In this case, if a day of the week on which an ACR on time interval corresponding to the ACR_on_time element starts is Sunday, Monday, Tuesday, Wednesday, Thursday, Friday, or Saturday, a value of the day attribute of the ACR_on_time element may be "SUN", "MON", "TUE", "WED", "THU", "FRI", or "SAT", respectively.

A value of the from attribute of the ACR_on_time element indicates a start time at which an ACR on time interval corresponding to the ACR_on_time element starts.

A value of the to attribute of the ACR_on_time element indicates an end time at which an ACR on time interval corresponding to the ACR_on_time element ends.

If a value of the to attribute of the ACR_on_time element is less than that of the from attribute of the ACR_on_time element, the start time of the ACR on time interval corresponding to the ACR_on_time element becomes a value of the from attribute of a day corresponding to the day attribute, and the end time of the ACR on time interval corresponding to the ACR_on_time element becomes a value of the to attribute of the next day corresponding to the day attribute. For example, if a value of the day attribute is "MON" a value of the from attribute is "18:00:00", and a value of the to attribute is "02:00:00", the start time of the ACR on time interval is Monday 18:00 and the end time of the ACR on time interval is the next day, Tuesday 14:00.

In general, enhanced service is not provided to main audio and video content in all time slots, and is provided to popular main audio and video content. In such a case, when the video playback device 100 continuously transmits an ACR query to an ACR server, the video playback device 100 consumes unnecessary resource and also the ACR server needs to process many queries, so that server expansion is required. The third party server 90 may prevent such problems by providing information on an ACR on time interval to the video playback device 100.

A measurement element includes a max_log_size attribute and a report_interval attribute.

The max_log_size attribute indicates the maximum size of watching information that the video display device 100 can store. For example, if the size of watching information that the video display device 100 stores exceeds 90% of the maximum size of the max_log_size attribute, the video display device 100 transmits some or all of the stored watching information to the third party server 90, and then delete the transmitted information. The unit of max_log_size may be byte.

The report_interval attribute indicates a time interval at which the video display device 100 transmits watching information. For example, after the video display device 100 transmits previous watching information to the third party server 90, when a report time interval corresponding to the report_interval attribute elapses, the video display device 100 transmits some or all of the stored watching information to the third party server 90, and then delete the transmitted information. The unit of report_interval may be byte. The watching information that the video display device 100 reports may include a watching time of main audio and video content, the number of watching of main audio and video content, and the number of user responses on a leanback app.

The third party server 90 may collect and accumulate watching information from a plurality of video display devices. The video display device 100 may request the accumulated watching information to the third party server 90, and then may receive it in response to that.

As shown in FIG. 27 and Tables 3 and 4, ACR configuration information may include various information items as elements or attributes, but is not necessarily limited thereto. That is, unlike FIG. 27 and Tables 3 and 4, ACR configuration information may include information items included as elements, as attributes, and also may include information items included as attributes, as elements. Moreover, according to various embodiments of the present invention, the names of elements or attributes including various information items in ACR configuration information may be changed.

Table 5 illustrates ACR configuration information according to an embodiment of the present invention.

TABLE 5

```
<acr_config acr_config_ver= "0001.0000" >
    <country_list>
        <country code="US" device_product_type="DTV"
        device_platform_type=
"SmartPlatform3.0">
            <ACR_server_url>usa.acr.com</ACR_server_url>
            <broadcaster name="NBCU">
                <channel name="BRAVO">
                    <program name= "TOPCHEF" leanback_enable="true"/>
                </channel>
                <!--
                    All leanback application on USA network are enabled
                -->
                <channel name="USA" leanback_enable="true" />
            </broadcaster>
            <broadcaster name="TURNER" >
                <channel name="TBS" leanback_enable="true" />
                <channel name="TNT">
                    <program name="LEVERAGE" leanback_enable="true"
                    />
                    <program name="FALLING SKIES SEASON 2"
leanback_enable="true" />
                    <program name="DALLAS" leanback_enable="false" />
                </channel>
            </broadcaster>
            <ACR_on_time day="MON" from="18:00:00Z"
            to="02:00:00Z" />
            <ACR_on_time day="WED" fram="18:00:OOZ"
            to="02:00:OOZ" />
            <ACR_on_time day="FRI" from="18:00:00Z" to="02:00:00Z"
            />
        </country>
    </country_list>
</acr_config>
```

Through the ACR configuration information of Table 5, the video display device 100 may recognize that the ACR configuration information is applied to a product having the product type of DTV and the platform type of NetCast3.0 and also includes one ACR configuration information item group applied to the united states.

Additionally, the video display device 100 may recognize that the address of an ACR server for a product having the product type of DTV and the platform type of NetCast3.0 is usa.zeitera.com.

Additionally, the video display device 100 may recognize that it is necessary to drive a leanback app for the TOPCHEF program of the BRAVO channel of a NBCU broadcaster.

Additionally, the video display device 100 may recognize that it is necessary to drive a leanback app for all programs of the TBS channel of a TURNER broadcaster.

Additionally, the video display device 100 may recognize that it is necessary to drive a leanback app for the LEVERAGE program and "FALLING SKIES SEASON 2" program of the TNT channel of the TURNER broadcaster and it is unnecessary to drive the DALLS program of the TNT channel of the TURNER broadcaster.

Additionally, the video display device 100 may recognize that it is necessary to turn on an ACR function from Monday 18:00 to Tuesday 04:00, from Wednesday 18:00 to Thursday 02:00, and from Friday 18:00 to Saturday 02:00, and it is necessary to turn off the ACR function in other times.

The video display device 100 extracts an ACR configuration information item group corresponding to the country that it belongs, its product type, and its platform type from ACR configuration information in operation S3107.

The video display device 100 extracts a plurality of ACR configuration information items from the extracted ACR configuration information item group in operation S3109. As mentioned above, the plurality of ACR configuration information items may include a list of at least one ACR server address for at least one region in the country of the country attribute, information on whether to allow a leanback app, and a turn on time interval of an ACR function for at least one region in the country of the country attribute. Especially, the video display device 100 extracts a plurality of ACR configuration information items for a region that the video display device 100 belongs, from the extracted ACR configuration information item group.

The video display device 100 configures the plurality of extracted ACR configuration information items therein in operation S3111. The video display device 100 may compare the plurality of extracted ACR configuration information items with a configured value and may update it.

The video display device 100 turns on the ACR function on the basis of a configured ACR turn on time interval list in operation S3112.

When the ACR function is turned on, the ACR engine of the video display device 100 extracts characteristic information from some frames of the main audio and video content or a section of audio samples of the main audio and video content, and transmits an ACR query request message including the extracted characteristic information to a corresponding ACR server in operation S3113. The ACR engine of the video display device 100 may transmit the ACR query request message to an ACR server corresponding to the configured ACR server address.

When the ACR function is turned off, the ACR engine of the video display device 100 stops extracting characteristic information from some frames of the main audio and video content or a section of audio samples of the main audio and video content, so that resource waste may be reduced.

The finger print server 22 queries the characteristic information in the ACR query request message from ACR DB, identifies a program corresponding to the characteristic information, and transmits an ACR query response message including contents information on the identified program to the ACR engine of the video display device 100 in operation S3115. At this point, the ACR query response message may include information on whether a program is recognized successfully, contents information, the URL address of a leanback app, and the URL of the contents providing server 10. As described above, the contents information may include the global content ID of the recognized program, the content ID that the broadcaster of the recognized program can identify, the timestamp of the recognized program, the identifier of the broadcaster that provides the recognized program, the identifier of the channel that provides the recognized program, and the name of the recognized program. The identifier of the broadcaster may be the name of the broadcaster. The identifier of the broadcaster may be the name of the broadcaster. According to another embodiment, the video display device 100 may already have the URL of the contents providing server 10 not from the ACR query response message.

The video display device 100 requests a leanback app to the URL address of the leanback app on the basis of the configured information on whether to allow a leanback app in operation S3117.

In more detail, if the contents information in the ACR query response message relates to the driving permit information of a leanback app, the video display device 100 may request the leanback app to the URL address thereof. In addition, if the contents information in the ACR query response message relates to the driving limit information of a leanback app, the video display device 100 may not request the leanback app.

In more detail, if a broadcaster that provides the main audio and video content is identified through the ACR query response message and the identified broadcaster belongs to a list of broadcasters permitting the driving of a lean app, the video display device 100 may request the leanback app to the URL address thereof. If the identified broadcaster belongs to a list of broadcasters limiting the driving of a lean app, the video display device 100 may request the leanback app to the URL address thereof. In addition, if a broadcaster that provides the main audio and video content is identified through the ACR query response message and the identified broadcaster belongs to a list of broadcasters permitting the driving of a lean app, the video display device 100 may not request the leanback app to the URL address thereof. If the identified broadcaster belongs to a list of broadcasters limiting the driving of a lean app, the video display device 100 may not request the leanback app to the URL address thereof. In addition, if the main audio and video content is identified through the ACR query response message and the identified main audio and video content belongs to a list of programs permitting the driving of a lean app, the video display device 100 may request the leanback app to the URL address thereof. If the identified main audio and video content belongs to a list of programs limiting the driving of a lean app, the video display device 100 may not request the leanback app to the URL address thereof.

The video display device 100 receives the leanback app from the URL address thereof in operation S3119, and automatically executes the received leanback app regardless of user input.

FIG. 28 is a ladder diagram illustrating an operation of a video display device according to another embodiment of the present invention.

The video display device 100 obtains ACR configuration information from the third party server 90 in operation S3305. The procedure that the video display device 100 obtains ACR configuration information from the third party server 90 may follow FIG. 28.

Then, ACR configuration information according to an embodiment of the present invention is described with reference to FIG. 29.

FIG. 29 is an XML schema diagram of ACR configuration information according to an embodiment of the present invention.

Especially, Tables 6 and 7 illustrate an XML schema of ACR configuration information according to the embodiment of FIG. 29. Table 5b follows table 5a.

TABLE 6

```
<?xml version="1.0" encoding="UTF-8"
<xs:schema xmlns:xs= "http://www.w3.org/2001/XMLSchema"
elementFormDefault="qualified" attributeFormDefault="unqualified">
    <xs:complexType name="acr_config">
        <xs:sequence>
            <xs:element name="device" type="device_type" minOccurs="0"
maxOccurs="unbounded"/>
        <xs:sequence>
        <xs:attribute name="country_code" type="xs:string"
use="required"/>
        <xs:attribute name="acr_config_format_ver" type="xs:string"
use="required"/>
        <xs:attribute name="version" type="xs:integer" use="required"/>
    <xs:complexType>
    <xs:complexType name="device_type">
        <xs:sequence>
            <xs:element name="ACR_server_url" type="xs:string"/>
            <xs:element name="broadcaster" type="broadcaster_type"
            minOccurs="0"
maxOccurs="unbounded"/>
            <xs:element name="MVPD" type="MVPD_type" minOccurs="0"
maxOccurs="unbounded"/>
        </xs:sequence>
        <xs:attribute name="device_product_type" type="xs:string"
use="required"/>
        <xs:attribute name="device_platform_type" type="xs:string"
use="required"/>
        <xs:attribute name="ACR_On" type="xs:boolean" use="optional"
default="true"/>
        <xs:attribute name="query_interval" type="xs:integer"
use="optional"/>
        <xs:attribute name="user_query_interval" type="xs:integer"
use="optional"/>
    </xs:complexType>
    <xs:complexType name="MVPD_type">
        <xs:sequence>
            <xs:element name="MVPD_logo" type="MVPD_logo_type"
            minOccurs="0"
maxOccurs="unbounded"/>
        </xs:sequence>
        <xs:attribute name="Id" type="xs:string" use="required"/>
        <xs:attribute name="type" type="xs:string" use="required"/>
        <xs:attribute name="DetectOn" type="xs:boolean" use="required"/>
        <xs:attribute name="detect_interval" type="xs:integer"/>
    </xs:complexType>
    <xs:complexType name="MVPD_logo_type">
        <xs:attribute name="type" type="xs:string" use="required"/>
        <xs:attribute name="x" type="xs:integer" use="required"/>
        <xs:attribute name="y" type="xs:integer" use="required"/>
        <xs:attribute name="width" type="xs:integer" use="required"/>
        <xs:attribute name="height" type="xs:integer" use="required"/>
    </xs:complexType>
```

TABLE 7

```
    <xs:complexType name="broadcaster_type">
        <xs:sequence>
            <xs:element name="channel" type="channel_type"
            minOccurs="0"
maxOccurs="unbounded"/>
        <xs:sequence>
        <xs:attribute name="name" type="xs:string" use="required"/>
        <xs:attribute name="query_interval" type="xs:integer"
use="optional"/>
```

TABLE 7-continued

```
    </xs:complexType>
    <xs:complexType name="channel_type">
        <xs:sequence>
            <xs:element name="program" type="program_type"
            minOccurs="0"
maxOccurs="unbounded"/>
        <xs:sequence>
        <xs:attribute name="name" type="xs:string" use="required"/>
        <xs:attribute name="leanback_enable" type="xs:boolean"
use="optional"
default="true"/>
        <xs:attribute name="query_interval" type="xs:integer"
use="optional"/>
    </xs:complexType>
    <xs:complexType name="program_type">
        <xs:attribute name="name" type="xs:string" use="required"/>
        <xs:attribute name="leanback_enable" type="xs:boolean"
use="optional"
default="true"/>
        <xs:attribute name="query_interval" type="xs:integer"
use="optional"/>
        <xs:attribute name="localCache_enable" type="xs:boolean"
use="optional"/>
    </xs:complexType>
</xs:schema>
```

As shown in FIG. 29 and Tables 6 and 7, ACR configuration information, as one XML document, includes an ACR_config element, that is, a top element.

The ACR_config element may include a country_code attribute, an acr_config_format_ver attribute, and a version attribute, and also include at least one device element.

Each device element includes a device_product_type attribute, a device_platform_type attribute, an ACR_On attribute, a query_interval attribute, and a user_query_interval attribute, and also include at least one ACR_server_url element, at least one broadcaster element, at least one MVPD element, and at least one ACR_on_time element. Each device element includes an ACR configuration information item group applied to the product type corresponding to the device_product_type attribute of the device element and the platform type corresponding to the device_platform_type attribute of the device element.

Since the device_product_type attribute and the device_platform_type attribute are described with reference to Tables 3 and 4, their descriptions will be omitted.

Since the ACR_server_url element, the broadcaster element, and the ACR_on_time element are described with reference to Table 3, their descriptions will be omitted.

Each MVPD element includes an Id attribute, a type attribute, a DetectOn attribute, and a detect_interval attribute, and also includes at least one MVPD_logo element.

A value of the Id attribute of the MVPD element indicates an identifier that uniquely identifies an MVPD corresponding to the MVPD element. For example, in the case of North America, a value of the Id attribute of the MVPD element may be "TimeWarner", "Comcast", and so on.

A value of the type attribute of the MVPD element indicates the type of an MVPD corresponding to the MVPD element. Especially, a value of the type attribute of the MVPD element indicates the broadcasting network type of an MVPD corresponding to the MVPD element. For example, a value of the type attribute of the MVPD element may be "Cable", "Satellite", "IPTV", and so on.

The DetectOn attribute of the MVPD element indicates whether the video display device 100 recognizes the logo of an MVPD. If a value of the DetectOn attribute of the MVPD element is "On" (or "true"), the video display device 100 detects the logo of an MVPD from the uncompressed audio and video content outputted from the broadcast receiving device 60, and then identifies an MVPD on the basis of the detected logo. If an MVPD is already recognized, in order to prevent unnecessary resource consumption of the video display device 100, a value of the DetectOn attribute of the MVPD element may be configured to Off. If a value of the DetectOn attribute of the MVPD element is "Off", the video display device 100 does not perform an operation for identifying an MVPD on the basis of the logo detected from the uncompressed audio and video content.

If a value of the DetectOn attribute of the MVPD element is "ON", there may be a detect interval attribute of the MVPD element. The detect interval attribute of the MVPD element indicates a time interval at which the video display device 100 detects the logo of an MVPD from the uncompressed audio and video content, and its unit is second. For example, if detect_interval is 300 (5×60), the video display device 100 attempts to recognize the logo of an MVPD from the uncompressed audio and video content at each 5 minutes.

In general, since a user tends to confirm a program of another channel through EPG while watching a commercial after a program ends, in consideration of the tendency that a user selects a guide or menu through a STB remote controller, the third party server 90 may determine a time interval that determines the logo of an MVPD. Additionally, if a program is frequently changed at every hour or 30 min, the third party server 90 may determine a time interval that detects the logo of an MVPD in consideration of this situation. For example, the third party server 90 may be configured to recognize the logo from each 55 min to 5 min only. In addition, the third party server 90 may be configured to recognize the logo at every 5 min.

Each MVPD_logo element includes a type attribute containing information on the type of a screen displaying the MVPD logo and a logo area attribute containing information on a screen area displaying the MVPD logo. The logo area attribute includes a logo position attribute containing information on the screen position of the MVPD logo and a logo size attribute containing information on the size of the MVPD logo. The logo position attribute includes an x-coordinate (x) attribute and a y-coordinate (y) attribute. The logo size attribute includes a width attribute and a height attribute.

A value of the type attribute of the MVPD logo element indicates the type of the MVPD logo corresponding to the MVPD logo element. In more detail, A value of the type attribute of the MVPD logo element indicates the type of a screen displaying the MVPD logo corresponding to the MVPD logo element. For example, a value of the type attribute may be "EPG", "Menu", "Banner", and so on.

Then, the type and position of the MVPD logo according to various embodiments of the present invention are described with reference to FIGS. 30 to 33.

FIG. 30 is a view of an EPG window displaying the MVPD logo of Dish Network, a satellite operator, according to an embodiment of the present invention. FIG. 31 is a view of an EPG window displaying the MVPD logo of Comcast, a Cable operator, according to an embodiment of the present invention.

As shown in FIGS. 30 and 31, when a value of the type attribute of the MVPD logo element is "EPG", the MVPD logo is displayed on the EPG screen. Accordingly, if a value of the type attribute of the MVPD logo element is "EPG", the video display device 100 may extract the MVPD logo from the EPG screen when the EPG screen is displayed on uncompressed audio and video content.

FIG. 32 is a view of a menu window displaying the MVPD logo of Comcast, a Cable operator, according to an embodiment of the present invention. FIG. 33 is a view of a menu window displaying the MVPD logo of DirecTV, a satellite operator, according to an embodiment of the present invention.

As shown in FIGS. 32 and 33, when a value of the type attribute of the MVPD logo element is "Menu", the MVPD logo is displayed on the menu screen. If a value of the type attribute of the MVPD logo element is "Menu", the video display device 100 may extract the MVPD logo from the Menu screen when the Menu screen is displayed on uncompressed audio and video content.

When a value of the type attribute of the MVPD logo element is "Banner", the MVPD logo is displayed on the banner screen. If a value of the type attribute of the MVPD logo element is "Banner", the video display device 100 may extract the MVPD logo from the Banner screen when the Banner screen is displayed on uncompressed audio and video content.

A value of the x attribute and a value of the y attribute indicate information on the position of the MVPD logo corresponding to the MVPD logo element. A value of the x attribute of the MVPD logo element indicates the position of the x coordinate of the MVPD logo corresponding to the MVPD logo element. A value of the y attribute of the MVPD logo element indicates the position of the y coordinate of the MVPD logo corresponding to the MVPD logo element.

The position values of the x coordinate and the y coordinate of the MVPD logo may be determined based on a resolution. For example, if a screen has a resolution of 1920×1080, the position value of the x coordinate of the MVPD logo may be determined with one of values from 0 to 1919, and the position value of the y coordinate of the MVPD logo may be determined with one of values from 0 to 1079.

In addition, the position values of the x coordinate and the y coordinate of the MVPD logo may be determined based on a relative positional relationship, regardless of the resolution. For example, even if the resolution of a screen is 1920×1080, after the size of the screen is normalized to 100×100, the position values of the x coordinate and the y coordinate of the MVPD logo may be determined with one of values in a normalized range. In this case, the video display device 100 scales the position value of the x coordinate and the y coordinate having a value in a normalized range, so as to obtain the position of the MVPD logo.

A value of the width attribute and a value of the height attribute indicate information on the size of the MVPD logo corresponding to the MVPD logo element. A value of the width attribute of the MVPD logo element indicates the width of the MVPD logo corresponding to the MVPD logo element. A value of the height attribute of the MVPD logo element indicates the height of the MVPD logo corresponding to the MVPD logo element.

The width and height values of the MVPD logo may be determined based on a resolution. For example, if a screen has a resolution of 1920×1080, the width of the MVPD logo may be determined with one of values from 0 to 1919, and the height of the MVPD logo may be determined with one of values from 0 to 1079.

In addition, the width and height of the MVPD logo may be determined based on a relative size, regardless of a resolution. For example, even if the resolution of a screen is 1920×1080, after the size of the screen is normalized to 100×100, the width and height of the MVPD logo may be determined with one of values in a normalized range. In this case, the video display device 100 scales the width and height having a value in a normalized range, so as to obtain the size of the MVPD logo.

The video display device 100 extracts an ACR configuration information item group corresponding to its product type and its platform type from ACR configuration information in operation S3307.

The video display device 100 extracts a plurality of ACR configuration information items from the extracted ACR configuration information item group in operation S3309. As mentioned above, the plurality of ACR configuration information items include at least one ACR server address for at least one region and at least one MVPD information item group respectively corresponding to at least one MVPD. Each MVPD information item group includes information on an MVPD identifier, an MVPD type, whether to detect an MVPD logo, an MVPD logo detect time interval, an MVPD logo screen type, and an MVPD logo screen area. The information on an MVPD logo screen area includes information on an MVPD logo screen position and an MVPD logo size.

The video display device 100 configures the plurality of extracted ACR configuration information items therein in operation S3311. The video display device 100 may compare the plurality of extracted ACR configuration information items with a configured value and may update it.

Then, the video display device 100 extracts at least one image, which is estimated as an MVPD logo, from the uncompressed audio and video content inputted based on at least one MVPD information item group in operation S3313. Especially, if the number of MVPD information item groups is more than one, the video display device 100 may extract a plurality of MVPD logo estimation images that respectively correspond to the plurality of MVPD information item groups. Since each of the plurality of MVPD logo estimation images is extracted based on a corresponding detect time interval, the plurality of MVPD logo estimation images may not be necessarily extracted simultaneously. If a plurality of MVPD logo detect time intervals belonging to the plurality of MVPD information item groups are identical to each other, the plurality of MVPD logo estimation images may be simultaneously extracted.

In more detail, when a value of the DetectOn attribute of the MVPD element is "on", the video display device 100 may extract images, whose number corresponds to the number of MVPD information item groups, from a screen area corresponding to a value of the logo area attribute of the MVPD element according to a time interval corresponding to the detect interval attribute of the MVPD element, when a screen corresponding to a value of the type attribute of the MVPD log element is displayed from the inputted uncompressed audio and video content. Then, the video display device 100 may obtain a plurality of MVPD logo estimation images.

Then, the video display device 100 identifies a subscription MVPD that the video display device 100 subscribes in operation S3315, and obtain the identifier of the subscription MVPD. Especially, if the number of MVPD information item groups is more than one, the video display device 100 may identify MVPD on the basis of the plurality of extracted MVPD logo estimation images.

According to an embodiment, the video display device 100 transmits to the third party server 90 a request message on the plurality of MVPD logo images that respectively correspond to the plurality of MVPDs. Then, the video display device 100 receives from the third party server 90 the plurality of MVPD logo images that respectively correspond to the plurality of MVPDs, and then, creates a database by using the received MVPD logo images. If the video display device 100 includes the data base having the plurality of MVPD logo images that respectively correspond to the plurality of MVPDs, it compares the plurality of MVPD logo images with the plurality of extracted MVPD logo estimation images. If at least one of the plurality of extracted MVPD logo estimation images corresponds to one of the plurality of MVPD logo images, the video display device 100 may identify the MVPD corresponding to the corresponding MVPD logo image as MVPD that the video display device 100 subscribes.

According to another embodiment, the video display device 100 may transmit the plurality of extracted MVPD logo estimation images to the third part server 90 or the fingerprint server 22. In this case, the third part server 90 or the fingerprint server 22 has a database including a plurality of MVPD logo images that respectively correspond to the plurality of MVPDs. The third part server 90 or the fingerprint server 22 compares the plurality of MVPD logo images with the plurality of extracted MVPD logo estimation images. If at least one of the plurality of extracted MVPD logo estimation images corresponds to one of the plurality of MVPD logo images, the third part server 90 or the fingerprint server 22 may identify the MVPD corresponding to the corresponding MVPD logo image as MVPD that it 90 or 22 subscribes. Then, the third part server 90 or the fingerprint server 22 transmits the identifier of an MVPD that the video display device 100 subscribes to the video display device 100, so that the video display device 100 identify the subscription MVPD. When the third party server 90 transmits the identifier of the subscription MVPD to the video display device 100, since the video display device 100 does not need to perform MVPD logo extraction and MVPD identification any more, in order to prevent unnecessary resource consumption of the third party server 90 and the video display device 100, the third party server 90 configures a value of the DetectOn attribute of the MVPD element as OFF or false in the ACR configuration information for the video display device 100, and then provides to the video display device 100 the ACR configuration information that a value of the DetectOn attribute of the MVPD element is OFF. In addition, even after the video display device 100 identifies MVPD, since a user may change the MVPD, when a predetermined time elapses, the third party server 90 may configure a value of the DetectOn attribute of the MVPD element as ON in the ACR configuration information for the video display device 100.

Moreover, the video display device 100 confirms the type of a subscription MVPD from at least one MVPD information item group on the basis of the identifier of a subscription MVPD. That is, among the plurality of MVPD information item groups, since each of the plurality of MVPD identifiers has a corresponding MVPD type, the video display device 100 may confirm the type of a subscription MVPD from at least one MVPD information item group on the basis of the identifier of a subscription MVPD.

If the type of a subscription MVPD is not a satellite operator, the video display device 100 confirms a geographic subscriber location in operation S3319. If the type of a subscription MVPD is a cable operator or a satellite operator, the video display device 100 may confirm a geographic subscriber location.

According to an embodiment, the video display device 100 may confirm a geographic subscriber location on the basis of user input. At this point, in North America, the user input may be zip code.

According to another embodiment, the video display device 100 may confirm its geographic location on the basis of Geo-IP. The Geo-IP is a method of obtaining the geographical location of a terminal from the IP address thereof.

The video display device 100 may transmit its own IP address to the third party server 90, the fingerprint server 22, or a location confirmation server. The third part server 90, the fingerprint server 22, or the location confirmation server may confirm the geographical subscriber location of the video display device 100 by using the IP address, and transmits information on the confirmed geographical subscriber location to the video display device 100, so that the video display device 100 may confirm the geographical subscriber location. At this point, in North America, information on the confirmed geographical subscriber location may be zip code.

The video display device 100 may transmit a package information request message to the third party server 90 in operation S3321. At this point, the package information request message may include the identifier of an MVPD, the type of an MVPD, and a geographical subscriber location. Even in the same package, since a channel map may vary according to a region, the package information request message may include a geographical subscriber position.

The third party server 90 transmits to the video display device 100 the information on a plurality of packages that the MVPD corresponding to the MVPD identifier and the MVPD type provides for the geographical subscriber location of the video display device 100. By doing so, the video display device 100 receives from the third party server 90 the information on a plurality of packages that the MVPD corresponding to the MVPD identifier and the MVPD type provides for the geographical subscriber location of the video display device 100 in operation S3323.

As shown in Table 8, the information on a plurality of packages includes information on a list of channels that each of the plurality of packages provides.

TABLE 8

|  | Standard | TV Essentials | Premium | Sports Pass |
|---|---|---|---|---|
| USA | ○ | ○ | X | X |
| HBO | X | X | ○ | X |
| ESPN | ○ | X | X | ○ |
| CNN | ○ | ○ | X | X |

Especially, Table 8 illustrates information on a plurality of packages that the Time Warner Cable operator of the united states provides.

As shown in Table 8, the Time Warner Cable operator of the united states provides a Standard package, a TV Essentials package, a Premium package, and a Sports Pass package. The Standard package provides the USA channel, the ESPN channel, and the CNN channel, but does not provide the HBO channel. The TV Essentials package provides the USA channel and the CNN channel, but does not provide the ESPN channel and the HBO channel. The Premium package provides the HBO channel but does not provide the USA channel, the ESPN channel, and the CNN channel. The Sports Pass package provides the ESPN channel but does not provide the USA channel, the HBO channel, and the CNN channel.

The video display device 100 identifies at least one channel from inputted uncompressed main audio and video content in operation S3325. Since a user changes a channel serves times a day in general, the video display device 100 may identify at least one channel from the uncompressed audio and video content. Especially, through the procedure shown in FIGS. 3, 6, and 9, the video display device 100 may identify a channel by obtaining the contents information on the inputted uncompressed audio and video content. In more detail, the video display device 100 confirms the broadcaster logo, that is, the displayed watermark, from the uncompressed audio and video content, and identifies a channel providing the uncompressed audio and video content on the basis of the confirmed broadcaster logo. In this case, the video display device 100 may identify a channel by using an internal database including a plurality of broadcaster logos or a watermark server. Additionally, the video display device 100 may identify a channel by obtaining the contents information from an invisible watermark. Additionally, the video display device 100 may identify a channel by extracting the signature from the uncompressed audio and video content and transmitting the extracted signature to the fingerprint server. If the uncompressed main audio and video content is resold content or the same audio and video content is broadcasted through a plurality of channels, the video display device 100 may perform broadcaster logo based channel identification.

The video display device 100 confirms a subscription package on the basis of at least one identified channel in operation S3327.

Referring to Table 8, once the HBO channel is identified, the video display device 100 confirms that the subscription package is the Premium package. Once the USA channel and the ESPN channel are identified, the video display device 100 confirms that the subscription package is the Standard package. Once the CNN channel is identified, if and the ESPN channel is not identified for a predetermined period, the video display device 100 confirms that the subscription package is the TV Essentials package.

If the subscription package is not uniquely identified based on at least one identified channel, the video display device 100 performs additional channel identification.

The video display device 100 requests to the third party server 90 a channel map corresponding to the confirmed subscription package in operation S3329. In response to the channel map request, the third party server 90 configures a value of the DetectOn attribute of the MVPD element in the ACR configuration information for the video display device 100 as OFF or false, and then, provides a channel map corresponding to the subscription package of the video display device 100 to the video display device 100.

The video display device 100 receives the channel map corresponding to the confirmed subscription package from the third party server 90 in operation S3331.

The video display device 100 processes the received channel map in operation S3333.

FIG. 34 is a view of channel map processing according to an embodiment of the present invention. As shown in FIG. 34, the video display device 100 may display the channel name and the channel number of current uncompressed main audio and video content on a screen.

FIG. 35 is a view of channel map processing according to an embodiment of the present invention. As shown in FIG. 35, the video display device 100 may obtain EPG information on the basis of a channel map and then, may display the obtained EPG information.

Then, a structure of a video display device according to various embodiments of the present invention is described with reference to FIGS. 36 to 39.

FIG. 36 is a conceptual diagram of a video display device according to an embodiment of the present invention.

As shown in FIG. 36, the video display device 100 includes an Audio/Video driver 601, an ACR engine 603, an ACR middleware 605, an ACR user interface 607, an ACR Plug-in 609, an enhanced service management unit 611, a channel map management unit 613, and an MVPD logo database management unit 615.

The ACR engine 603 includes a content recognition configuration management unit 631, an MVPD package information management unit 633, and an MVPD logo matching unit 635.

The content recognition configuration management unit 631 transmits to the third party server 90 an ACR configuration information request message requesting ACR configuration information, and receives an ACR configuration information response message including the ACR configuration information. The content recognition configuration management unit 631 extracts an ACR configuration information item group corresponding to the country that it belongs, its product type, and its platform type from ACR configuration information in operation S3107. The content recognition configuration management unit 631 extracts a plurality of ACR configuration information items from the extracted ACR configuration information item group. The content recognition configuration management unit 631 configures the plurality of extracted ACR configuration information items in the video display device 100. The content recognition configuration management unit 631 turns on the ACR function on the basis of a configured ACR turn on time interval list.

When the ACR function is turned on, the ACR engine 603 of the video display device 100 extracts characteristic information from some frames of the main audio and video content or a section of audio samples of the main audio and video content, and transmits an ACR query request message including the extracted characteristic information to a corresponding ACR server in order to receive an ACR query response message including the contents information on the identified program. The ACR engine 603 of the video display device 100 identifies at least one channel from inputted uncompressed main audio and video content.

The enhanced service management unit 611 requests a leanback app to the URL address of the leanback app on the basis of the configured information on whether to allow a leanback app, receives the leanback app, and then, automatically executes the received leanback app regardless of user input.

The channel map management unit 613 requests a channel map corresponding to a subscription package to the third party server 90, receives the channel map corresponding to the confirmed subscription package from the third party server 90, and then, processes the received channel map.

The MVPD package information management unit 633 extracts at least one image, which is estimated as an MVPD logo, from the inputted uncompressed audio and video content on the basis of at least one MVPD information item group, and then, identifies the subscription MVPD that the video display device 100 subscribes on the basis of at least one extracted MVPD logo estimation image to obtain the identifier of the subscription MVPD. The MVPD package information management unit 633 confirms the type of the subscription MVPD from at least one MVPD information item group o the basis of the identifier of the subscription MVPD, and confirms a geographical subscriber location if the type of the subscription MVPD is not a satellite operator. The MVPD package information management unit 633 transmits a package information request message to the third party server 90 and then receives information on a plurality of packages that the subscription MVPD provides from the third party server 90. The MVPD package information management unit 633 confirms a subscription package on the basis of at least one identified channel.

The MVPD logo database management unit 615 transmits to the third party server 90 a request message for a plurality of MVPD logo images that respectively correspond to the plurality of MVPDs, receives the plurality of MVPD logo images from the third party server 90, and then, creates a database by using the received plurality of MVPD logo images.

The MVPD logo matching unit 635 compares the plurality of MVPD logo images with a plurality of extracted MVPD logo estimation images. If at least one of the plurality of extracted MVPD logo estimation images corresponds to one of the plurality of MVPD logo images, the MVPD logo matching unit 635 may identify the MVPD corresponding to the corresponding MVPD logo image as an MVPD that the MVPD logo matching unit 635 subscribes.

FIG. 37 is a conceptual diagram of a video display device according to an embodiment of the present invention.

As shown in FIG. 37, the video display device 100 includes an Audio/Video driver 601, an ACR engine 603, an ACR middleware 605, an ACR user interface 607, an ACR Plug-in 609, an enhanced service management unit 611, and a channel map management unit 613.

The ACR engine 603 includes a content recognition configuration management unit 631 and an MVPD package information management unit 633.

According to the embodiment of FIG. 37, logo matching is performed in the third part server 90 or the fingerprint server 22 instead of the video display device 100. This is described above with reference to FIG. 28 and thus, its description will be omitted.

An application that is an enhanced service of broadcasting content is usually synchronized with the broadcasting content when being executed. Thus, when a user changes a channel or the broadcasting content is changed to other broadcasting content in addition to when an application termination command is received, the video display device 100 generally terminates the application. The reason is that when the broadcasting content is changed due to a change of the broadcasting content to other broadcasting content in the same channel or a change to another channel, the continuous execution of the application by the video display device 100 may disturb the viewing of the broadcasting content. Also, a broadcaster that provides broadcasting content may desire the video display device 100 to terminate an application when there is a change to another channel in order to provide a service distinct from another broadcaster.

In this case, the video display device 100 that receives compressed audio and video content including broadcasting related signaling data in addition to video or audio data may determine through signaling data whether to terminate broadcasting the broadcasting content. For example, the video display device 100 that receives compressed audio and video content according to a DVB standard may determine whether to terminate the broadcasting content with running status information included in an event information table (EIT). Also, the video display device 100 according to an ATSC standard may compare content broadcasting content start time and termination time information in the EIT with the current time to determine whether to terminate broadcasting the broadcasting content.

However, when receiving uncompressed audio and video content to execute an application related to uncompressed audio and video content, such as an ACR application, the uncompressed audio and video content does not include signaling information and thus the video display device 100 may not use the above-described method.

Also, even when there is a change to another channel, a user input is not provided to the video display device 100 that receives the uncompressed audio and video content but provided to a broadcasting receiver that provides the uncompressed audio and video content. Thus, the video display device 100 that receives the uncompressed audio and video content requires a separate operation for sensing that the channel has been changed.

To this end, a method of receiving the uncompressed audio and video content to control the execution of an application related to the uncompressed audio and video content, such as an ACR application is described through FIG. 38.

FIG. 38 shows how a video display device executes and terminates an ACR application according to an embodiment.

The video display device 100 transmits an ACR query request message in operation S2901. As described earlier, the video display device 100 may extract characteristic information from uncompressed audio and video content and transmit an ACR query message based on the characteristic information. For example, the ACR query message may include the characteristic information.

The video display device 100 receives an ACR query response message related to the ACR query request message in operation S2903. As described earlier, the video display device 100 may receive the ACR query response message including URL that the ACR application may be downloaded. Also, the video display device 100 may receive the ACR query response message including trigger information that triggers the execution of the ACR application.

The video display device 100 executes an ACR application based on the ACR query response message in operation S2905. As described earlier, the video display device 100 may download and execute the ACR application based on URL in the ACR query response message. Also, the video display device 100 may execute the ACR application based on trigger information in the ACR query response message.

The video display device 100 performs the following operation in order to sense whether to change content and whether to change a channel. In particular, the operation may be regularly performed at a certain time interval.

The video display device 100 extracts characteristic information from uncompressed content in operation S2907.

The video display device 100 transmits the ACR query request message based on the characteristic information in operation S2909. As described earlier, the ACR query message may include the characteristic information.

The video display device 100 receives the ACR query response message related to the ACR query request message in operation S2911. In this case, the ACR query response message may include content information on uncompressed audio and video content. The content information on the uncompressed audio and video content may include one or more of identification information of a content provider that provides main audio and video content, main audio and video content identification information, time information of a content section used in content information acquisition, identification information on channels through which main audio and video content is broadcasted, a usage information reporting address, a usage information reporting period, the minimum usage time for usage information acquisition, and available enhanced service information relating to main audio and video content, as described earlier. The main audio and video content identification information may include at least one of an event ID and content ID on a DVB standard and ATSC standard, and CRID on a TV Anytime standard. The identification information on channels through which main audio and video content is broadcasted may include at least one of a name of a channel through which main audio and video content is broadcasted, a logo of a channel through which main audio and video content is broadcasted, a description of a channel through which main audio and video content is broadcasted, a virtual channel number of a channel through which main audio and video content is broadcasted, a service ID on the DVB standard, and a source ID on the ATSC standard.

The video display device 100 terminates the execution of the ACR application based on the termination condition of the ACR application in operation S2913. In particular, the termination condition of the ACR application may include at least one of whether to change content, whether to change a content provider, and whether to change a channel. In this case, the video display device 100 may determine the termination condition based on the ACR query response message. In particular, the video display device 100 may determine whether to change content, whether to change a content provider, and whether to change a channel, based on the ACR query response message. In a particular embodiment, the video display device 100 may stop the execution of the ACR application if the content identification information in the ACR query response message is different from uncompressed content when the ACR application is executed. For example, the video display device 100 may stop the execution of the ACR application if the content ID in the ACR query response message is different from the content ID of uncompressed content when the ACR application is executed. Accordingly, when content irrelevant to the ACR application is viewed, the ACR application may not be executed. Also, the video display device 100 may stop the execution of the ACR application if identification information on the content provider in the ACR query response message is different from uncompressed content when the ACR application is executed. Accordingly, the content provider may not execute the ACR application only for content that he or she has provided. Also, the video display device 100 may stop the execution of the ACR application if identification information on the channel through which content in the ACR query response message is broadcasted is different from identification information on a channel through which uncompressed content is broadcasted when the ACR application is executed. For example, the video display device 100 may stop the execution of the ACR application if a name of a channel through which the content in the ACR query response message is broadcasted is different from a name of a channel through which the uncompressed content is broadcasted when the ACR application is executed. The video display device 100 may accordingly prevent the execution of the ACR application even when another channel irrelevant to the ACR application is viewed. Also, the video display device 100 may stop the execution of the ACR application when the ACR query response message represents content recognition failure.

In addition, the video display device 100 may sense whether to change a channel and whether to change content based on the fade out of the video or audio of uncompressed audio and video content. General broadcast receiving devices execute a video fade out that the previous screen disappears and a black screen appears and an audio fade out that audio gradually disappears, when a channel is changed. Also, general broadcasters execute video and audio fade outs when there is a change to new content. Thus, the video display device 100 may sense the fade out of the video or audio of the uncompressed audio and video content to determine whether to change a channel and whether to change content. Thus, the video display device 100 may terminate the ACR application when the fade out of the video or audio in the uncompressed content is sensed.

In addition, the termination condition of the ACR application may include at least one of the number of content changes, the number of content provider changes, and the number of channel changes. In particular, the video display device 100 may terminate the ACR application when content is changed two or more times.

Also, in a particular embodiment, when the ACR application satisfies the termination condition, the ACR application is terminated and then a re-execution condition is satisfied, it is possible to re-execute the ACR application from an execution point where the ACR application is terminated. In this case, the re-execution condition may include changing content in the same manner as content when the ACR application is executed. For example, when there is a change to commercial break content during the execution of the ACR application, the ACR application is terminated, commercial content is terminated, and broadcasting content is received, it is possible to re-execute the ACR application from an execution point where the ACR application is terminated. In this case, the re-execution condition may include changing a channel in the same manner as the channel when the ACR application is previously executed. For example, when there is a change to another channel during the execution of the ACR application, the ACR application is terminated, and there is a return to the original channel, it is possible to re-execute the ACR application from an execution point where the ACR application is terminated. Also, the re-execution condition may be recognizing the content of the same content provider as the content provider when the ACR application is previously executed. For example, when there is a change to another channel during the execution of the ACR application, the ACR application is terminated, there is a change to another channel, and the content of the same content provider is recognized, it is possible to re-execute the ACR application from an execution point where the ACR application is terminated.

In this case, there may be, however, a problem that the ACR application is terminated even when a user does not desire to terminate an application. In particular, since content recognition based on the characteristic information has a certain error, the recognition failure of the characteristic information may occur even when the same uncompressed content is received. Thus, there may be a problem that the video display device 100 terminates the ACR application even when the same uncompressed content is continuously received. Also, depending on the type of the ACR application, there may be content that does not require synchronization with uncompressed content. For example, the ACR application may be an application that sells a product related to uncompressed audio and video content. In this case, when in the processes of determining product purchase and placing an order, content is changed and the ACR application is terminated, the user should re-enter order information from the beginning and place the order when the ACR application is executed next time. Alternatively, the user experiences inconvenience in that he or she needs to search for the same product and place an order, through other means, such as a computer. Thus, when other content is recognized, a channel is changed, or content recognition has failed, there is a need for a method of operating the video display device 100 that selectively terminates the ACR application based on the type of the ACR application and user's intention. Related descriptions are provided with reference to FIGS. 39 to 46.

FIG. 39 shows an ACR plug-in interface to which a duration related method is added according to another embodiment.

In order to selectively terminate the ACR application based on the type of the ACR application and user's intention, the ACR plug-in interface may further include the method SetForceAliveTime. The execution duration time is the minimum time for which the ACR application maintains an execution state. However, the termination of the ACR application by a user input may be allowed even for the execution duration. In a particular embodiment, the execution duration may be based on the execution start time of the ACR application. In another particular embodiment, the execution duration may be based on when the ACR application satisfies the termination condition for the first time. In this case, the termination condition may include when different content from the previous time is recognized, a channel change has been recognized or content recognition has failed, as described earlier. For example, when received uncompressed content is not recognized during the ACR application, the termination condition is satisfied at 1:00, and the execution duration is ten minutes, the video display device 100 may not terminate the ACR application when additionally received uncompressed content is not recognized and the time when the termination condition is additionally satisfied is before 1:10. The method SetForeceAliveTime sets the value of alivetime as the execution duration so that the ACR application maintains an execution state corresponding to the variable aliveTime. In this case, the unit of the aliveTime may be in units of second. Also, when the aliveTime is set to −1, it may represent that a setting is performed not to terminate as long as a user does not termination the ACR application. The operation of the video display device 100 that sets the execution duration of the ACR application is described in detail through FIG. 40.

FIG. 40 shows how a video display device executes an ACR application and performs exceptional handling related to the termination of the ACR application according to still another embodiment.

As described earlier, the video display device 100 transmits an ACR query request message in operation S3001, receives an ACR query response message related to the ACR query request message in operation S3003, and executes the ACR application based on the ACR query response message in operation S3005.

The video display device 100 sets the execution duration of the ACR application in operation S3007. In this case, the video display device 100 may set the execution duration of the ACR application through the method SetForceAliveTime as described in FIG. 39. The execution duration may depend on the characteristic of an application.

Also, the video display device 100 performs the following operation in order to sense whether to change content and whether to change a channel, as described earlier.

The video display device 100 extracts characteristic information from uncompressed content in operation S3009 and transmits the ACR query request message based on the characteristic information in operation S3011. The ACR query response message related to the ACR query request message is received in operation S3013.

The video display device 100 checks the execution duration of the ACR application in operation S3015.

When the execution duration of the ACR application elapses, the video display device 100 terminates the execution of the ACR application based on the ACR application termination condition in operation S3017. In the embodiment of FIG. 4, the video display device 100 may not terminate the ACR application even when the ACR query response message satisfies the termination condition of the ACR application, unlike the embodiment of FIG. 38. In particular, the video display device 100 may not stop the execution of the ACR application when the termination condition is satisfied but the execution duration has not elapsed. In a particular embodiment, the video display device 100 may not stop the execution of the ACR application if the execution duration has not elapsed even when the content identification information in the ACR query response message is different from uncompressed content when the ACR application is executed. For example, the video display device 100 may not stop the execution of the ACR application if the execution duration has not elapsed even when the content ID in the ACR query response message is different from the content ID of uncompressed content when the ACR application is executed. Also, the video display device 100 may not stop the execution of the ACR application if the execution duration has not elapsed even when identification information on a content provider in the ACR query response message is different from uncompressed content when the ACR application is executed. Also, the video display device 100 may not stop the execution of the ACR application if the execution duration has not elapsed even when identification information on a channel through which content in the ACR query response message is broadcasted is different from identification information on a channel through which uncompressed content is broadcasted when the ACR application is executed. Also, when the ACR query response message fails content recognition but the execution duration has not elapsed, the video display device 100 may not stop the execution of the ACR application.

As described earlier, the video display device 100 may sense whether to change a channel and whether to change content even based on the fade out of the video or audio of uncompressed audio and video content. When the fade out of the video or audio in the uncompressed content is sensed but the execution duration has not elapsed, the video display device 100 may not terminate the ACR application.

According to a particular embodiment, the video display device 100 may terminate the ACR application when the execution duration has elapsed. For example, in the case that the execution duration is 300 seconds and 300 seconds have passed from when the ACR application is executed, the video display device 100 may terminate the ACR application when 300 seconds elapse from when the ACR application is executed. Alternatively, in the case that the execution duration is 300 seconds and 300 seconds have elapsed from when the ACR application satisfies the termination condition for the first time, the video display device 100 may terminate the ACR application when 300 seconds elapse from when the termination condition is satisfied for the first time.

Thus, the video display device 100 according to still another embodiment may prevent the ACR application from becoming terminated unconditionally. Also, since it is possible to set the execution duration of the ACR application when an application is executed, it is possible to change the execution durations of the ACR application according to the characteristic and situation of the ACR application. However, it is significantly difficult for the video display device 100 to determine the execution duration in consideration of all the situations that will occur after the ACR application is executed. Thus, there is a need for an operating method of the video display device 100 for supplementing it. Related descriptions are provided with reference to FIGS. 41 to 46.

The operating method of the video display device 100 in which a user determines whether to terminate the ACR application is described through FIGS. 41 and 42.

FIG. 41 shows an ACR plug-in interface to which a method and an event are been added which are required in order to enable a user to select whether to terminate an ACR application according to still another embodiment.

In order to selectively terminate the ACR application based on the type of the ACR application and user's intention, the ACR plug-in interface may further include the method SetKeepingAppSession and the event onSelectAppClose. The event onSelectAppClose is an event notifying that the ACR application satisfies the termination condition. The method SetKeepingAppSession receives a user input related to whether to terminate the ACR application, from the user. When the event onSelectAppClose occurs, the video display device 100 may use the method SetKeepingAppSession to receive the user input related to whether to terminate the ACR application. Also, the video display device 100 may terminate the ACR application based on the user input related to whether to terminate the ACR application. The operation of the video display device 100 that enables a user to select whether to terminate the ACR application is described in detail through FIG. 42.

FIG. 42 shows how a video display device determines based on a user input whether to terminate an ACR application according to still another embodiment.

As described earlier, the video display device 100 transmits an ACR query request message in operation S3101, receives an ACR query response message related to the ACR query request message in operation S3103, and executes the ACR application based on the ACR query response message in operation S3105.

Then, the video display device 100 sets the execution duration of the ACR application in operation S3107.

Also, the video display device 100 performs the following operation in order to sense whether to change content and whether to change a channel, as described earlier.

The video display device 100 extracts characteristic information from uncompressed content in operation S3109 and transmits the ACR query request message based on the characteristic information in operation S3111. The ACR query response message related to the ACR query request message is received in operation S3113. Then, the video display device 100 checks the execution duration of the ACR application in operation S3115.

The video display device 100 receives a user input related to whether to terminate the ACR application. In particular, it is possible to include the following operations. When the execution duration of the ACR application has not elapsed and the termination condition of the ACR application is satisfied, the video display device 100 displays a user input menu related to selection of whether to terminate in operation S3117. The video display device 100 receives a user input related to whether to terminate the ACR application in operation S3119.

the video display device 100 continues the execution of the ACR application based on the user input related to whether to terminate the ACR application in operation S3121. When the termination condition of the ACR application is satisfied but a user input representing the continuous execution of the ACR application is received, the video display device 100 continues the execution of the ACR application. Accordingly, it is possible to prevent the ACR application from becoming terminated when a user does not desire.

When in the embodiment of FIG. 42, the termination condition of the ACR application is satisfied and a user input representing the termination of the ACR application is received, the video display device 100 continues the execution of the ACR application.

In the embodiment of FIG. 42, the video display device 100 receives a user input related to whether to terminate the ACR application during the execution of the ACR. Thus, since during the execution of the ACR application, the use should input his or her intention on whether to terminate the ACR application, the execution of the ACR application is disturbed. Therefore, there is a need for an operating method of the image display device 100 that may receive a user input related to whether to terminate the ACR application, not disturbing the execution of the ACR application. Related descriptions are provided with reference to FIGS. 44 to 46.

FIG. 43 shows an ACR plug-in interface to which a method is added which is required in order to enable an ACR application to terminate a browser according to still another embodiment.

When the execution of the ACR application requires the execution of a separate browser, the ACR plug-in interface may further include the method SetTVBrowserClose for the termination of the browser when the ACR application is terminated. In this case, when the execution of the ACR application requires the execution of the separate browser, the video display device 100 terminates the browser through the method SetTVBrowserClose and terminates the ACR application.

Through FIGS. 44 to 46, an operating method of the video display device 100 is described which receives a user input related to an execution duration from a user to execute the ACR application when the ACR application is executed.

FIG. 44 shows how a video display device determines the duration of an ACR application based on a user input according to still another embodiment.

As described earlier, the video display device 100 transmits an ACR query request message in operation S3201, receives an ACR query response message related to the ACR query request message in operation S3203, and executes the ACR application based on the ACR query response message in operation S3205.

Then, the video display device 100 sets the execution duration of the ACR application based on the user input. In particular, it is possible to include the following operations.

The video display device 100 displays a user input menu related to the execution duration of the ACR application in operation S3207. The video display device 100 receives a user input related to whether to terminate the ACR application in operation S3209. The video display device 100 sets based on the user input in operation S3211. Related descriptions are provided with reference to FIG. 45. FIG. 45 shows a graphic user interface of a video display device that receives a user input related to the duration of an ACR application according to still another embodiment. The video display device 100 may receive an execution duration in units of second, as in the embodiment of FIG. 45. Also, it is possible to display an input execution duration. In this case, the video display device 100 may set the execution duration through the method SetForceAliveTime as described earlier. Accordingly, the user may continue to execute the ACR application for a time that he or she desires.

Also, the video display device 100 performs the following operation in order to sense whether to change content and whether to change a channel, as described earlier.

The video display device 100 extracts characteristic information from uncompressed content in operation S3213 and transmits the ACR query request message based on the characteristic information in operation S3215. The ACR query response message related to the ACR query request message is received in operation S3217. Then, the video display device 100 checks the execution duration of the ACR application in operation S3219.

As described earlier, when the execution duration of the ACR application elapses, the video display device 100 terminates the execution of the ACR application based on the ACR application termination condition in operation S3221.

Also, in a particular embodiment, the video display device 100 may terminate the ACR application when the execution duration has elapsed. In this case, the video display device 100 may display through a graphic user interface that the execution duration has elapsed and expired, terminating the ACR application as in the embodiment of FIG. 46.

In the embodiments of FIGS. 44 to 46, a user sets an execution duration when the ACR application is executed. Thus, the user determines the execution time of the ACR application, without disturbance of the execution of the ACR application, unlike the embodiment of FIG. 43.

In general, broadcasting content is re-transmitted through many transmission means. In this case, a content provider that has manufactured broadcasting content for the first time may not insert commercial into re-transmitted broadcasting content or provide a product selling enhancement service. Thus, it is difficult to make a profit through the commercial or product selling utilizing the broadcasting content. An application that sells a product related to uncompressed audio and video content has been simply described above as one of ACR applications that execution durations are set so that termination is not performed. When a product purchase application related to the uncompressed audio and video content is provided by using the ACR application, it is possible to solve problems that it is difficult for a content provider to insert commercial into re-transmitted broadcasting content or provide a product selling enhancement service. Through FIGS. 47 to 60, an operating method of the vide display device 100 that provides a product purchase application related to the uncompressed audio and video content by using the ACR application is described.

FIG. 47 is a block diagram that shows the operations of a live TV application for uncompressed audio and video content viewing, an ACR application, and a market place application for a product purchase according to an embodiment.

In the embodiments of FIGS. 47 to 60, the video display device 100 may include the live TV application, the ACR application and the market place application. In this case, the live TV application receives trigger related to uncompressed content. In particular, the live TV application may extract characteristic information from the uncompressed content to transmit an ACR query request message and receive trigger based on the ACR query request message. Also, the live TV application may execute the ACR application based on the trigger. In this case, the live TV application may download and execute the ACR application. The ACR application may display that there is a product related to broadcasting content. Also, the ACR application may display a list of products related to the broadcasting content and detail information. The ACR application may provide information on the product selected by a user to the market place application. The market place application receives account information from the user, receives purchase information including payment information and shipping information and determines the selling of the product selected by the user.

Alternatively, the video display device 100 may include the live TV application and the ACR application. In this case, the ACR application functions as the market place application. In particular, the ACR application receives the account information and the shipping information and determines the selling of the product selected by the user.

FIG. 48 shows the operation of a video display device that performs a product purchase related to uncompressed audio and video content according to an embodiment.

The video display device 100 receives the uncompressed audio and video content through a live TV application in operation S3301.

The video display device 100 receives a trigger related to the uncompressed content through the live TV application in operation S3303. In particular, the video display device 100 extracts characteristic information from the uncompressed content through the live TV application and transmits an ACR query request message. The video display device 100 may receive a trigger based on the ACR query request message through the live TV application. Also, in a particular embodiment, characteristic information in the ACR query request message may be characteristic information that identifies an object at a specific region of an uncompressed audio and video content screen. In this case, the video display device 100 may designate the specific region based on a user input. For example, when a user designates a region of a screen on which a watch worn by a character in the uncompressed audio and video content appears, the video display device 100 extracts characteristic information from the region of the screen on which the watch worn by the character appears. Then, the video display device 100 may transmit the ACR query request message including the characteristic information extracted from the region of the screen on which the watch worn by the character appears. Accordingly, the user may efficiently obtain product information on a particular object of interest.

The video display device 100 executes the ACR application based on the trigger through the live TV application in operation S3305. In particular, the live TV application may download and execute the ACR application based on the trigger. In a particular embodiment, the video display device 100 may extract URL from which the ACR application may be downloaded based on the trigger through the live TV application. In this case, the video display device 100 may download the ACR application from the URL through the live TV application.

The video display device 100 displays that there is a product related to the uncompressed audio and video content, through the ACR application. Related descriptions are provided with reference to FIGS. 49 to 50*b*.

FIG. 49 shows a graphic user interface of a video display device displaying that there is a product related to uncompressed audio and video content according to an embodiment.

FIGS. 50A and 50B show a graphic user interface of a video display device displaying that there is a product related to uncompressed audio and video content according to another embodiment.

As in the embodiments of FIGS. 49 to 50*b*, the video display device 100 may display that there is a product related to uncompressed content, through an ACR application. In particular, when a specific button is pressed, it is possible to display an entrance to a menu for a product purchase related to the uncompressed content. For example, as in the embodiment of FIG. 49, when the OK button is pressed, it is possible to display an entrance to a menu for a product purchase. Also, as in the embodiment of FIGS. 50A and 50B, when the red button is pressed, it is possible to display an entrance to a menu for a product purchase. FIG. 50A shows how to display an entrance to a menu for a product purchase when the video display device 100 receives a red-button input through the ACR application. FIG. 50B shows how the video display device 100 receives the red-button input from a user through the ACR application and displays a product purchase menu. Also, in a particular embodiment, the video display device 100 may enable the graphic user interface displaying that there is a product related to uncompressed content, through the ACR application to disappear after a certain time elapses. Also, in a particular embodiment, the video display device 100 may regularly display the graphic user interface displaying that there is a product related to uncompressed content, through the ACR application. In a particular embodiment, the video display device 100 may change the graphic user interface displaying that there is a product related to uncompressed content through the ACR application, according to the scene characteristic of uncompressed audio and video content. For example, the video display device 100 may display the graphic user interface displaying that there is a product related to uncompressed content, through the ACR application so that the user interface does not overlap with subtitles in the uncompressed content. Also, the video display device 100 may display the graphic user interface displaying that there is a product related to uncompressed content, through the ACR application so that the user interface does not overlap with the characters of the uncompressed content. Accordingly, it is possible to display that there is a product related to the uncompressed content, not disturbing the viewing of the uncompressed content. Also, in a particular embodiment, the video display device 100 may display the graphic user interface displaying that there is a product related to uncompressed content, through the ACR application, at a specific position designated by a user. Also, in a particular embodiment, the video display device 100 may display the graphic user interface displaying that there is a product related to uncompressed content, through the ACR application, with transparency designated by a user.

The video display device 100 displays a list of products related to the uncompressed audio and video content through the ACR application in operation S3309. Related descriptions are provided with reference to FIGS. 51 and 52.

FIG. 51 shows a graphic user interface of a video display device that displays a list of products related to uncompressed audio and video content according to an embodiment.

FIG. 52 shows a graphic user interface of a video display device that displays a list of products related to uncompressed audio and video content according to an embodiment.

As in the embodiments of FIGS. 51 and 52, the video display device 100 may display a list of products related to uncompressed audio and video content, through an ACR application. In particular, as in the embodiments of FIGS. 51 and 52, the video display device 100 may change product selection according to a user input through the ACR application. In this case, the video display device 100 may highlight a selected product through the ACR application and display the highlighted product. For example, the video display device 100 may expand a selected product through the ACR application so that the selected product is larger than other products, and display the expanded product. The video display device 100 may display the contour of a selected product in another color through the ACR application. Also, the video display device 100 may display detail information on a selected product together through the ACR application.

The video display device 100 receives a user input related to product selection through the ACR application and displays detail information on the product in operations S3311 and S3313. Related descriptions are provided with reference to FIGS. 53 and 54.

FIG. 53 shows a graphic user interface of a video display device that displays detail information on a product related to uncompressed audio and video content according to an embodiment.

FIG. 54 shows a graphic user interface of a video display device that displays detail information on a product related to uncompressed audio and video content according to an embodiment.

As in the embodiments of FIGS. 53 and 54, the video display device 100 may display detail information on a product selected according to a user input, through an ACR application. In particular, the video display device 100 may display detail information on a product that include at least one of product price information, size information, and manufacturer information.

The video display device 100 determines whether a user input related to storing a selected product in a wish list through the ACR application is received in operation S3315.

When the user input related to storing the selected product in the wish list is received, the video display device 100 stores information on the selected product in the wish list through the ACR application in operation S3317. Accordingly, a user may easily find information on the product selected later. According to a particular embodiment, the video display device 100 may transmit information on the selected product to an external server and store the transmitted information therein.

Then, the video display device 100 terminates the ACR application in operation S3319, and receives the uncompressed audio and video content through a live TV application.

When the user input related to storing the selected product in the wish list is not received, the video display device 100 receives a user input related to a purchase through the ACR application.

The video display device 100 executes a market place application through the ACR application in operation S3323. As described earlier, according to a particular embodiment, the video display device 100 may perform the operation of the market place application through the ACR application, instead of executing the market place application.

The video display device 100 obtains user account information through the market place application. In particular, account information may include an ID identifying a user and a password that may confirm the user. Also, the ID of the user may be a unique device identification number assigned to the video display device 100. In another particular embodiment, the account information may include a phone number and a zip code. In a particular embodiment, the video display device 100 may obtain the user account information from a memory 150 through the market place application. In another particular embodiment, the video display device 100 may obtain the user account information based on a user input, through the market place application. Related descriptions are provided with reference to FIG. 55.

FIG. 55 shows a graphic user interface of a video display device that receives account information from a user for a product purchase related to uncompressed audio and video content according to an embodiment.

In FIG. 55, the video display device 100 receives the phone number and the zip code through the market place application. In this case, the image display device 100 may display the phone number for purchase guide together as in the embodiment of FIG. 55.

The video display device 100 obtains user purchase information through the market place application. In this case, the purchase information may include at least one of shipping information and payment information. In a particular embodiment, the video display device 100 may obtain user purchase information from a memory 150 through the market place application. In another particular embodiment, the video display device 100 may obtain the user purchase information from an external server based on user account information, through the market place application. For example, the video display device 100 may receive information on a credit card corresponding to a user account and an address from the external server through the market place application. In another particular embodiment, the video display device 100 may obtain the user purchase information based on a user input, through the market place application. Related descriptions are provided with reference to FIGS. 56 to 58.

FIG. 56 shows a graphic user interface of a video display device that receives payment information from a user for a product purchase related to uncompressed audio and video content according to an embodiment.

In the embodiment of FIG. 56, the video display device 100 receives information on a credit card through a user input, through a market place application. In this case, the information on the credit card may include any one of a card number, an expiry date, and a security code.

FIGS. 57 and 58 show graphic user interfaces of a video display device that receives shipping information from a user for a product purchase related to uncompressed audio and video content according to an embodiment.

The shipping information may include at least one of a shipping address, a shipping method, and a shipping phone number. In the embodiment of FIG. 57, the vide display device 100 receives a user input related to shipping information through the market place application. In the embodiment of FIG. 58, the vide display device 100 receives user inputs related to the shipping address and the shipping phone number through the market place application.

The video display device 100 determines the purchase of a product related to the uncompressed audio and video content through the market place application in operation S3329. In particular, the video display device 100 may transmit obtained purchase information to an external server through the market place application to determine the purchase of the product related to the uncompressed audio and video content. In this case, the video display device 100 may transmit obtained account information to the external server together with the purchase information through the market place application.

The video display device 100 may display purchase information on a completed purchase through the market place application. Related descriptions are provided with reference to FIGS. 59 and 60.

FIG. 60 shows a graphic user interface of a video display device displaying that the purchase of a product related to uncompressed audio and video content has been completed according to an embodiment. The video display device 100 may display a message that a purchase has been completed and purchase information including shipping information and payment information as in the embodiment of FIG. 59, through the market place application. Also, as in the embodiment of FIG. 60, it is possible to display a message that the purchase has been completed and a call center number.

As described earlier, the video display device 100 may obtain user account information and purchase information through the ACR application, not the market place application. Also, the video display device 100 may determine a purchase of a product related to uncompressed audio and video content and display the purchase information through the ACR application, not the market place application.

FIG. 61 is a block diagram illustrating a structure of a fingerprint based video display device according to another embodiment.

As shown in FIG. 61 a tuner 501 extracts a symbol from an 8-VSB RF signal transmitted through an air channel.

An 8-VSB demodulator 503 demodulates the 8-VSB symbol that the tuner 501 extracts and restores meaningful digital data.

A VSB decoder 505 decodes the digital data that the 8-VSB demodulator 503 to restore an ATSC main service and ATSC M/H service.

An MPEG-2 TP Demux 507 filters a Transport Packet that the video display device 100 is to process from an MPEG-2 Transport Packet transmitted through an 8-VSB signal or an MPEG-2 Transport Packet stored in a PVR Storage to relay the filtered Transport Packet into a processing module.

A PES decoder 539 buffers and restores a Packetized Elementary Stream transmitted through an MPEG-2 Transport Stream.

A PSI/PSIP decoder 541 buffers and analyzes PSI/PSIP Section Data transmitted through an MPEG-2 Transport Stream. The analyzed PSI/PSIP data are collected by a Service Manager (not shown), and then, is stored in DB in a form of Service Map and Guide data.

A DSMCC Section Buffer/Handler 511 buffers and processes DSMCC Section Data for file transmission through MPEG-2 TP and IP Datagram encapsulation.

An IP/UDP Datagram Buffer/Header Parser 513 buffers and restores IP Datagram, which is encapsulated through DSMCC Addressable section and transmitted through MPEG-2 TP to analyze the Header of each Datagram. Additionally, an IP/UDP Datagram Buffer/Header Parser 513 buffers and restores UDP Datagram transmitted through IP Datagram, and then analyzes and processes the restored UDP Header.

A Stream component handler 557 may include ES Buffer/Handler, PCR Handler, STC module, Descrambler, CA Stream Buffer/Handler, and Service Signaling Section Buffer/Handler.

The ES Buffer/Handler buffers and restores an Elementary Stream such as Video and Audio data transmitted in a PES form to deliver it to a proper A/V Decoder.

The PCR Handler processes Program Clock Reference (PCR) Data used for Time synchronization of audio and Video Stream.

The STC module corrects Clock values of the A/V decoders by using a Reference Clock value received through PCR Handler to perform Time Synchronization.

When scrambling is applied to the received IP Datagram, the Descrambler restores data of Payload by using Encryption key delivered from the CA Stream Handler.

The CA Stream Buffer/Handler buffers and processes Data such as Key values for Descrambling of EMM and ECM, which are transmitted for a Conditional Access function through MPEG-2 TS or IP Stream. An output of the CA Stream Buffer/Handler is delivered to the Descrambler, and then, the descrambler descrambles MPEG-2 TP or IP Datagram, which carriers A/V Data and File Data.

The Service Signaling Section Buffer/Handler buffers, restores, and analyzes NRT Service Signaling Channel Section Data transmitted in a form of IP Datagram. The Service Manager (not shown) collects the analyzed NRT Service Signaling Channel Section data and stores them in DB in a form of Service Map and Guide data.

The A/V Decoder 561 decodes the Audio/Video data received through an ES Handler to present them to a user.

An MPEG-2 Service Demux (not shown) may include an MPEG-2 TP Buffer/Parser, a Descrambler, and a PVR Storage module.

An MPEG-2 TP Buffer/Parser (not shown) buffers and restores an MPEG-2 Transport Packet transmitted through an 8-VSB signal, and also detects and processes a Transport Packet Header.

The Descrambler restores the data of Payload by using an Encryption key, which is delivered from the CA Stream Handler, on the Scramble applied Packet payload in the MPEG-2 TP.

The PVR Storage module stores an MPEG-2 TP received through an 8-VSB signal at the user's request and outputs an MPEG-2 TP at the user's request. The PVR storage module may be controlled by the PVR manager (not shown).

The File Handler 551 may include an ALC/LCT Buffer/Parser, an FDT Handler, an XML Parser, a File Reconstruction Buffer, a Decompressor, a File Decoder, and a File Storage.

The ALC/LCT Buffer/Parser buffers and restores ALC/LCT data transmitted through a UDP/IP Stream, and analyzes a Header and Header extension of ALC/LCT. The ALC/LCT Buffer/Parser may be controlled by an NRT Service Manager (not shown).

The FDT Handler analyzes and processes a File Description Table of FLUTE protocol transmitted through an ALC/LCT session. The FDT Handler may be controlled by an NRT Service Manager (not shown).

The XML Parser analyzes an XML Document transmitted through an ALC/LCT session, and then, delivers the analyzed data to a proper module such as an FDT Handler and an SG Handler.

The File Reconstruction Buffer restores a file transmitted through an ALC/LCT, FLUTE session.

If a file transmitted through an ALC/LCT and FLUTE session is compressed, the Decompressor performs a process to decompress the file.

The File Decoder decodes a file restored in the File Reconstruction Buffer, a file decompressed in the decompressor, or a film extracted from the File Storage.

The File Storage stores or extracts a restored file if necessary.

The M/W Engine (not shown) processes data such as a file, which is not an A/V Stream transmitted through DSMCC Section and IP Datagram. The M/W Engine delivers the processed data to a Presentation Manager module.

The SG Handler (not shown) collects and analyzes Service Guide data transmitted in an XML Document form, and then, delivers them to the EPG Manager.

The Service Manager (not shown) collects and analyzes PSI/PSIP Data transmitted through an MPEG-2 Transport Stream and Service Signaling Section Data transmitted through an IP Stream, so as to produce a Service Map. The Service Manager (not shown) stores the produced service map in a Service Map & Guide Database, and controls an access to a Service that a user wants. The Service Manager is controlled by the Operation Controller (not shown), and controls the Tuner 501, the MPEG-2 TP Demux 507, and the IP Datagram Buffer/Handler 513.

The NRT Service Manager (not shown) performs an overall management on the NRT service transmitted in an object/file form through a FLUTE session. The NRT Service Manager (not shown) may control the FDT Handler and File Storage.

The Application Manager (not shown) performs overall management on Application data transmitted in a form of object and file.

The UI Manager (not shown) delivers a user input to an Operation Controller through a User Interface, and starts a process for a service that a user requests.

The Operation Controller (not shown) processes a command of a user, which is received through a UI Manager, and allows a Manager of a necessary module to perform a corresponding action.

The Fingerprint Extractor 565 extracts fingerprint characteristic information from an AV stream.

The Fingerprint Comparator 567 compares the characteristic information extracted by the Fingerprint Extractor with a Reference fingerprint to find an identical content. The Fingerprint Comparator 567 may use a Reference fingerprint DB stored in local and may query a Fingerprint query server on the internet to receive a result. The matched result data obtained by a comparison result may be delivered to Application and used.

As an ACR function managing module or an application module providing an enhanced service on the basis of ACR, the Application 569 identifies a broadcast content in watching to provide an enhanced service related to it.

FIG. 62 is a block diagram illustrating a structure of a watermark based video display device according to another embodiment.

Although the watermark based video display device of FIG. 62 is similar to the fingerprint based video display device of FIG. 38, the fingerprint based video display device does not includes the Fingerprint Extractor 565 and the Fingerprint Comparator 567, but further includes the Watermark Extractor 566.

The Watermark Extractor 566 extracts data inserted in a watermark form from an Audio/Video stream. The extracted data may be delivered to an Application and may be used.

According to an embodiment, the above-described method may also be embodied as computer readable codes on a computer readable recording medium. Examples of the computer readable recording medium include read-only memory (ROM), random-access memory (RAM), CD-ROMs, magnetic tapes, floppy disks, optical data storage devices, and carrier waves (such as data transmission through the Internet).

The configurations and methods of the above-described embodiments are applied to the video display device without any restriction, and all or some of the embodiments may be selectively combined to have various modifications.

The invention claimed is:

1. A method of operating a video display device comprising a display unit, the method comprising:
    obtaining, by an external input handler, an uncompressed broadcast signal including uncompressed content;
    extracting, by a processor, a first signature from a first uncompressed content being displayed on the display unit at a first time point;
    transmitting, by the processor, a query including the first signature to an automatic content recognition (ACR) server;
    receiving, by the processor, first content information comprising a trigger for triggering an application execution, a first identifier of the first uncompressed content, a first content provider identifier and a first channel identifier, based on the query from the ACR server;
    executing, by the processor, the application related to the first uncompressed content based on the trigger;
    extracting, by the processor, a second signature from a second uncompressed content being displayed on the display unit at a second time point;
    receiving, by the processor, second content information related to the second uncompressed content based on the second signature,
    wherein the second content information includes a second identifier of the second uncompressed content, a second content provider identifier and a second channel identifier;
    comparing, by the processor, the second identifier of the second uncompressed content with the first identifier of the first uncompressed content, the second content provider identifier with the first content provider identifier and the second channel identifier with the first channel identifier;
    terminating, by the processor, the application when the first identifier of the first uncompressed content is different from the second identifier of the second uncompressed content, the first content provider identifier is different from the second content provider identifier and the first channel identifier is different from the second channel identifier;
    extracting, by the processor, a third signature from a third uncompressed content being displayed on the display unit at a third time point;
    receiving, by the processor, third content information related to the third uncompressed content based on the third signature,
    wherein the third content information includes a third identifier of the third uncompressed content;
    comparing, by the processor, the third identifier of the third uncompressed content with the first identifier of the first uncompressed content; and
    re-executing, by the processor, the terminated application when the third identifier of the third uncompressed content and the first identifier of the first uncompressed content are the same,
    wherein the first time point, the second time point and the third time point are different from each other,
    wherein the terminating the application comprises maintaining the execution of the application until a pre-set time elapses despite the first identifier of the first uncompressed content being different from the second identifier of the second uncompressed content, the first content provider identifier being different from the second content provider identifier and the first channel identifier being different from the second channel identifier, and
    wherein the display unit displays a message indicating the terminating the application.

2. The method according to claim 1, wherein the application is terminated by the processor, when the first uncompressed content is faded out.

3. The method according to claim 1, wherein the application is terminated by the processor, when the pre-set time elapses.

4. A video display device comprising:
a display unit;
an external input handler configured to obtain an uncompressed broadcast signal including uncompressed content; and
a processor configured to:
extract a first signature from a first uncompressed content being displayed on the display unit at a first time point,
transmit a query including the first signature to an automatic content recognition (ACR) server,
receive first content information comprising a trigger for triggering an application execution, a first identifier of the first uncompressed content, a first content provider identifier and a first channel identifier, based on the query from the ACR server,
execute the application related to the first uncompressed content based on the trigger,
extract a second signature from a second uncompressed content being displayed on the display unit at a second time point,
receive second content information related to the second uncompressed content based on the second signature,
wherein the second content information includes a second identifier of the second uncompressed content, a second content provider identifier and a second channel identifier,
compare the second identifier of the second uncompressed content with the first identifier of the first uncompressed content, the second content provider identifier with the first content provider identifier and the second channel identifier with the first channel identifier,
terminate the application when the first identifier of the first uncompressed content is different from the second identifier of the second uncompressed content, the first content provider identifier is different from the second content provider identifier and the first channel identifier is different from the second channel identifier,
extract a third signature from a third uncompressed content being displayed on the display unit at a third time point,
receive third content information related to the third uncompressed content based on the third signature, wherein the third content information includes a third identifier of the third uncompressed content,
compare the third identifier of the third uncompressed content with the first identifier of the first uncompressed content, and
re-execute the terminated application when the third identifier of the third uncompressed content and the first identifier of the first uncompressed content are the same,
wherein the first time point, the second time point and the third time point are different from each other,
wherein the processor maintains the execution of the application until a pre-set time elapses despite the first identifier of the first uncompressed content being different from the second identifier of the second uncompressed content, the first content provider identifier being different from the second content provider identifier and the first channel identifier being different from the second channel identifier, and
wherein the display unit displays a message indicating the terminating the application.

5. The video display device according to claim 4, wherein the processor terminates the application when the first uncompressed content is faded out.

6. The video display device according to claim 4, wherein the processor terminates the application when the pre-set time elapses.

* * * * *